United States Patent
Venkataraman et al.

(10) Patent No.: US 10,119,808 B2
(45) Date of Patent: Nov. 6, 2018

(54) SYSTEMS AND METHODS FOR ESTIMATING DEPTH FROM PROJECTED TEXTURE USING CAMERA ARRAYS

(71) Applicant: FotoNation Limited, Ballybrit, Galway (IE)

(72) Inventors: Kartik Venkataraman, San Jose, CA (US); Jacques Duparré, Jena (DE)

(73) Assignee: FotoNation Limited (IE)

( * ) Notice: Subject to any disclaimer, the term of this patent is extended or adjusted under 35 U.S.C. 154(b) by 0 days.

(21) Appl. No.: 14/547,048

(22) Filed: Nov. 18, 2014

(65) Prior Publication Data

US 2015/0138346 A1    May 21, 2015

Related U.S. Application Data

(60) Provisional application No. 61/905,423, filed on Nov. 18, 2013.

(51) Int. Cl.
*G01B 11/22* (2006.01)
*G06T 7/40* (2017.01)
(Continued)

(52) U.S. Cl.
CPC .......... *G01B 11/22* (2013.01); *G01B 11/2545* (2013.01); *G06T 7/40* (2013.01);
(Continued)

(58) Field of Classification Search
CPC .... H04N 19/463; H04N 19/105; H04N 19/44; H04N 19/51
(Continued)

(56) References Cited

U.S. PATENT DOCUMENTS

| 4,124,798 A | 11/1978 | Thompson |
| 4,198,646 A | 4/1980 | Alexander et al. |

(Continued)

FOREIGN PATENT DOCUMENTS

| CN | 1669332 A | 9/2005 |
| CN | 1839394 A | 9/2006 |

(Continued)

OTHER PUBLICATIONS

US 8,957,977, 02/2015, Venkataraman et al. (withdrawn)
(Continued)

*Primary Examiner* — Jamie Atala
*Assistant Examiner* — Ayman Abaza
(74) *Attorney, Agent, or Firm* — KPPB LLP

(57) ABSTRACT

Systems and methods in accordance with embodiments of the invention estimate depth from projected texture using camera arrays that includes at least two two-dimensional arrays of cameras each several cameras; an illumination system configured to illuminate a scene with a projected texture; a processor; and memory containing an image processing pipeline application and an illumination system controller application. In addition, the illumination system controller application directs the processor to control the illumination system to illuminate a scene with a projected texture. Furthermore, the image processing pipeline application directs the processor to: utilize the illumination system controller application to control the illumination system to illuminate a scene with a projected texture capture a set of images of the scene illuminated with the projected texture; determining depth estimates for pixel locations in an image from a reference viewpoint using at least a subset of the set of images.

26 Claims, 32 Drawing Sheets

(51) Int. Cl.
*G01B 11/25* (2006.01)
*G06T 7/521* (2017.01)
*G06T 7/593* (2017.01)
*G06T 7/557* (2017.01)

(52) U.S. Cl.
CPC .............. *G06T 7/521* (2017.01); *G06T 7/557* (2017.01); *G06T 7/596* (2017.01); *G06T 2207/10024* (2013.01)

(58) Field of Classification Search
USPC ........................................................ 348/135
See application file for complete search history.

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,899,060 A | 2/1990 | Lischke |
| 5,005,083 A | 4/1991 | Grage |
| 5,070,414 A | 12/1991 | Tsutsumi |
| 5,144,448 A | 9/1992 | Hornbaker |
| 5,157,499 A | 10/1992 | Oguma et al. |
| 5,325,449 A | 6/1994 | Burt |
| 5,327,125 A | 7/1994 | Iwase et al. |
| 5,488,674 A | 1/1996 | Burt |
| 5,629,524 A | 5/1997 | Stettner et al. |
| 5,638,461 A | 6/1997 | Fridge |
| 5,744,031 A | 4/1998 | Bene |
| 5,793,900 A | 8/1998 | Nourbakhsh et al. |
| 5,801,919 A | 9/1998 | Griencewic et al. |
| 5,808,350 A | 9/1998 | Jack et al. |
| 5,832,312 A | 11/1998 | Rieger et al. |
| 5,833,507 A | 11/1998 | Woodgate et al. |
| 5,880,691 A | 3/1999 | Fossum et al. |
| 5,911,008 A | 6/1999 | Hamada et al. |
| 5,933,190 A | 8/1999 | Dierickx et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu et al. |
| 6,175,379 B1 | 1/2001 | Uomori et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,443,579 B1 | 9/2002 | Myers et al. |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen et al. |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 | 10/2005 | Joseph |
| 6,985,175 B2 | 1/2006 | Iwai et al. |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Grossberg et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,430,312 B2 | 9/2008 | Gu |
| 7,496,293 B2 | 2/2009 | Shamir et al. |
| 7,564,019 B2 | 7/2009 | Olsen |
| 7,599,547 B2 | 10/2009 | Sun et al. |
| 7,606,484 B1 | 10/2009 | Richards et al. |
| 7,620,265 B1 | 11/2009 | Wolff |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Mitsunaga et al. |
| 7,956,871 B2 | 6/2011 | Fainstain et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,055,466 B2 | 11/2011 | Bryll |
| 8,077,245 B2 | 12/2011 | Adamo et al. |
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,111,910 B2 | 2/2012 | Tanaka |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li |
| 8,164,629 B1 | 4/2012 | Zhang |
| 8,169,486 B2 | 5/2012 | Corcoran et al. |

(56) References Cited

U.S. PATENT DOCUMENTS

| | | |
|---|---|---|
| 8,180,145 B2 | 5/2012 | Wu et al. |
| 8,189,065 B2 | 5/2012 | Georgiev et al. |
| 8,189,089 B1 | 5/2012 | Georgiev |
| 8,194,296 B2 | 6/2012 | Compton |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Saint-Pierre et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev |
| 8,406,562 B2 | 3/2013 | Bassi et al. |
| 8,411,146 B2 | 4/2013 | Twede |
| 8,446,492 B2 | 5/2013 | Nakano et al. |
| 8,456,517 B2 | 6/2013 | Mor et al. |
| 8,493,496 B2 | 7/2013 | Freedman et al. |
| 8,514,291 B2 | 8/2013 | Chang et al. |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman et al. |
| 8,836,793 B1 | 9/2014 | Kriesel et al. |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Kobayashi et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman et al. |
| 9,031,343 B2 | 5/2015 | Venkataraman et al. |
| 9,036,928 B2 | 5/2015 | Venkataraman et al. |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | Mcmahon et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Ciurea et al. |
| 9,185,276 B2 | 11/2015 | Roda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,253,380 B2 | 2/2016 | Venkataraman et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,512,319 B2 | 12/2016 | Errol |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |

(56) References Cited

U.S. PATENT DOCUMENTS

| | | |
|---|---|---|
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,858,673 B2 | 1/2018 | Ciurea et al. |
| 9,864,921 B2 | 1/2018 | Venkataraman et al. |
| 9,898,856 B2 | 2/2018 | Yang et al. |
| 9,917,998 B2 | 3/2018 | Venkataraman et al. |
| 9,955,070 B2 | 4/2018 | Lelescu et al. |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0012056 A1 | 1/2002 | Trevino |
| 2002/0015536 A1 | 2/2002 | Warren |
| 2002/0027608 A1 | 3/2002 | Johnson |
| 2002/0028014 A1 | 3/2002 | Ono et al. |
| 2002/0039438 A1 | 4/2002 | Mori et al. |
| 2002/0057845 A1 | 5/2002 | Fossum |
| 2002/0061131 A1 | 5/2002 | Sawhney et al. |
| 2002/0063807 A1 | 5/2002 | Margulis |
| 2002/0075450 A1 | 6/2002 | Aratani |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0120634 A1 | 8/2002 | Min et al. |
| 2002/0122113 A1 | 9/2002 | Foote et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng et al. |
| 2003/0211405 A1 | 11/2003 | Venkataraman |
| 2004/0003409 A1 | 1/2004 | Berstis et al. |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams |
| 2004/0100570 A1 | 5/2004 | Shizukuishi |
| 2004/0105021 A1 | 6/2004 | Hu et al. |
| 2004/0114807 A1 | 6/2004 | Lelescu et al. |
| 2004/0141659 A1 | 7/2004 | Zhang et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski |
| 2004/0196379 A1 | 10/2004 | Chen et al. |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219264 A1 | 10/2005 | Shum et al. |
| 2005/0219363 A1 | 10/2005 | Kohler |
| 2005/0224843 A1 | 10/2005 | Boemler |
| 2005/0225654 A1 | 10/2005 | Feldman et al. |
| 2005/0265633 A1 | 12/2005 | Piacentino |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1* | 9/2006 | Gu .................. G01B 11/25 382/154 |
| 2006/0210186 A1 | 9/2006 | Berkner |
| 2006/0214085 A1 | 9/2006 | Olsen |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |

(56) References Cited

U.S. PATENT DOCUMENTS

| | | |
|---|---|---|
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0140685 A1 | 6/2007 | Wu et al. |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat et al. |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer |
| 2007/0236595 A1 | 10/2007 | Pan et al. |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0296721 A1 | 12/2007 | Chang et al. |
| 2007/0296832 A1 | 12/2007 | Ota et al. |
| 2007/0296835 A1 | 12/2007 | Olsen et al. |
| 2007/0296847 A1 | 12/2007 | Chang et al. |
| 2007/0297696 A1 | 12/2007 | Hamza |
| 2008/0006859 A1 | 1/2008 | Mionetto et al. |
| 2008/0015487 A1 | 1/2008 | Szamosfalvi et al. |
| 2008/0019611 A1 | 1/2008 | Larkin |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi et al. |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger et al. |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger et al. |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0066693 A1 | 3/2009 | Carson |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa et al. |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167934 A1 | 7/2009 | Gupta |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan et al. |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0273663 A1 | 11/2009 | Yoshida et al. |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |

(56) References Cited

U.S. PATENT DOCUMENTS

| | | |
|---|---|---|
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang et al. |
| 2010/0045809 A1 | 2/2010 | Packard |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1* | 3/2010 | Gordon ............... G01B 11/25 382/203 |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez et al. |
| 2010/0194860 A1 | 8/2010 | Mentz et al. |
| 2010/0194901 A1 | 8/2010 | van Hoorebeke et al. |
| 2010/0195716 A1 | 8/2010 | Klein G et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Panahpour Tehrani et al. |
| 2010/0259610 A1 | 10/2010 | Petersen et al. |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0281070 A1 | 11/2010 | Chan et al. |
| 2010/0289941 A1 | 11/2010 | Ito |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu et al. |
| 2010/0321640 A1 | 12/2010 | Yeh et al. |
| 2010/0329556 A1 | 12/2010 | Mitarai et al. |
| 2011/0001037 A1 | 1/2011 | Tewinkle |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0085028 A1 | 4/2011 | Samadani et al. |
| 2011/0090217 A1 | 4/2011 | Mashitani et al. |
| 2011/0108708 A1 | 5/2011 | Olsen et al. |
| 2011/0115886 A1 | 5/2011 | Nguyen |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0208105 A1 | 8/2011 | Brandl et al. |
| 2011/0211077 A1 | 9/2011 | Nayar |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0222757 A1 | 9/2011 | Yeatman, Jr. et al. |
| 2011/0228142 A1 | 9/2011 | Brueckner |
| 2011/0228144 A1 | 9/2011 | Tian et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung et al. |
| 2011/0255745 A1 | 10/2011 | Hodder et al. |
| 2011/0261993 A1 | 10/2011 | Weiming et al. |
| 2011/0267264 A1 | 11/2011 | McCarthy et al. |
| 2011/0267348 A1 | 11/2011 | Lin et al. |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1* | 11/2011 | Kuang ............... H04N 5/343 348/229.1 |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim, II et al. |
| 2012/0012748 A1 | 1/2012 | Pain et al. |
| 2012/0014456 A1 | 1/2012 | Martinez Bauza et al. |
| 2012/0019530 A1* | 1/2012 | Baker ............... G02B 27/2207 345/419 |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando et al. |
| 2012/0056982 A1 | 3/2012 | Katz et al. |
| 2012/0057040 A1 | 3/2012 | Park et al. |
| 2012/0062697 A1 | 3/2012 | Treado et al. |

(56) References Cited

U.S. PATENT DOCUMENTS

| | | |
|---|---|---|
| 2012/0062702 A1 | 3/2012 | Jiang et al. |
| 2012/0062756 A1 | 3/2012 | Tian |
| 2012/0069235 A1 | 3/2012 | Imai |
| 2012/0081519 A1 | 4/2012 | Goma |
| 2012/0086803 A1 | 4/2012 | Malzbender et al. |
| 2012/0105590 A1 | 5/2012 | Fukumoto et al. |
| 2012/0105691 A1 | 5/2012 | Waqas et al. |
| 2012/0113232 A1 | 5/2012 | Joblove et al. |
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0127275 A1 | 5/2012 | Von Zitzewitz et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0163672 A1 | 6/2012 | McKinnon |
| 2012/0169433 A1 | 7/2012 | Mullins |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0273420 A1 | 11/2012 | Gerber et al. |
| 2012/0274626 A1 | 11/2012 | Hsieh et al. |
| 2012/0287291 A1 | 11/2012 | McMahon et al. |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307093 A1 | 12/2012 | Miyoshi |
| 2012/0307099 A1 | 12/2012 | Yahata et al. |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0016245 A1 | 1/2013 | Yuba |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120605 A1 | 5/2013 | Georgiev et al. |
| 2013/0121559 A1 | 5/2013 | Hu |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares |
| 2013/0147979 A1 | 6/2013 | McMahon et al. |
| 2013/0176394 A1 | 7/2013 | Tian et al. |
| 2013/0208138 A1 | 8/2013 | Li |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0223759 A1 | 8/2013 | Nishiyama et al. |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By et al. |
| 2013/0293760 A1 | 11/2013 | Nisenzon et al. |
| 2013/0335598 A1 | 12/2013 | Gustavsson |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng et al. |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0132810 A1 | 5/2014 | McMahon |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |

(56) References Cited

U.S. PATENT DOCUMENTS

| | | |
|---|---|---|
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0146029 A1 | 5/2015 | Venkataraman et al. |
| 2015/0146030 A1 | 5/2015 | Venkataraman et al. |
| 2015/0199793 A1 | 7/2015 | Lelescu et al. |
| 2015/0199841 A1 | 7/2015 | Venkataraman et al. |
| 2015/0243480 A1 | 8/2015 | Yamada et al. |
| 2015/0244927 A1 | 8/2015 | Laroia et al. |
| 2015/0248744 A1* | 9/2015 | Hayasaka ............ G06T 3/4007 382/300 |
| 2015/0254868 A1 | 9/2015 | Srikanth et al. |
| 2015/0296137 A1 | 10/2015 | Duparre et al. |
| 2015/0312455 A1 | 10/2015 | Venkataraman et al. |
| 2015/0326852 A1 | 11/2015 | Duparre et al. |
| 2015/0332468 A1 | 11/2015 | Hayasaka et al. |
| 2015/0373261 A1 | 12/2015 | Rodda |
| 2016/0037097 A1 | 2/2016 | Duparre |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0195733 A1 | 7/2016 | Lelescu et al. |
| 2016/0198096 A1 | 7/2016 | McMahon et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0316140 A1 | 10/2016 | Nayar et al. |
| 2017/0006233 A1 | 1/2017 | Venkataraman et al. |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0163862 A1 | 6/2017 | Molina |
| 2017/0178363 A1 | 6/2017 | Venkataraman et al. |
| 2017/0187933 A1 | 6/2017 | Duparre |
| 2017/0257562 A1 | 9/2017 | Venkataraman et al. |
| 2017/0365104 A1 | 12/2017 | McMahon et al. |
| 2018/0007284 A1 | 1/2018 | Venkataraman et al. |
| 2018/0024330 A1 | 1/2018 | Laroia |
| 2018/0040135 A1 | 2/2018 | Mullis |
| 2018/0048830 A1 | 2/2018 | Venkataraman et al. |
| 2018/0081090 A1 | 3/2018 | Duparre et al. |
| 2018/0097993 A1 | 4/2018 | Nayar et al. |
| 2018/0109782 A1 | 4/2018 | Duparre et al. |
| 2018/0124311 A1 | 5/2018 | Lelescu et al. |
| 2018/0139382 A1 | 5/2018 | Venkataraman et al. |

FOREIGN PATENT DOCUMENTS

| | | |
|---|---|---|
| CN | 101010619 A | 8/2007 |
| CN | 101064780 A | 10/2007 |
| CN | 101102388 A | 1/2008 |
| CN | 101147392 A | 3/2008 |
| CN | 101427372 A | 5/2009 |
| CN | 101606086 A | 12/2009 |
| CN | 101883291 A | 11/2010 |
| CN | 102037717 A | 4/2011 |
| CN | 102375199 A | 3/2012 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 104081414 B | 8/2017 |
| CN | 107230236 A | 10/2017 |
| CN | 107346061 A | 11/2017 |
| EP | 0677821 A2 | 10/1995 |
| EP | 840502 A2 | 5/1998 |
| EP | 1201407 A2 | 5/2002 |
| EP | 1355274 A2 | 10/2003 |
| EP | 1734766 A2 | 12/2006 |
| EP | 1243945 B1 | 1/2009 |
| EP | 2026563 A1 | 2/2009 |
| EP | 2104334 A1 | 9/2009 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2652678 A1 | 10/2013 |
| EP | 2761534 A1 | 8/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 3066690 A1 | 9/2016 |
| EP | 2652678 B1 | 9/2017 |
| EP | 2817955 B1 | 4/2018 |
| EP | 3328048 A1 | 5/2018 |
| EP | 3075140 B1 | 6/2018 |
| GB | 2482022 A | 1/2012 |
| IN | 2708/CHENP/2014 A1 | 8/2015 |
| JP | 59025483 | 9/1984 |

(56) References Cited

FOREIGN PATENT DOCUMENTS

| | | |
|---|---|---|
| JP | 64037177 | 7/1989 |
| JP | 02285772 A | 11/1990 |
| JP | 0715457 A | 1/1995 |
| JP | 09181913 A | 7/1997 |
| JP | 11142609 A | 5/1999 |
| JP | 11223708 A | 8/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005341569 A | 12/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008172735 A | 7/2008 |
| JP | 2008258885 A | 10/2008 |
| JP | 2009064421 A | 3/2009 |
| JP | 2009132010 A | 6/2009 |
| JP | 2009300268 A | 12/2009 |
| JP | 2011017764 A | 1/2011 |
| JP | 2011030184 A | 2/2011 |
| JP | 2011109484 A | 6/2011 |
| JP | 2011523538 A | 8/2011 |
| JP | 2012504805 A | 2/2012 |
| JP | 2013509022 A | 3/2013 |
| JP | 2013526801 A | 6/2013 |
| JP | 2014521117 A | 8/2014 |
| JP | 2014535191 A | 12/2014 |
| JP | 2015522178 A | 8/2015 |
| JP | 2015534734 A | 12/2015 |
| JP | 6140709 B2 | 5/2017 |
| JP | 2017163550 A | 9/2017 |
| JP | 2017163587 A | 9/2017 |
| KR | 20110097647 A | 8/2011 |
| KR | 101843994 B1 | 3/2018 |
| SG | 191151 A1 | 7/2013 |
| TW | 200828994 A | 7/2008 |
| TW | 200939739 A | 9/2009 |
| WO | 2005057922 A1 | 6/2005 |
| WO | 2006039906 A2 | 4/2006 |
| WO | 2006039906 A3 | 9/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2010037512 A1 | 4/2010 |
| WO | 2011008443 A2 | 1/2011 |
| WO | 2011046607 A2 | 4/2011 |
| WO | 2011055655 A1 | 5/2011 |
| WO | 2011105814 A2 | 9/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |
| WO | 2014031795 A1 | 2/2014 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015070105 A1 | 5/2015 |
| WO | 2015074078 A1 | 5/2015 |
| WO | 2015081279 A1 | 6/2015 |
| WO | 2015134996 A1 | 9/2015 |

OTHER PUBLICATIONS

US 8,964,053, 02/2015, Venkataraman et al. (withdrawn)
US 8,965,058, 02/2015, Venkataraman et al. (withdrawn)
US 9,014,491, 04/2015, Venkataraman et al. (withdrawn)
US 9,338,332, 06/2016, Venkataraman et al. (withdrawn)
Wei Jiang, and Masatoshi Okutomi, Shigeki Sugimoto, "Panoramic 3D Reconstruction Using Rotational Stereo Camera with Simple Epipolar Constraints", IEEE Computer Society Conference on Computer Vision and Pattern Recognition, 2006.*
Lensvector, "How LensVector Autofocus Works", printed Nov. 2, 2012 from http://www.lensvector.com/overview.html, 1 pg.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution," Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.

(56) References Cited

OTHER PUBLICATIONS

Lo et al., "Stereoscopic 3D Copy & Paste", ACM Transactions on Graphics, vol. 29, No. 6, Article 147, Dec. 2010, pp. 147:1-147:10.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-vol. Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Seitz et al., "Plenoptic Image Editing", International Journal of Computer Vision 48, 2, pgs. 115-129.
Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.

Taylor, "Virtual camera movement: The way of the future?", American Cinematographer 77, 9 (Sept.), 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park-Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.
Wang, "Calculation of Image Position, Size and Orientation Using First Order Properties", 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", http://en.wikipedia.org/wiki/Polarizing_filter_(photography), 1 pg.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "A Real-Time Distributed Light Field Camera", Eurographics Workshop on Rendering (2002), pp. 1-10.
Yang et al., "Superresolution Using Preconditioned Conjugate Gradient Method", Source and date unknown, 8 pgs.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.
International Search Report and Written Opinion for International Application No. PCT/US2014/066229, Search Completed Mar. 6, 2015, dated Mar. 19, 2015, 9 Pgs.
Capel, "Image Mosaicing and Super-resolution", [online], Retrieved on Nov. 10, 2012 (Nov. 10, 2012). Retrieved from the Internet at URL:<http://citeseerx.ist.psu.edu/viewdoc/download?doi=10.1.1.226.2643&rep=rep1&type=pdf>, Title pg., abstract, table of contents, pp. 1-263 (269 total pages).
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound-eye imaging system", Multidim Syst Sign Process, 2007, vol. 18, pp. 83-101.
Chen et al., "Interactive deformation of light fields", In Proceedings of SIGGRAPH I3D 2005, pp. 139-146.

(56) References Cited

OTHER PUBLICATIONS

Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 3005, vol. 44, No. 15, pp. 2949-2956.
Duparre et al.,"Ultra-Thin Camera Based on Artificial Apposistion Compound Eyes", 10th Microoptics Conference, Sep. 1-3, 2004, 2 pgs.
Fanaswala, "Regularized Super-Resolution of Multi-View Images", Retrieved on Nov. 10, 2012 (Nov. 10, 2012). Retrieved from the Internet at URL:<http://www.site.uottawa.ca/-edubois/theses/Fanaswala_thesis.pdf>, 163 pgs.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.

Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., Optical System Design, 2nd Edition, SPIE Press, pp. 191-198.
Fischer et al., Optical System Design, 2nd Edition, SPIE Press, pp. 49-58.
Goldman et al., "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Hasinoff et al., "Search-and-Replace Editing for Personal Photo Collections", Computational Photography (ICCP) 2010, pp. 1-8.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.
Jarabo et al., "Efficient Propagation of Light Field Edits", In Proceedings of SIACG 2011, pp. 75-80.
Joshi et al., "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: <URL: http:l/ieeexplore.ieee.org/stamp/stamp.jsp?tp=&arnumber=44090328,isnumber=4408819>; pp. 1-8.
Kang et al., "Handling Occlusions inn Dense Multi-View Stereo", Computer Vision and Pattern Recognition, 2001, vol. 1, pp. I-103-I-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR 94, 8 pgs.
International Preliminary Report on Patentability for International Application PCT/US2013/024987, dated Aug. 21, 2014, 13 Pgs.
International Search Report and Written Opinion for International Application No. PCT/US13/46002, Search Completed Nov. 13, 2013, dated Nov. 29, 2013, 7 pgs.
International Search Report and Written Opinion for International Application No. PCT/US13/48772, Search Completed Oct. 21, 2013, dated Nov. 8, 2013, 6 pgs.
International Search Report and Written Opinion for International Application No. PCT/US13/56065, Search Completed Nov. 25, 2013, dated Nov. 26, 2013, 8 pgs.
International Search Report and Written Opinion for International Application No. PCT/US13/59991, Search Completed Feb. 6, 2014, dated Feb. 26, 2014, 8 pgs.
International Search Report and Written Opinion for International Application No. PCT/US2009/044687, date completed Jan. 5, 2010, dated Jan. 13, 2010, 9 pgs.
International Search Report and Written Opinion for International Application No. PCT/US2013/024987, Search Completed Mar. 27, 2013, dated Apr. 15, 2013, 14 pgs.
International Search Report and Written Opinion for International Application No. PCT/US2013/056502, Search Completed Feb. 18, 2014, dated Mar. 19, 2014, 7 pgs.

(56) References Cited

OTHER PUBLICATIONS

International Search Report and Written Opinion for International Application No. PCT/US2013/069932, International Filing Date Nov. 13, 2013, Search Completed Mar. 14, 2014, dated Apr. 14, 2014, 12 pgs.
International Search Report and Written Opinion for International Application PCT/US13/62720, report completed Mar. 25, 2014, dated Apr. 21, 2014, 9 Pgs.
International Search Report and Written Opinion for International Application PCT/US14/024903 report completed Jun. 12, 2014, dated Jun. 27, 2014, 13 pgs.
International Search Report and Written Opinion for International Application PCT/US14/17766, report completed May 28, 2014, 9 Pgs.
International Search Report and Written Opinion for International Application PCT/US14/18084, report completed May 23, 2014, dated Jun. 10, 2014, 12 Pgs.
International Search Report and Written Opinion for International Application PCT/US14/18116, report completed May 13, 2014, dated Jun. 2, 2014, 12 Pgs.
International Search Report and Written Opinion for International Application PCT/US14/22774 report completed Jun. 9, 2014, dated Jul. 14, 2014, 6 Pgs.
International Search Report and Written Opinion for International Application PCT/US14/24407, report completed Jun. 11, 2014, dated Jul. 8, 2014, 9 Pgs.
International Search Report and Written Opinion for International Application PCT/US14/25100, report completed Jul. 7, 2014, dated Aug. 7, 2014 5 Pgs.
International Search Report and Written Opinion for International Application PCT/US14/25904 report completed Jun. 10, 2014, dated Jul. 10, 2014, 6 Pgs.
International Search Report and Written Opinion for International Application PCT/US2014/022123, report completed Jun. 9, 2014, dated Jun. 25, 2014, 5 pgs.
International Search Report and Written Opinion for International Application PCT/US2014/024947, Report Completed Jul. 8, 2014, dated Aug. 5, 2014, 8 Pgs.
International Search Report and Written Opinion for International Application PCT/US2014/028447, report completed Jun. 30, 2014, dated Jul. 21, 2014, 8 Pgs.
International Search Report and Written Opinion for International Application PCT/US2014/030692, report completed Jul. 28, 2014, dated Aug. 27, 2014, 7 Pages.
International Search Report and Written Opinion for International Application PCT/US2014/23762, Report Completed May 30, 2014, dated Jul. 3, 2014, 6 Pgs.
Iprp for International Application No. PCT/US2012/059813, International Filing Date Oct. 11, 2012, Search Completed Apr. 15, 2014, 7 pgs.
International Search Report and Written Opinion for International Application PCT/US11/36349, dated Aug. 22, 2011, 11 pgs.
International Preliminary Report on Patentability for International Application PCT/US2013/039155, report completed Nov. 4, 2014, dated Nov. 13, 2014, 10 Pgs., dated Nov. 13, 2014.
International Search Report and Written Opinion for International Application No. PCT/US2011/64921, Report Completed Feb. 25, 2011, dated Mar. 6, 2012, 17 pgs.
International Search Report and Written Opinion for International Application No. PCT/US2013/027146, completed Apr. 2, 2013, 12 pgs.
International Search Report and Written Opinion for International Application PCT/US14/22118, report completed Jun. 9, 2014, dated Jun. 25, 2014, 5 pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, completed Dec. 17, 2012, 8 pgs.
International Search Report and Written Opinion for International Application PCT/US2012/37670, dated Jul. 18, 2012, Search Completed Jul. 5, 2012, 9 pgs.
International Search Report and Written Opinion for International Application PCT/US2012/58093, completed Nov. 15, 2012, 12 pgs.
Office Action for U.S. Appl. No. 12/952106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.
Bishop et al., "Light Field Superresolution", Retrieved from http://home.eps.hw.ac.uk/~sz73/ICCP09/LightFieldSuperresolution.pdf, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, date unknown, 21 pgs.
Boye et al., "Comparison of Subpixel Image Registration Algorithms", Proc. of SPIE-IS&T Electronic Imaging, vol. 7246, pp. 72460X-1-72460X-9.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
International Preliminary Report on Patentability for International Application PCT/US2014/021439, dated Sep. 15, 2015, dated Sep. 24, 2015, 9 Pgs.
International Preliminary Report on Patentability for International Application PCT/US2014/022118, dated Sep. 8, 2015, dated Sep. 17, 2015, 4 pgs.
International Preliminary Report on Patentability for International Application PCT/US2014/022123, dated Sep. 8, 2015, dated Sep. 17, 2015, 4 Pgs.

(56) References Cited

OTHER PUBLICATIONS

International Preliminary Report on Patentability for International Application PCT/US2014/022774, dated Sep. 22, 2015, dated Oct. 1, 2015, 5 Pgs.
International Preliminary Report on Patentability for International Application PCT/US2014/023762, dated Mar. 2, 2015, dated Mar. 9, 2015, 10 Pgs.
International Preliminary Report on Patentability for International Application PCT/US2014/024407, dated Sep. 15, 2015, dated Sep. 24, 2015, 8 Pgs.
International Preliminary Report on Patentability for International Application PCT/US2014/024903, dated Sep. 15, 2015, dated Sep. 24, 2015, 12 Pgs.
International Preliminary Report on Patentability for International Application PCT/US2014/024947, dated Sep. 15, 2015, dated Sep. 24, 2015, 7 Pgs.
International Preliminary Report on Patentability for International Application PCT/US2014/025100, dated Sep. 15, 2015, dated Sep. 24, 2015, 4 Pgs.
International Preliminary Report on Patentability for International Application PCT/US2014/025904, dated Sep. 15, 2015, dated Sep. 24, 2015, 5 Pgs.
International Preliminary Report on Patentability for International Application PCT/US2014/028447, dated Sep. 15, 2015, dated Sep. 24, 2015, 7 Pgs.
International Preliminary Report on Patentability for International Application PCT/US2014/030692, dated Sep. 15, 2015, dated Sep. 24, 2015, 6 Pgs.
International Preliminary Report on Patentability for International Application PCT/US2014/064693, dated May 10, 2016, dated May 19, 2016, 14 Pgs.
International Preliminary Report on Patentability for International Application PCT/US2014/066229, dated May 24, 2016, dated Jun. 6, 2016, 9 Pgs.
International Preliminary Report on Patentability for International Application PCT/US2014/067740, dated May 31, 2016, dated Jun. 9, 2016, 9 Pgs.
International Preliminary Report on Patentability for International Application PCT/US2015/019529, dated Sep. 13, 2016, dated Sep. 22, 2016, 9 Pgs.
International Search Report and Written Opinion for International Application No. PCT/US2013/039155, completed Jul. 1, 2013, dated Jul. 11, 2013, 11 Pgs.
International Search Report and Written Opinion for International Application No. PCT/US2015/019529, completed May 5, 2015, dated Jun. 8, 2015, 11 Pgs.
International Search Report and Written Opinion for International Application PCT/US14/21439, completed Jun. 5, 2014, dated Jun. 20, 2014, 10 Pgs.
International Search Report and Written Opinion for International Application PCT/US2014/064693, Completed Mar. 7, 2015, dated Apr. 2, 2015, 15 pgs.
International Search Report and Written Opinion for International Application PCT/US2014/067740, Completed Jan. 29, 2015, dated Mar. 3 2015, 10 pgs.
"File Formats Version 6", Alias Systems, 2004, 40 pgs.
Bennett et al., "Multispectral Bilateral Video Fusion", 2007 IEEE Transactions on Image Processing, vol. 16, No. 5, May 2007, pp. 1185-1194.
Chen et al., "KNN Matting", IEEE Transactions on Pattern Analysis and Machine Intelligence, Sep. 2013, vol. 35, No. 9, pp. 2175-2188.
Crabb et al., "Real-time foreground segmentation via range and color imaging", Computer Vision and Pattern Recognition Workshops, 2008. CVPRW'08. IEEE Computer Society Conference on. IEEE, 2008, 5 pages.
Eng, Wei Yong et al., "Gaze correction for 3D tele-immersive communication system", IVMSP Workshop, 2013 IEEE 11th. IEEE, Jun. 10, 2013, 4 pages.
Hernandez-Lopez et al., "Detecting objects using color and depth segmentation with Kinect sensor", Procedia Technology, vol. 3, Jan. 1, 2012 (Jan. 1, 2012), pp. 196-204, XP055307680, ISSN: 2212-0173, DOI: 10.1016/j.protcy.2012.03.021.
Lai et al., "A Large-Scale Hierarchical Multi-View RGB-D Object Dataset", 2011 IEEE International Conference on Robotics and Automation, May 2011, 8 pgs.
Lee et al., "Electroactive Polymer Actuator for Lens-Drive Unit in Auto-Focus Compact Camera Module", ETRI Journal, vol. 31, No. 6, Dec. 2009, pp. 695-702.
Levin et al., "A Closed Form Solution to Natural Image Matting", Pattern Analysis and Machine Intelligence, Feb. 2008, vol. 30, 8 pgs.
Merkle et al., "Adaptation and optimization of coding algorithms for mobile 3DTV", Mobile3DTV Project No. 216503, Nov. 2008, 55 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM SIGGRAPH, Jul. 2007, vol. 26, No. 3, pp. 1-10, [retrieved on Jul. 8, 2015], Retrieved from the Internet <URL:http://doi.acm.org/10.1145/1276377.1276461>.
Perwass et al., "Single Lens 3D-Camera with Extended Depth-of-Field", printed from www.raytrix.de, Jan. 2012, 15 pgs.
Philips 3D Solutions, "3D Interface Specifications, White Paper", Philips 3D Solutions retrieved from www.philips.com/3dsolutions, Feb. 15, 2008, 29 pgs.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Rajan et al., "Simultaneous Estimation of Super-Resolved Scene and Depth Map from Low Resolution Defocused Observations", IEEE Transactions on Pattern Analysis and Machine Intelligence, vol. 25, No. 9, Sep. 2003, pp. 1-16.
Tallon et al., "Upsampling and Denoising of Depth Maps via Joint-Segmentation", 20th European Signal Processing Conference, Aug. 27-31, 2012, 5 pgs.
Venkataraman et al., "PiCam: An Ultra-Thin High Performance Monolithic Camera Array", ACM Transactions on Graphics (TOG), ACM, US, vol. 32, No. 6, Nov. 1, 2013 (Nov. 1, 2013), pp. 1-13.
Wu et al., "A virtual view synthesis algorithm based on image inpainting", 2012 Third International Conference on Networking and Distributed Computing. IEEE, 2012, 4 pages.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zheng et al., "Balloon Motion Estimation Using Two Frames", Proceedings of The Asilomar Conference on Signals, Systems and Computers, IEEE, Comp. Soc. Press, US, vol. 2 of 02, Nov. 4, 1991, pp. 1057-1061.
Extended European Search Report for EP Application No. 13810429.4, Completed Jan. 7, 2016, dated Jan. 15, 2016, 6 Pgs.
Extended European Search Report for European Application EP12782935.6, completed Aug. 28, 2014, dated Sep. 4, 2014, 7 Pgs.
Extended European Search Report for European Application EP12804266.0, Report Completed Jan. 27, 2015, dated Feb. 3, 2015, 6 Pgs.
Extended European Search Report for European Application EP12835041.0, Report Completed Jan. 28, 2015, dated Feb. 4, 2015, 7 Pgs.
Extended European Search Report for European Application EP13810229.8, Report Completed Apr. 14, 2016, dated Apr. 21, 2016, 7 pgs.
Extended European Search Report for European Application No. 13830945.5, Search completed Jun. 28, 2016, dated Jul. 7, 2016, 14 Pgs.
Extended European Search Report for European Application No. 13841613.6, Search completed Jul. 18, 2016, dated Jul. 26, 2016, 8 Pgs.

(56) References Cited

OTHER PUBLICATIONS

Supplementary European Search Report for EP Application No. 13831768.0, Search completed May 18, 2016, dated May 30, 2016, 13 Pgs.
International Preliminary Report on Patentability for International Application No. PCT/US2013/059991, dated Mar. 17, 2015, dated Mar. 26, 2015, 8 pgs.
International Preliminary Report on Patentability for International Application PCT/US13/56065, dated Feb. 24, 2015, dated Mar. 5, 2015, 4 Pgs.
International Preliminary Report on Patentability for International Application PCT/US13/62720, Report dated Mar. 31, 2015, dated Apr. 9, 2015, 8 Pgs.
International Preliminary Report on Patentability for International Application PCT/US2013/027146, Completed Apr. 2, 2013, dated Aug. 26, 2014, 10 pgs.
International Preliminary Report on Patentability for International Application PCT/US2013/046002, dated Dec. 31, 2014, dated Jan. 8, 2015, 6 Pgs.
International Preliminary Report on Patentability for International Application PCT/US2013/048772, dated Dec. 31, 2014, dated Jan. 8, 2015, 8 Pgs.
International Preliminary Report on Patentability for International Application PCT/US2013/056502, dated Feb. 24, 2015, dated Mar. 5, 2015, 7 Pgs.
International Preliminary Report on Patentability for International Application PCT/US2013/069932, dated May 19, 2015, dated May 28, 2015, 14 Pgs.
International Preliminary Report on Patentability for International Application PCT/US2014/017766, dated Aug. 25, 2015, dated Sep. 3, 2015, 8 Pgs.
International Preliminary Report on Patentability for International Application PCT/US2014/018084, dated Aug. 25, 2015, dated Sep. 3, 2015, 11 Pgs.
International Preliminary Report on Patentability for International Application PCT/US2014/018116, dated Sep. 15, 2015, dated Sep. 24, 2015, 12 Pgs.
"Exchangeable image file format for digital still cameras: Exif Version 2.2", Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pages.
Extended European Search Report for European Application EP13751714.0, completed Aug. 5, 2015, dated Aug. 18, 2015, 8 Pgs.
Extended European Search Report for European Application No. 14763087.5, Search completed Dec. 7, 2016, dated Dec. 19, 2016, 9 Pgs.
Extended European Search Report for European Application No. 14860103.2, Search completed Feb. 23, 2017, dated Mar. 3, 2017, 7 Pgs.
International Preliminary Report on Patentability for International Application PCT/US2010/057661, dated May 22, 2012, dated May 31, 2012, 10 pgs.
"Spatial Light Modulators", HOLOEYE Photonics Ag, 2017, retrieved from http://holoeye.com/spatial-light-modulators/ on Jul. 31, 2017, 3 pages.
"Spatial Light Modulators", HOLOEYE Photonics AG, Brochure retrieved from http://holoeye.com/wp-content/uploads/Spatial_Light_Modulators.pdf, printed Jun. 15, 2017, 4 pgs.
Aufderheide et al., "A MEMS-based Smart Sensor System for Estimation of Camera Pose for Computer Vision Applications", Research and Innovation Conference 2011, Jul. 29, 2011, pp. 1-10.
Bennett et al., "Multispectral Video Fusion", Computer Graphics (ACM SIGGRAPH Proceedings), Jul. 25, 2006, 1 pg.
Debevec et al., "Recovering High Dynamic Range Radiance Maps from Photographs", Computer Graphics (ACM SIGGRAPH Proceedings), Aug. 16, 1997, 10 pgs.
Do, Minh N., "Immersive Visual Communication with Depth", Presented at Microsoft Research, Jun. 15, 2011, retrieved from http://minhdo.ece.illinois.edu/talks/ImmersiveComm.pdf, 42 pgs.
Do et al., "Immersive Visual Communication", IEEE Signal Processing Magazine, vol. 28, Issue 1, Jan. 2011, DOI: 10.1109/MSP.2010.939075, Retrieved from: http://minhdo.ece.illinois.edu/publications/ImmerComm_SPM.pdf, pp. 58-66.
Fang et al., "Volume Morphing Methods for Landmark Based 3D Image Deformation", SPIE, Proc. 1996 SPIE Intl Symposium on Medical Imaging, Newport Beach, CA, vol. 2710, Feb. 10, 1996, pp. 404-415.
Konolige, "Projected Texture Stereo", 2010 IEEE International Conference on Robotics and Automation, May 3-7, 2010, p. 148-155.
Lim, "Optimized Projection Pattern Supplementing Stereo Systems", 2009 IEEE International Conference on Robotics and Automation, May 12-17, 2009, pp. 2823-2829.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
Ng et al., "Light Field Photography with a Hand-held Plenoptic Camera", Stanford Tech Report CTSR 2005-02, Apr. 20, 2005, pp. 1-11.
Nguyen et al., "Error Analysis for Image-Based Rendering with Depth Information", IEEE Transactions on Image Processing, vol. 18, Issue 4, Apr. 2009, pp. 703-716.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nishihara, "PRISM: A Practical Real-Time Imaging Stereo Matcher", Massachusetts Institute of Technology, A.I. Memo 780, May 1984, 32 pgs.
Park et al., "Multi-spectral Imaging Using Multiplexed Illumination", 2007 IEEE 11th International Conference on Computer Vision, Oct. 14-21, 2007, Rio de Janeiro, Brazil, pp. 1-8.
Parkkinen et al., "Characteristic Spectra of Munsell Colors", Journal of the Optical Society of America A, vol. 6, Issue 2, Feb. 1989, pp. 318-322.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
U.S. Appl. No. 61/527,007, filed Aug. 24, 2011.
Van Der Wal et al., "The Acadia Vision Processor", Proceedings Fifth IEEE International Workshop on Computer Architectures for Machine Perception, Sep. 13, 2000, Padova, Italy, pp. 31-40.
"Light fields and computational photography", Stanford Computer Graphics Laboratory, Retrieved from: http://graphics.stanford.edu/projects/lightfield/, Earliest publication online: Feb. 10, 1997, 3 pgs.
Fecker et al., "Depth Map Compression for Unstructured Lumigraph Rendering", Proc. SPIE 6077, Proceedings Visual Communications and Image Processing 2006, Jan. 2006, pp. 60770B-1-60770B-8.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Kubota et al., "Reconstructing Dense Light Field From Array of Multifocus Images for Novel View Synthesis", IEEE Transactions on Image Processing, vol. 16, No. 1, Jan. 2007, pp. 269-279.
Li et al., "Fusing Images With Different Focuses Using Support Vector Machines", IEEE Transactions on Neural Networks, vol. 15, No. 6, Nov. 2004, pp. 1555-1561.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.

(56) References Cited

OTHER PUBLICATIONS

Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pages.
Vetro et al., "Coding Approaches for End-To-End 3D TV Systems", Mitsubishi Electric Research Laboratories, Inc., TR2004-137, Dec. 2004, 8 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Xu, Ruifeng, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Gupta et al., "Perceptual Organization and Recognition of Indoor Scenes from Rgb-D Images", 2013 IEEE Conference on Computer Vision and Pattern Recognition, Jun. 23-28, 2013, Portland, OR, USA, pp. 564-571.
Izadi et al., "KinectFusion: Real-time 3D Reconstruction and Interaction Using a Moving Depth Camera", UIST'11, Oct. 16-19, 2011, Santa Barbara, CA, pp. 559-568.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Joshi, Neel S., "Color Calibration for Arrays of Inexpensive Image Sensors", Master's with Distinction in Research Report, Stanford University, Department of Computer Science, Mar. 2004, 30 pgs.
Kim et al., "Scene reconstruction from high spatio-angular resolution light fields", ACM Transactions on Graphics (TOG)—SIGGRAPH 2013 Conference Proceedings, vol. 32, Issue 4, Article 73, Jul. 21, 2013, 11 pages.
Lane et al., "A Survey of Mobile Phone Sensing", IEEE Communications Magazine, vol. 48, Issue 9, Sep. 2010, pp. 140-150.
Lee et al., "Automatic Upright Adjustment of Photographs", IEEE Conference on Computer Vision and Pattern Recognition (CVPR), 2012, pp. 877-884.
Lee et al., "Nonlocal matting", CVPR 2011, Jun. 20-25, 2011, pp. 2193-2200.
Levin et al., "Spectral Matting", 2007 IEEE Conference on Computer Vision and Pattern Recognition, Jun. 17-22, 2007, Minneapolis, MN, USA, pp. 1-8.
McGuire et al., "Defocus video matting", ACM Transactions on Graphics (TOG)—Proceedings of ACM SIGGRAPH 2005, vol. 24, Issue 3, Jul. 2005, pp. 567-576.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robert et al., "Dense Depth Map Reconstruction : A Minimization and Regularization Approach which Preserves Discontinuities", European Conference on Computer Vision (ECCV), pp. 439-451, 1996.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Shotton et al., "Real-time human pose recognition in parts from single depth images", CVPR 2011, Jun. 20-25, 2011, Colorado Springs, CO, USA, pp. 1297-1304.
Shum et al., "A Review of Image-based Rendering Techniques", Visual Communications and Image Processing 2000, May 2000, 12 pgs.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Tseng et al., "Automatic 3-D depth recovery from a single urban-scene image", 2012 Visual Communications and Image Processing, Nov. 27-30, 2012, San Diego, CA, USA, pp. 1-6.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pages, published Aug. 5, 2007.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Extended European Search Report for EP Application No. 11781313.9, Completed Oct. 1, 2013, dated Oct. 8, 2013, 6 pages.
Extended European Search Report for European Application No. 14865463.5, Search completed May 30, 2017, dated Jun. 8, 2017, 6 Pgs.
International Preliminary Report on Patentability for International Application No. PCT/US2011/064921, Report dated Jun. 18, 2013, dated Jun. 27, 2013, 14 Pgs.
International Preliminary Report on Patentability for International Application No. PCT/US2012/056151, Report dated Mar. 25, 2014, 9 pgs.
International Preliminary Report on Patentability for International Application No. PCT/US2012/056166, Report dated Mar. 25, 2014, Report dated Apr. 3, 2014 8 pgs.
International Preliminary Report on Patentability for International Application No. PCT/US2012/058093, Report dated Sep. 18, 2013, dated Oct. 22, 2013, 40 pgs.
International Preliminary Report on Patentability for International Application PCT/US2011/036349, Report dated Nov. 13, 2012, dated Nov. 22, 2012, 9 pages.
International Preliminary Report on Patentability for International Application PCT/US2014/029052, dated Sep. 15, 2015, dated Sep. 24, 2015, 9 Pgs.
International Search Report and Written Opinion for International Application No. PCT/US2012/056166, Report Completed Nov. 10, 2012, dated Nov. 20, 2012, 9 pgs.
International Search Report and Written Opinion for International Application PCT/US2014/029052, completed Jun. 30, 2014, dated Jul. 24, 2014, 10 Pgs.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bryan et al., "Perspective Distortion from Interpersonal Distance Is an Implicit Visual Cue for Social Judgments of Faces", PLOS One, vol. 7, Issue 9, Sep. 26, 2012, e45301, doi:10.1371/journal.pone.0045301, 9 pages.
Carroll et al., "Image Warps for Artistic Perspective Manipulation", ACM Transactions on Graphics (TOG), vol. 29, No. 4, Jul. 26, 2010, Article No. 127, 9 pgs.

(56) References Cited

OTHER PUBLICATIONS

Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "KNN matting", 2012 IEEE Conference on Computer Vision and Pattern Recognition, Jun. 16-21, 2012, Providence, RI, USA, pp. 869-876.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic practice", Journal of Vision, vol. 12, No. 5, Article 8, May 25, 2012, pp. 1-14.
Gastal et al., "Shared Sampling for Real-Time Alpha Matting", Computer Graphics Forum, EUROGRAPHICS 2010, vol. 29, Issue 2, May 2010, pp. 575-584.
Extended European Search Report for European Application No. 18151530.5, completed Mar. 28, 2018, dated Apr. 20, 2018, 11 pages.

\* cited by examiner

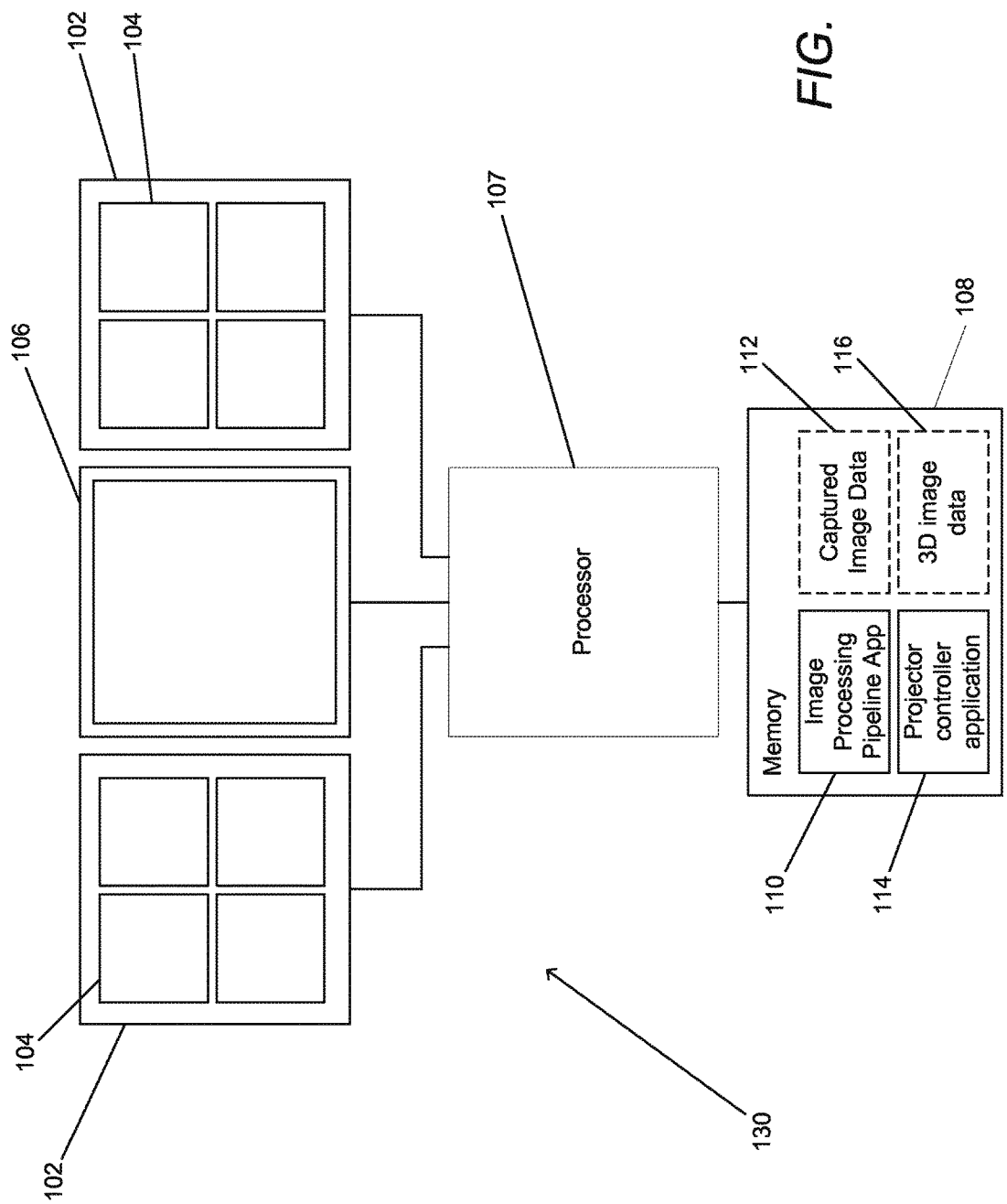

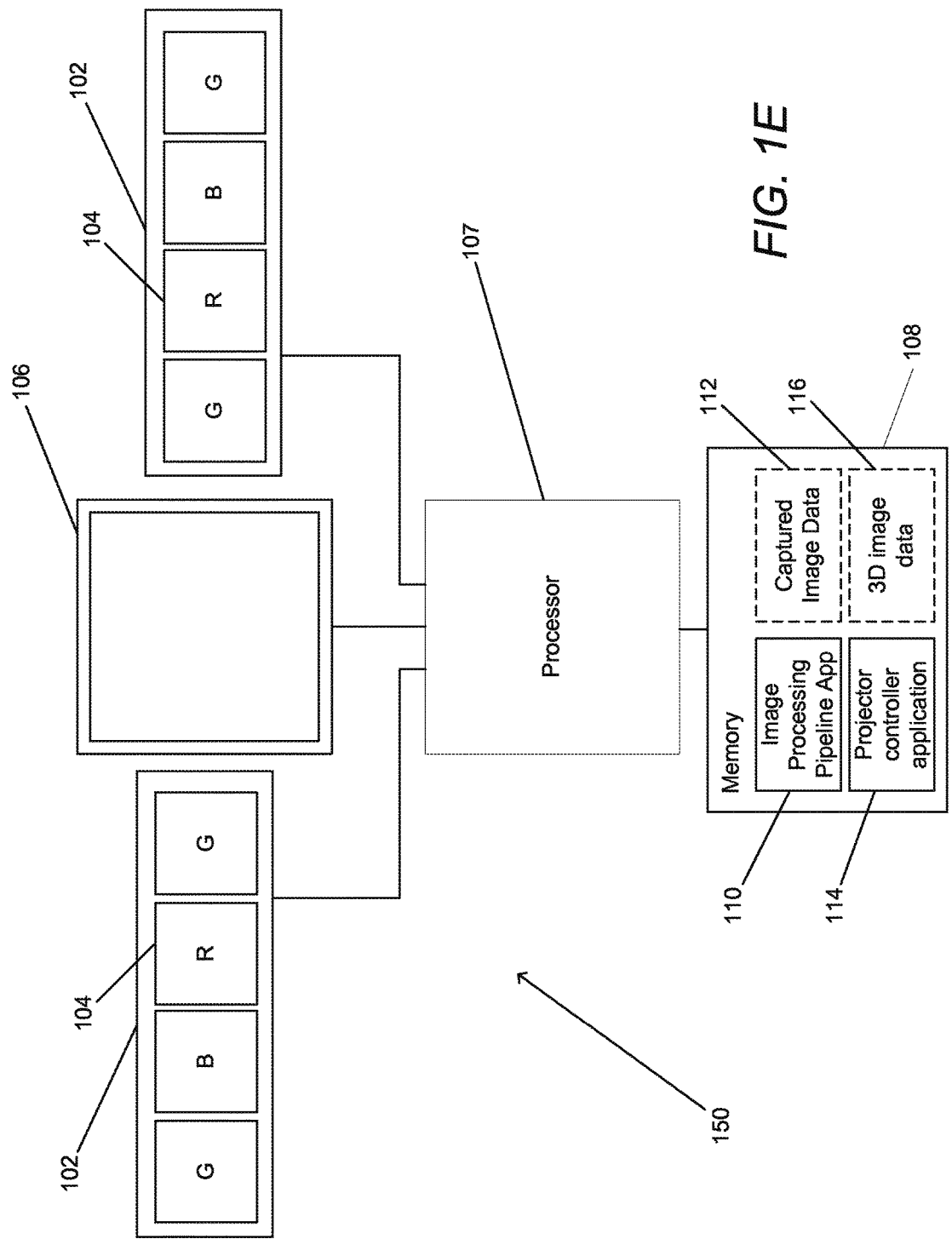

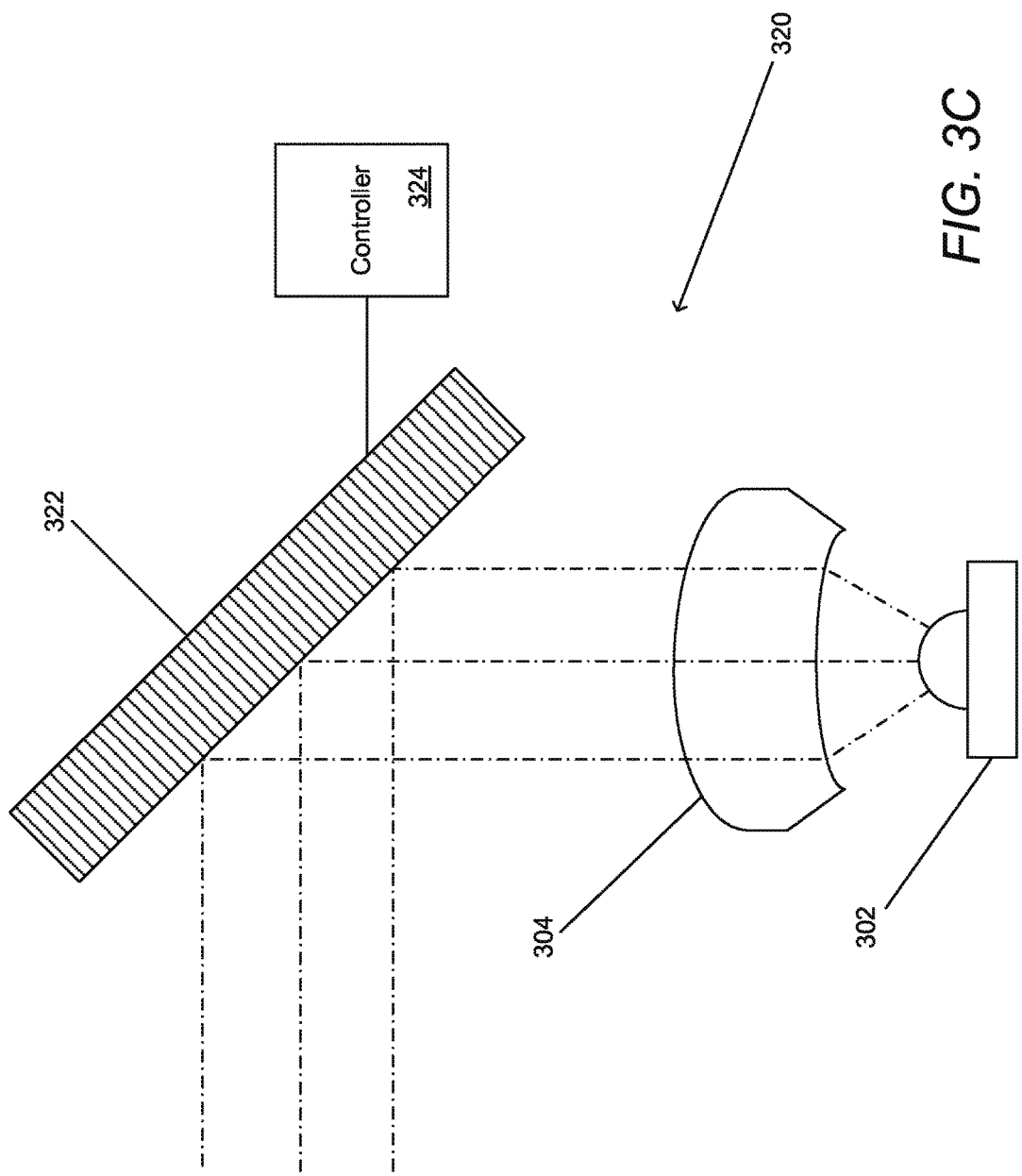

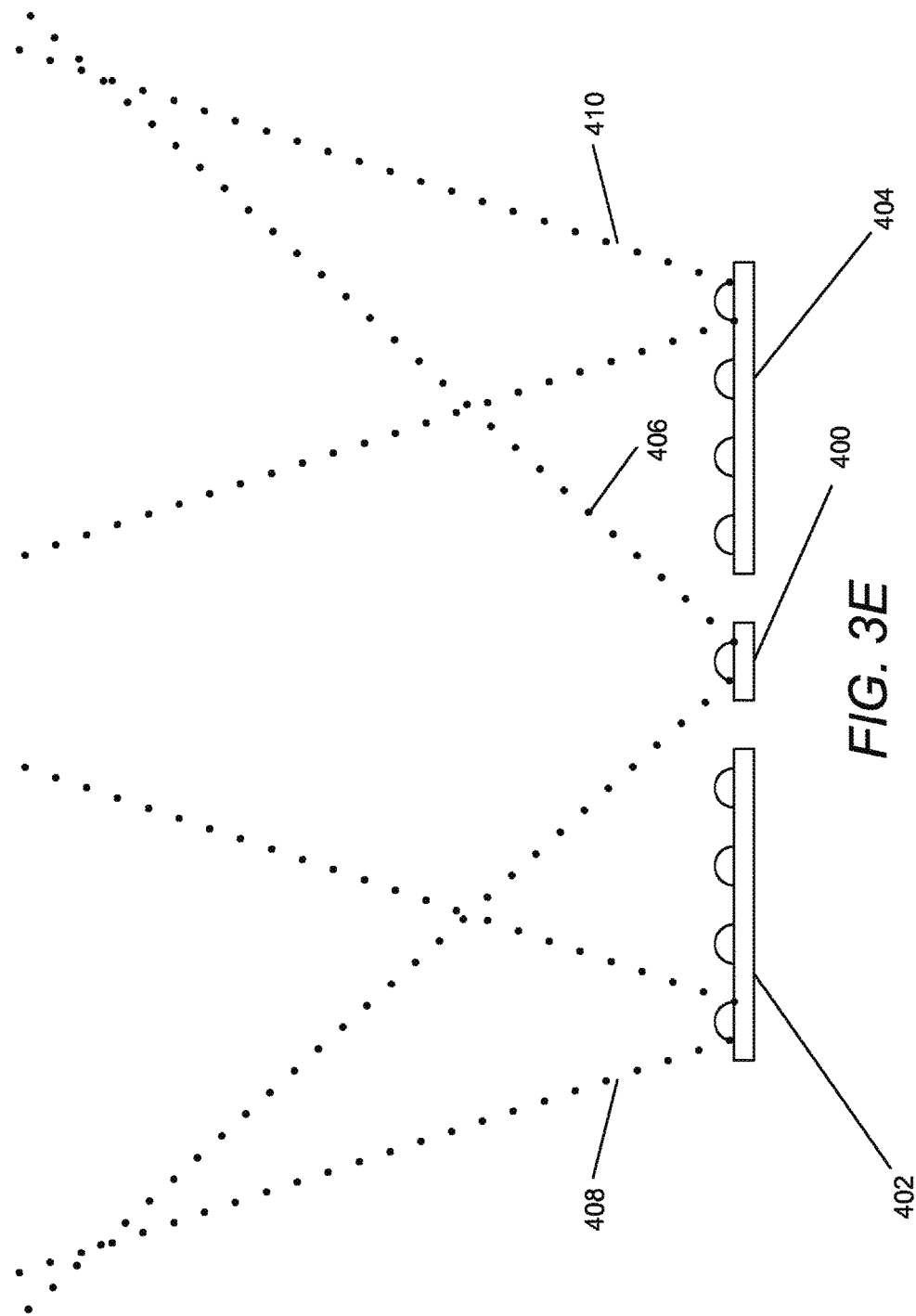

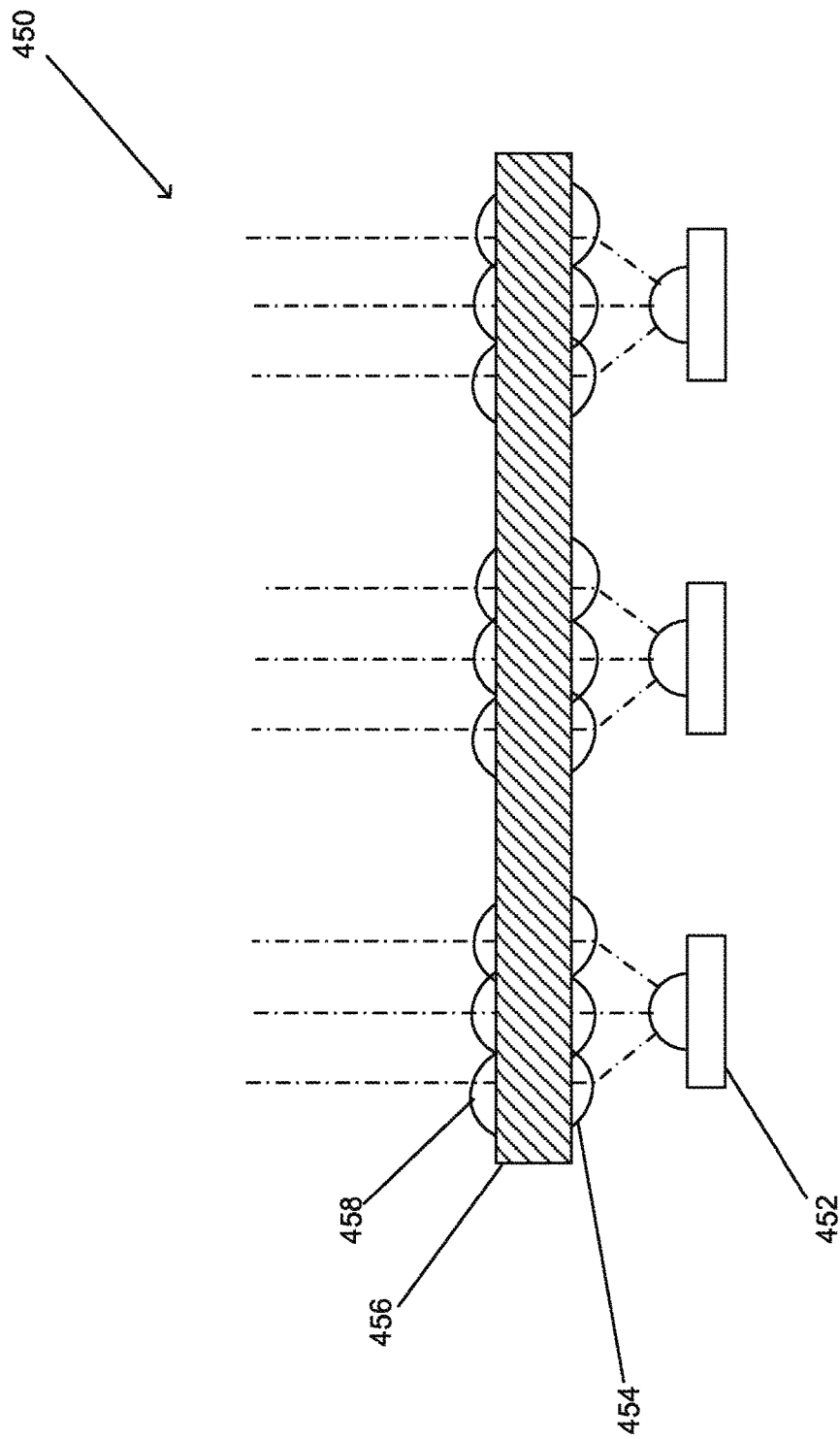

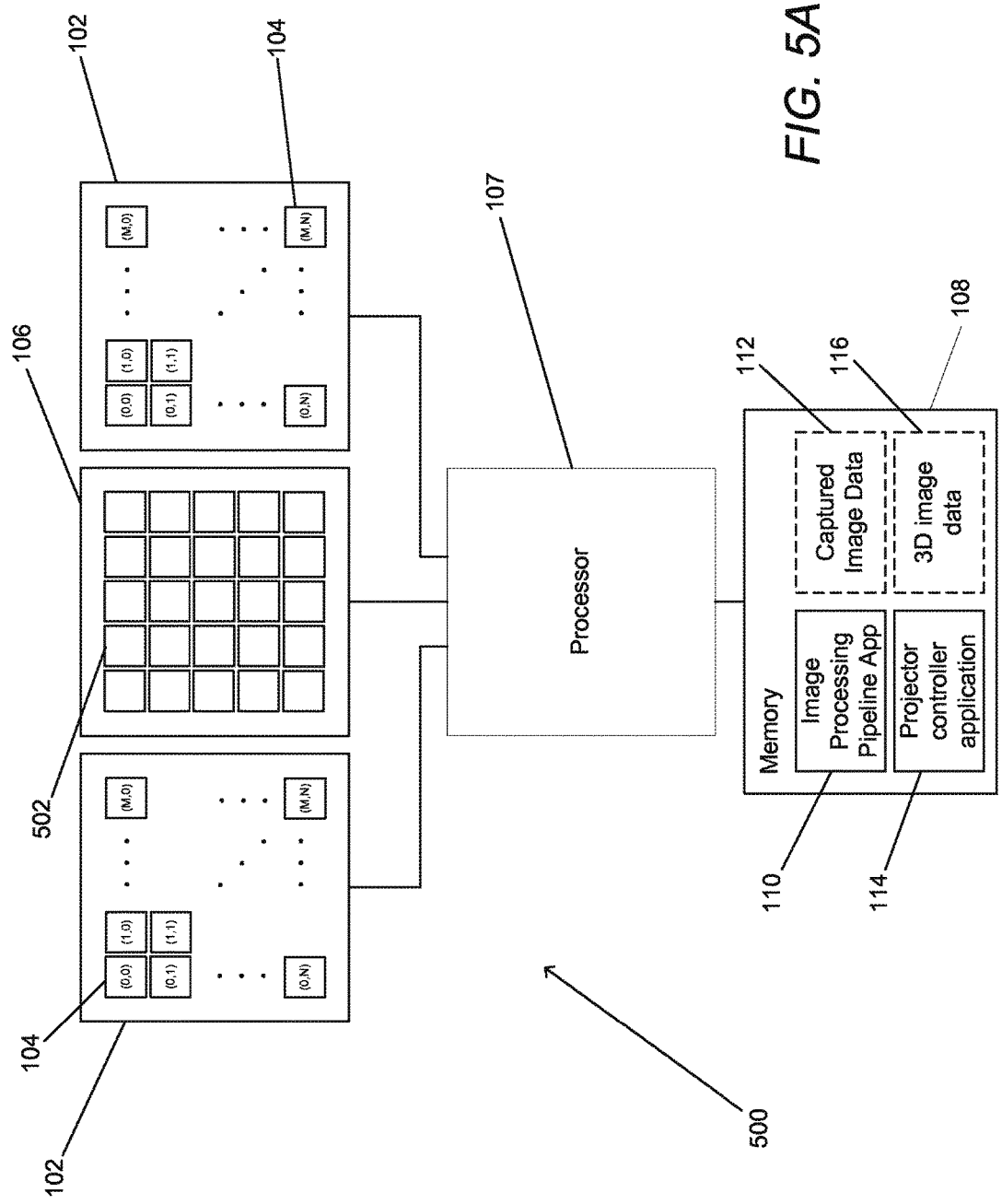

SYSTEMS AND METHODS FOR ESTIMATING DEPTH FROM PROJECTED TEXTURE USING CAMERA ARRAYS

CROSS-REFERENCE TO RELATED APPLICATIONS

The current application claims priority under 35 U.S.C. § 119(e) to U.S. Provisional Patent Application No. 61/905,423, entitled "Structured Lighting System for Depth Acquisition in Texture-less Regions using Camera Arrays" filed Nov. 18, 2013, the disclosure of which is incorporated herein by reference.

FIELD OF THE INVENTION

The present application relates generally to the use of multi-baseline stereo systems to perform depth estimation and more specifically to the use of projected texture multi-baseline stereo systems for performing depth estimation.

BACKGROUND OF THE INVENTION

Camera arrays are typically passive depth acquisition devices that rely on texture in the scene to estimate depth. In image processing, the term texture or image texture is used to describe spatial arrangement of color or intensities in a region of an image. A region is considered to have texture when there is significant variation in color and/or intensity within the region. A region is said to be textureless when color and/or intensity are uniform or vary gradually. Disparity estimation processes used in multi-baseline stereo systems and camera arrays find correspondences between features visible in a set of images captured by the cameras in the system to determine depth. While this works for scenes with texture, depth estimation can fail in regions of a scene that lack texture due to insufficient features in the scene from which to determine pixel correspondences. Other depth cues can be used to compensate for an inability to recover depth based upon disparity including (but not limited to) shape from shading, depth from defocus, or other photogrammetry cues to determine depth in such flat (i.e. textureless) regions.

In a research report published in May of 1984 by the Artificial Intelligence Laboratory of the Massachusetts Institute of Technology entitled "PRISM: A Practical Real-Time Imaging Stereo Matcher" by Nishihara (A.I. Memo 780), a process for determining depth using binocular stereo in which a scene is illuminated with an unstructured texture pattern by a projector is disclosed. The illumination is intended to provide suitable matching targets on surfaces in which surface contrast is low compared with sensor noise and other inter-image distortions. The disclosed process illuminates the scene with a random pattern and the depth estimation process assumes no a priori knowledge of the illumination pattern.

Following the publication of the research report by the Artificial Intelligence Laboratory of the Massachusetts Institute of Technology, a number of research groups have observed that use of random projected patterns with binocular stereo cameras can lead to regions of depth ambiguity due to the projected pattern being too self-similar in specific regions of the projected pattern. Accordingly, alternative projection patterns have been proposed to avoid self-similar regions. J. Lim, "Optimized projection pattern supplementing stereo systems," in *ICRA*, 2009 proposes utilizing patterns generated using De Bruijn sequences and K. Klonige, "Projected Texture Stereo," in *ICRA*, 2010 proposes utilizing patterns generated based upon Hamming codes.

SUMMARY OF THE INVENTION

Systems and methods in accordance with embodiments of the invention estimate depth from projected texture using camera arrays. One embodiment of the invention includes: at least one two-dimensional array of cameras comprising a plurality of cameras; an illumination system configured to illuminate a scene with a projected texture; a processor; and memory containing an image processing pipeline application and an illumination system controller application. In addition, the illumination system controller application directs the processor to control the illumination system to illuminate a scene with a projected texture. Furthermore, the image processing pipeline application directs the processor to: utilize the illumination system controller application to control the illumination system to illuminate a scene with a projected texture capture a set of images of the scene illuminated with the projected texture; determining depth estimates for pixel locations in an image from a reference viewpoint using at least a subset of the set of images. Also, generating a depth estimate for a given pixel location in the image from the reference viewpoint includes: identifying pixels in the at least a subset of the set of images that correspond to the given pixel location in the image from the reference viewpoint based upon expected disparity at a plurality of depths along a plurality of epipolar lines aligned at different angles; comparing the similarity of the corresponding pixels identified at each of the plurality of depths; and selecting the depth from the plurality of depths at which the identified corresponding pixels have the highest degree of similarity as a depth estimate for the given pixel location in the image from the reference viewpoint.

In a further embodiment, the at least one two-dimensional array of cameras comprises at least two two-dimensional arrays of cameras located in complementary occlusion zones surrounding the illumination system.

In another embodiment, a portion of a scene that is occluded in the field of view of at least one camera in a first of the two-dimensional arrays of cameras is visible in a plurality of cameras in a second of the arrays of cameras, where the first and second arrays of cameras are located in complementary occlusion zones on opposite sides of the illumination system.

In still further embodiment, the at least two two-dimensional arrays of cameras comprises a pair of two-dimensional arrays of cameras located in complementary occlusion zones on either side of the illumination system.

In still another embodiment, each array of cameras is a 2×2 array of monochrome cameras.

In a yet further embodiment, the projected texture includes a first spatial pattern period in a first direction and a second larger spatial pattern period in a second direction.

In yet another embodiment, the at least one two-dimensional array of cameras comprises one two-dimensional array of cameras including a plurality of lower resolution cameras and at least one higher resolution camera.

In a further embodiment again, the two-dimensional array of cameras comprises at least one lower resolution camera located above, below, to the left, and to the right of the higher resolution camera.

In another embodiment again, the higher resolution camera includes a Bayer filter pattern and the lower resolution cameras are monochrome cameras.

In a further additional embodiment, the image processing pipeline application configures the higher resolution camera to capture texture information when the illumination system is not illuminating the scene using the projected pattern.

In another additional embodiment, the projected texture includes a first spatial pattern period in a first direction and a second larger spatial pattern period in a second direction.

In a still yet further embodiment, the illumination system is a static illumination system configured to project a fixed pattern In still yet another embodiment, the illumination system is a dynamic illumination system configured to project a controllable pattern; and the illumination system controller application directs the processor to control the pattern projected by the illumination system.

In a still further embodiment again, the illumination system includes a spatial light modulator selected from the group consisting of a reflective liquid crystal on silicon microdisplay and a translucent liquid crystal microdisplay.

In still another embodiment again, the image processing pipeline application directs the processor to: utilize the illumination system controller application to control the illumination system to illuminate a scene with a first projected texture; capture a first set of images of the scene illuminated with the first projected texture; determine initial depth estimates for pixel locations in an image from a reference viewpoint using at least a subset of the first set of images; utilize the illumination system controller application to control the illumination system to illuminate a scene with a second projected texture selected based upon at least one initial depth estimate for a pixel location in an image from a reference viewpoint; capture a second set of images of the scene illuminated with the second projected texture; and determine updated depth estimates for pixel locations in an image from a reference viewpoint using at least a subset of the first set of images.

In a still further additional embodiment, the spatial pattern period of the second projected texture at the at least one initial depth estimate for a pixel location in an image from a reference viewpoint is higher than the spatial resolution of the plurality of cameras at the at least one initial depth estimate for a pixel location in an image from the reference viewpoint.

In still another additional embodiment, the illumination system comprises an array of projectors.

In a yet further embodiment again, the array of projectors comprises projectors configured to project different patterns.

In yet another embodiment again, the different patterns comprise patterns having different spatial pattern periods.

In a further additional embodiment again, the projectors are configured to project controllable patterns; and the illumination system controller application directs the processor to control the patterns projected by the illumination system.

In another additional embodiment again, the projected pattern is random.

In another further embodiment, the projected pattern includes a smaller spatial pattern period in a first direction and a larger spatial pattern period in a second direction perpendicular to the first direction.

In still another further embodiment, the image processing pipeline application directs the processor to: utilize the illumination system controller application to control the illumination system to illuminate a scene with a projected texture; capture a first set of images of the scene illuminated with the projected texture; determining depth estimates for pixel locations in an image from a first reference viewpoint using at least a subset of the first set of images; utilize the illumination system controller application to control the illumination system to prevent the illumination of the scene with the projected texture; capture at least one image of the scene in which the natural texture of the scene is visible; and collocate natural texture and depth information for the scene.

In yet another further embodiment, the image processing pipeline application directs the processor to collocate natural texture and depth information for the scene by assuming that the first set of images and the at least one image are captured from the same viewpoint.

In another further embodiment again, at least one image of the scene in which the natural texture of the scene is visible is part of a second set of images of the scene in which the natural texture of the scene is visible. In addition, the image processing pipeline application further directs the processor to determining depth estimates for pixel locations in an image from a second reference viewpoint using at least a subset of the second set of images. Furthermore, the image processing pipeline application directs the processor to collocate natural texture and depth information for the scene by: identifying similar features in depth maps generated using the first and second sets of images; estimate relative pose using the similar features; and reprojecting depth estimates obtained using the first set of information into the second reference viewpoint.

In another further additional embodiment, the image processing pipeline application directs the processor to composite reprojected depth estimates generated using the first set of images and depth estimates generated using the second set of images based upon information concerning the reliability of the depth estimates.

Still yet another further embodiment includes: at least a pair of arrays of cameras located in complementary occlusion zones on either side of the illumination system, where each array of cameras comprises a plurality of cameras; an illumination system configured to illuminate a scene with a projected texture; a processor; and memory containing an image processing pipeline application and an illumination system controller application. In addition, the illumination system controller application directs the processor to control the illumination system to illuminate a scene with a projected texture. Furthermore, the image processing pipeline application directs the processor to: utilize the illumination system controller application to control the illumination system to illuminate a scene with a projected texture; capture a set of images of the scene illuminated with the projected texture; determining depth estimates for pixel locations in an image from a reference viewpoint using at least a subset of the set of images. Also, generating a depth estimate for a given pixel location in the image from the reference viewpoint includes: identifying pixels in the at least a subset of the set of images that correspond to the given pixel location in the image from the reference viewpoint based upon expected disparity at a plurality of depths along a plurality of epipolar lines aligned at different angles; comparing the similarity of the corresponding pixels identified at each of the plurality of depths; and selecting the depth from the plurality of depths at which the identified corresponding pixels have the highest degree of similarity as a depth estimate for the given pixel location in the image from the reference viewpoint.

BRIEF DESCRIPTION OF THE DRAWINGS

FIG. 1C conceptually illustrates a camera array that utilizes two 2×2 arrays of monochrome cameras located in complementary occlusion zones on either size of an illumination system in accordance with an embodiment of the invention.

FIG. 1E conceptually illustrates a camera array including two 1×4 linear arrays of cameras located in complementary occlusion zones on either side of an illumination system, where each of the 1×4 linear arrays 102 of cameras 104 includes two Green cameras, one Red camera, and one Blue camera, in accordance with an embodiment of the invention.

FIG. 3C conceptually illustrates an illumination system including a reflective spatial light modulator system.

FIG. 3E conceptually illustrates the comparative field of view onto which an illumination system projects light and the fields of view of cameras in a camera array.

FIG. 4C conceptually illustrates a projector array formed by a plurality of LEDS.

FIGS. 5A-5I illustrate camera array systems corresponding to the camera array systems illustrated in FIGS. 1A-1I with the exception that the illumination systems include an array of projectors.

DETAILED DISCLOSURE OF THE INVENTION

Figure 1A:
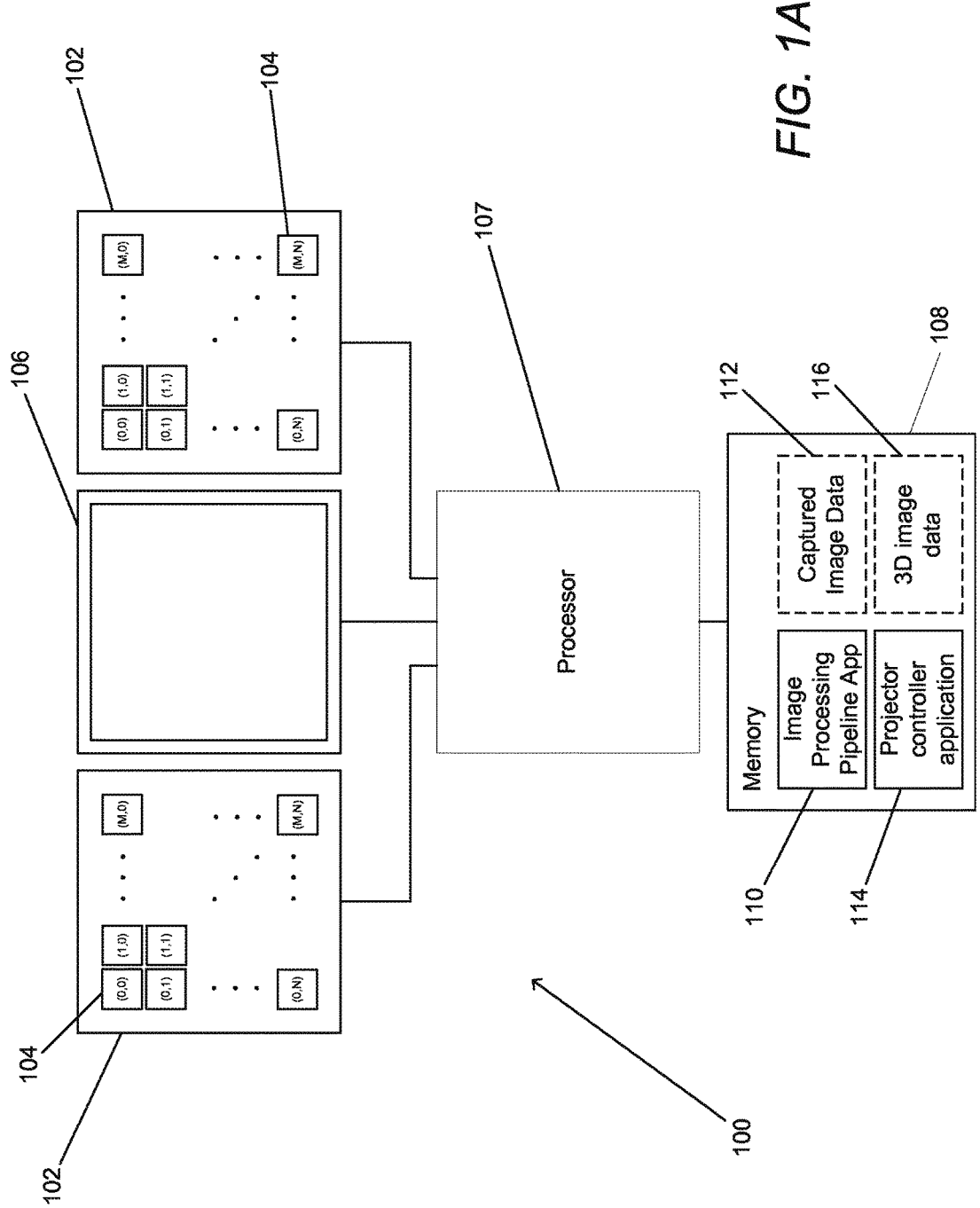
FIG. 1A conceptually illustrates a camera array including a pair of arrays of cameras that each include an M×N arrays in accordance with an embodiment of the invention.

Turning now to the drawings, systems and methods for estimating depth from projected texture using camera arrays in accordance with embodiments of the invention are illustrated. In several embodiments, a camera array is used to perform three-dimensional scanning of an object illuminated by a projected texture. In other embodiments, the camera array is configured to capture a depth map of a scene illuminated by a projected texture.

In many embodiments, a two dimensional array of cameras is utilized to capture a set of images of a scene illuminated by a projected texture and depth is estimated by performing disparity searches using the set of images. Corresponding pixels in the set of images captured by the cameras in the two dimensional array of cameras are located on different epipolar lines. When a random projection pattern is used, depth estimates can be unreliable where regions along an epipolar line are self-similar. With each increase in the number of different epipolar lines searched, the likelihood that a random projected pattern will be self-similar at each of the corresponding locations along the epipolar lines decreases.

In several embodiments, multiple cameras in the camera array are located in complementary occlusion zones around an illumination system so that depth estimates can be obtained when a projected pattern is occluded from the field of view of cameras located on one side of the illumination system by a foreground object. By distributing multiple cameras on either side of the illumination system, multiple cameras see the projected pattern in a region occluded from the fields of view of other cameras in the array. Therefore, depth estimates can be made using the subset of the images captured by the camera array in which the projected pattern is visible (i.e. unoccluded). In certain embodiments, the baseline between the camera arrays is larger than the baseline between cameras within a camera array. Accordingly, disparity observed along a first epipolar line will be significantly greater than disparity observed along a second (perpendicular) epipolar line. Therefore, a projected pattern can be utilized that incorporates a smaller spatial pattern period in a direction corresponding to the second epipolar line. For example, a pattern with a larger horizontal spatial pattern period than the vertical spatial pattern period can be utilized with a camera array in which a wide horizontal baseline exists between a pair of two-dimensional arrays of cameras and the largest vertical baseline between cameras in a two-dimensional array of cameras is significantly smaller than the horizontal baseline. In other embodiments, differences in spatial pattern periods can be employed along different axes within a projected pattern as appropriate to the requirements of a specific application.

In certain embodiments, a camera array including a set of lower resolution cameras and at least one higher resolution camera is utilized in combination with an illumination system. As is discussed in detail in U.S. Patent 2011/0069189 entitled "Capturing and Processing of Images Using Monolithic Camera Array with Heterogeneous Imagers" to Venkataraman et al. camera arrays can include cameras having different lenses and different resolutions. An array of lower resolution cameras can be utilized to estimate depth (irrespective of whether cameras in the array are located in complementary occlusion zones around the projector) and the higher resolution camera(s) utilized to acquire color information. In several embodiments, the lower resolution cameras are located in complementary occlusion zones around the higher resolution camera. In a number of embodiments at least one lower resolution camera is located above, below, to the left and to the right of the higher resolution camera.

A variety of illumination systems can be utilized to project texture. In several embodiments, static illumination systems are utilized that project a fixed pattern. In a number of embodiments, dynamic illumination systems are utilized in which the projected pattern is controllable. As discussed further below, camera arrays in accordance with many embodiments of the invention can control the projected pattern so that the spatial pattern period of the projected texture is selected to provide the greatest depth estimation precision at the depths at which objects are observed in the scene. In certain embodiments, an illumination system incorporating an array of projectors is utilized. In several embodiments, the projector array projects a fixed pattern. In other embodiments, the pattern projected by the projector array is controllable so that the spatial resolution of the intensity contrast is selected to provide the greatest depth estimation precision at the depths at which objects are observed in the scene. In a number of embodiments, the focal length of a projector in the illumination system is adjustable to coordinate spatial pattern period with the distance to an object within the scene.

Camera arrays that estimate depth using projected texture in accordance with embodiments of the invention are discussed further below.

Camera Arrays Incorporating Projectors

Passive depth acquisition systems, such as the camera arrays described in U.S. Pat. No. 8,619,082 entitled "Systems and Methods for Parallax Detection and Correction in Images Captured Using Array Cameras that Contain Occlusions using Subsets of Images to Perform Depth Estimation" to Ciurea et al., have a depth accuracy that is fundamentally dependent on three aspects of the camera array: (i) camera array geometry including (but not limited to) the baseline separation between the cameras in the array; (ii) focal length of the camera lenses; and (iii) pixel size of the sensors in each of the cameras. The relevant portions of U.S. Pat. No. 8,619,082 concerning depth estimation using sets of images is hereby incorporated by reference herein in its entirety. Generally, the accuracy of depth estimates made by performing disparity searches with respect to images captured by a camera array falls away inversely with distance of an object from the camera array. Illumination systems utilized in combination with camera arrays in accordance with many embodiments of the invention project texture so that, at any given distance from the camera array, the spatial density of contrasting intensities within the projected texture is no higher than the error in the depth generated by the disparity estimation algorithm at that distance. Stated another way, transitions between contrasting intensities in the projected texture are observable over two or more pixels. Where transitions between contrasting intensities in a projected texture have a spatial density that is higher than the spatial resolution of the cameras in the camera array, the images captured by the cameras in the array will average the projected texture with the result that the projected texture is less useful for performing depth estimation. In a number of embodiments, the illumination system is controllable so that the spatial density of projected texture is programmable. In this way, the projected texture can be dynamically configured based upon the distance of objects being illuminated.

A variety of camera arrays incorporating illumination systems in accordance with embodiments of the invention are illustrated in FIGS. 1A-1I and 5A-5I. The camera array 100 illustrated in FIG. 1A includes a pair of arrays 102 of cameras 104 that each include an M×N arrays of cameras 104. The camera arrays 102 are located in complementary occlusion zones on either size of an illumination system 106. The camera arrays 102 and the illumination system 106 are controlled and communicate with a processor 107. The processor is also configured to communicate with one or more different types of memory 108 that can be utilized to store an image processing pipeline application 110, image data 112 captured by the camera arrays 102, a projector controller application 114 and 3D image data 116. As is discussed further below, the 3D image data can include (but is not limited to) depth maps, meshes, color information, texture information, and/or point clouds. In many embodiments, the camera array is used as a 3D scanner to build a point cloud. In other embodiments, the camera array is used to capture images and/or video of a scene and corresponding depth maps.

A problem that can be encountered using an illumination system to project texture onto a scene for the purpose of performing depth estimation is that portions of the scene can be occluded in the field of view of one or more cameras in the camera array. Furthermore, foreground objects can occlude portions of the scene so that portions of the scene that are not illuminated by projected texture are visible within the field of view of one or more cameras in the camera array. In several embodiments, multiple cameras are located in complementary occlusion zones on either side of the projector. In this way, a portion of the scene that is not visible within the field of view of one or more cameras on a first side of the projector is visible within the field of view of multiple cameras on the opposite side of the projector.

Figure 1B:
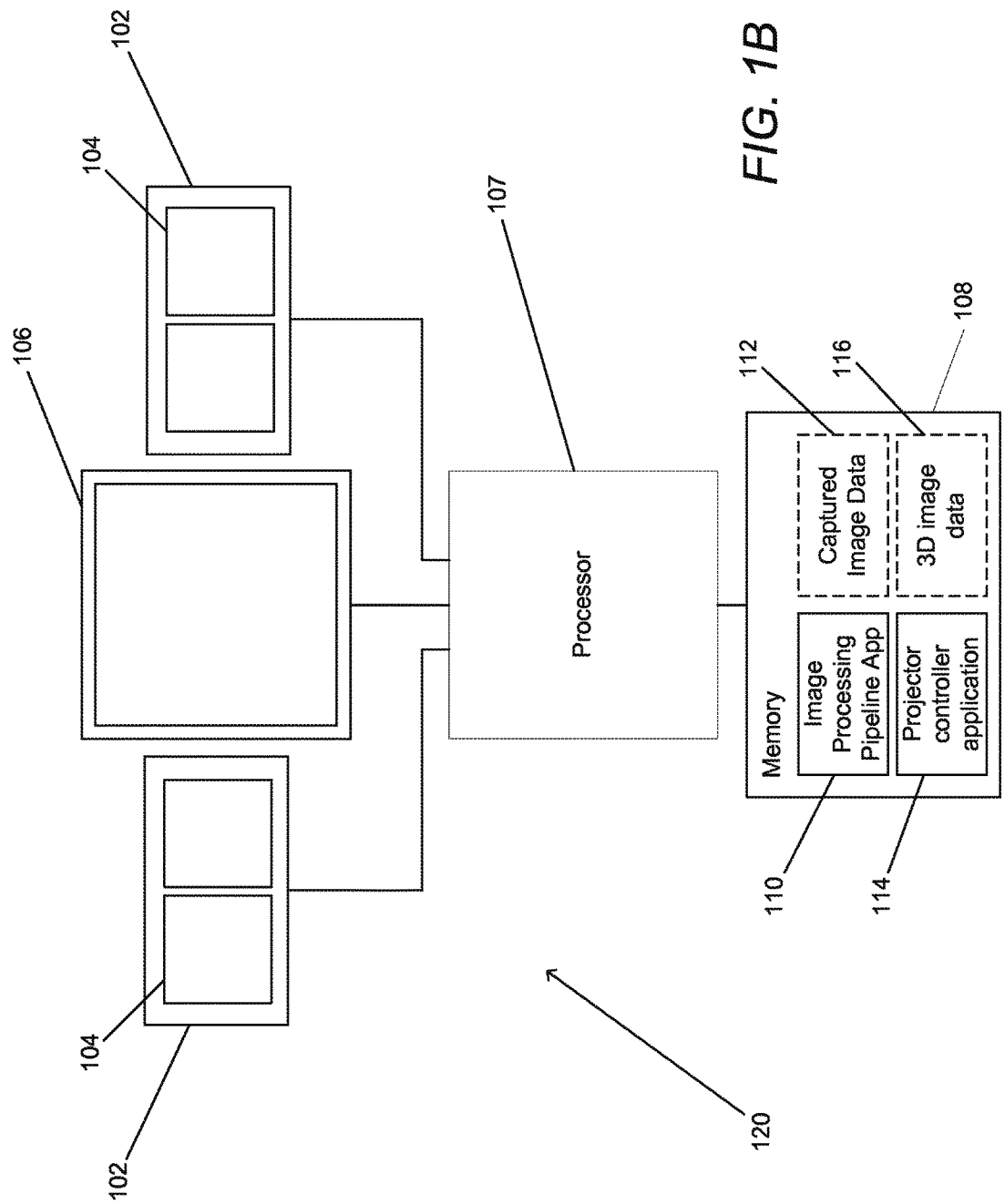
FIG. 1B conceptually illustrates a camera array including two arrays of cameras located on either side of an illumination system, where the arrays of cameras each include two monochrome cameras 104 in accordance with an embodiment of the invention.

When monochrome cameras are utilized to estimate depth, as few as two cameras can be located in complementary occlusion zones on either side of the projector. A camera array 120 including two arrays of cameras 102 located on either side of an illumination system 106, where the arrays of cameras each include two monochrome cameras 104 is illustrated in FIG. 1B. Suitable monochrome cameras include, but are not limited to, monochrome cameras that image the visible spectrum, monochrome cameras that image portions of the infrared (IR) spectrum, and/or monochrome cameras that image portions of the visible spectrum and portions of the IR spectrum.

In many embodiments, two dimensional arrays of cameras are utilized in complementary occlusion zones surrounding the illumination system. Estimating depth using a set of images captured by a linear array of cameras typically involves performing disparity searches along epipolar lines aligned at the same angle. As is discussed further below with reference to FIGS. 2A and 2B, estimating depth using a set of images captured by a two dimensional array of cameras typically involves performing disparity searches along epipolar lines aligned at different angles. When the illumination system 106 generates a random pattern, the likelihood that self-similar patches will exist in corresponding locations along multiple epipolar lines aligned at different angles is less likely than the case involving performing disparity searches along epipolar lines aligned at the same angle. Accordingly, the use of two dimensional arrays of cameras located in complementary occlusion zones around an illumination system can significantly enhance depth estimation performance. A camera array 130 that utilizes two 2×2 arrays 102 of monochrome cameras 104 located in complementary occlusion zones on either size of an illumination system 106 in accordance with an embodiment of the invention is illustrated in FIG. 1C. As noted above with respect to FIG. 1A, camera arrays in accordance with many embodiments of the invention can include any number of cameras in linear arrays and two-dimensional arrays located in complementary occlusion zones on either side of an illumination system.

The camera arrays described above with reference to FIGS. 1B and 1C include monochrome cameras. In several embodiments, the camera arrays can include cameras that image in multiple spectral channels such as (but not limited to) cameras that employ Bayer filters. In many embodiments, the arrays of cameras located in complementary occlusion zones on either side of an illumination system include different types of cameras. For example, cameras that capture different color channels can be located in each of the groups of cameras. So long as multiple cameras that capture image data in one color channel are located in each the complementary occlusion zones, then depth estimation can be performed within regions of the image that are occluded by foreground objects.

Figure 1D:
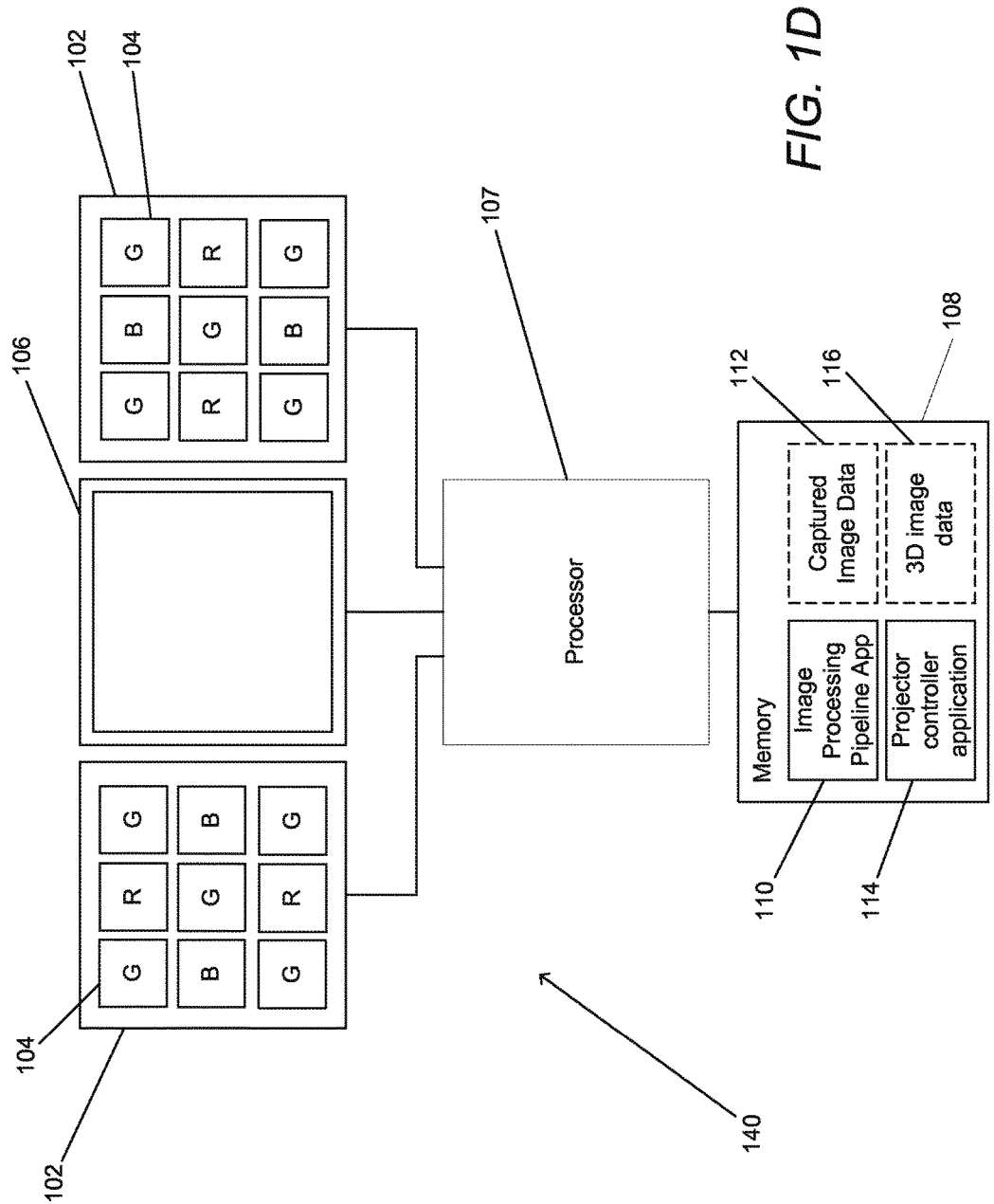
FIG. 1D conceptually illustrates a camera array including two 3×3 arrays of cameras located in complementary occlusion zones on either side of an illumination system, where each of the 3×3 arrays 102 of cameras forms a Tr filter group, in accordance with an embodiment of the invention.

A camera array 140 including two 3×3 arrays 102 of cameras 104 located in complementary occlusion zones on either side of an illumination system 106, where each of the 3×3 arrays 102 of cameras forms a π filter group is illustrated in FIG. 1D. Each 3×3 array of cameras includes a central Green camera, a pair of Blue cameras and Red cameras in complementary occlusion zones on either side of the central Green camera and four Green cameras. In the illustrated embodiment, the pairs of Red and Blue cameras are in alternate complementary occlusion zones in each of the two arrays of cameras. In other embodiments, the same configuration of cameras can be utilized in each π filter group. While specific π filter groups are descried above with reference to FIG. 1D, π filter groups that include a variety of different types of cameras including (but not limited to) central Bayer cameras, and central near-IR cameras are described in detail in U.S. Patent Publication No. 2013/0293760 entitled "Camera Modules Patterned with pi Filter Groups", to Nisenzon et al., the relevant disclosure from which concerning arrangements of cameras including different spectral filters in camera arrays is hereby incorporated by reference herein in its entirety.

A camera array 150 including two 1×4 linear arrays 102 of cameras 104 located in complementary occlusion zones on either side of an illumination system 106, where each of the 1×4 linear arrays 102 of cameras 104 includes two Green cameras, one Red camera, and one Blue camera, in accordance with an embodiment of the invention is illustrated in FIG. 1E. As can readily be appreciated, the number of cameras included in each linear array depends upon the number of spectral channels imaged by the camera array 150 and can include multiple cameras in each spectral channel located in each of the complementary occlusion zones as appropriate to the requirements of specific applications.

Figure 1F:
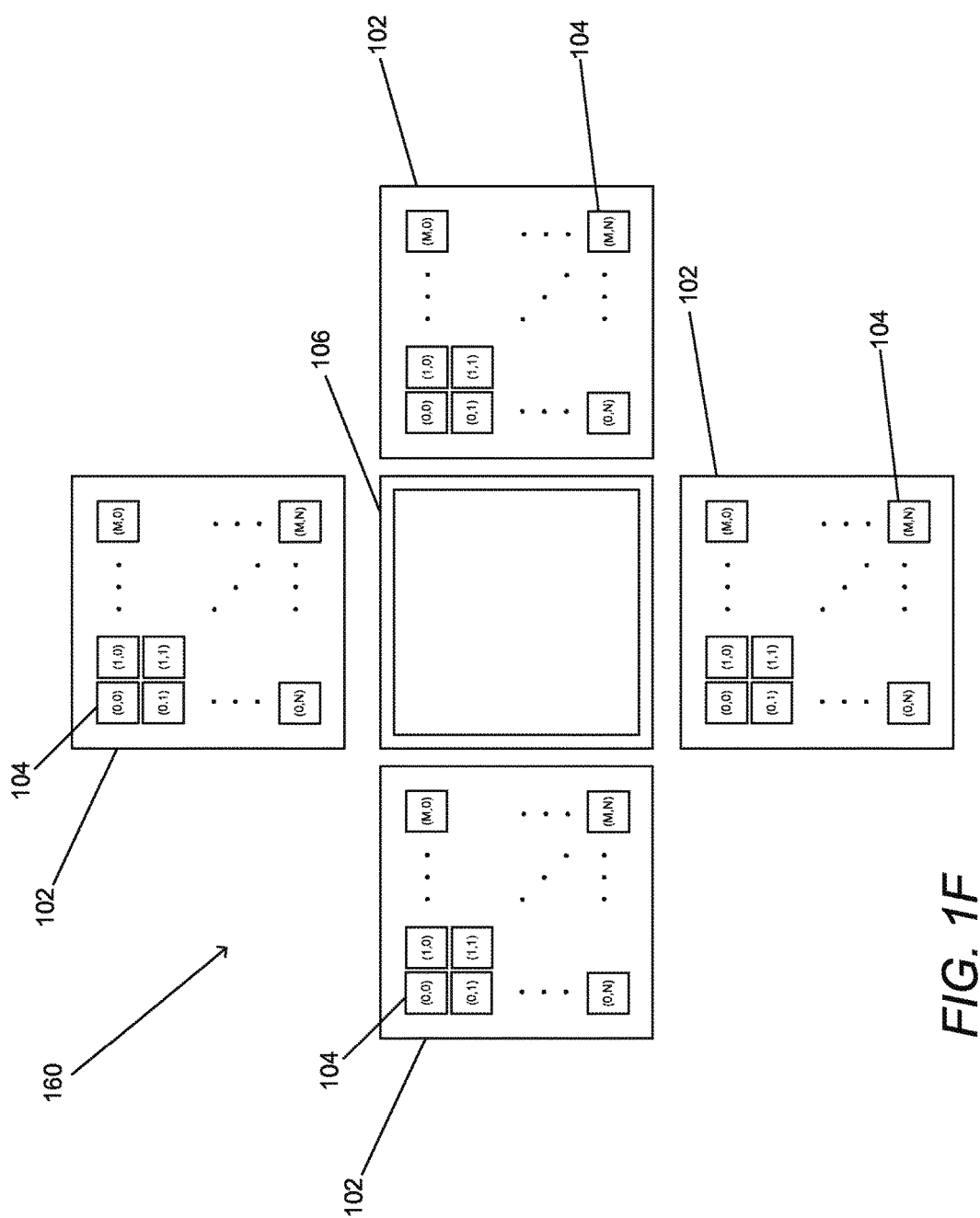
FIG. 1F conceptually illustrates a camera array including four arrays of cameras located in two pairs of complementary occlusion zones surrounding an illumination system in accordance with an embodiment of the invention.

While the camera arrays described above with respect to FIGS. 1A-1E involve placement of arrays of cameras in complementary occlusion zones on either side of an illumination system, camera arrays in accordance with many embodiments of the invention can include multiple cameras placed in multiple sets of complementary occlusion zones surrounding an illumination system. A camera array 160 including four arrays 102 of cameras 104 located in two pairs of complementary occlusion zones surrounding an illumination system 106 is illustrated in FIG. 1F. In other embodiments, the illumination system can be completely surrounded or ringed by cameras. In several embodiments, cameras are placed in a single ring surrounding the illumination system so that the cameras form pairs of cameras in complementary occlusion zones on opposite sides of the ring. In many embodiments, the ring includes at least eight cameras. In certain embodiments, the ring includes at least 12 cameras. As can readily be appreciated, the number of cameras and the placement of the cameras in complementary occlusion zones surrounding the illumination system is largely dependent upon the requirements of a specific application.

Figure 1G:
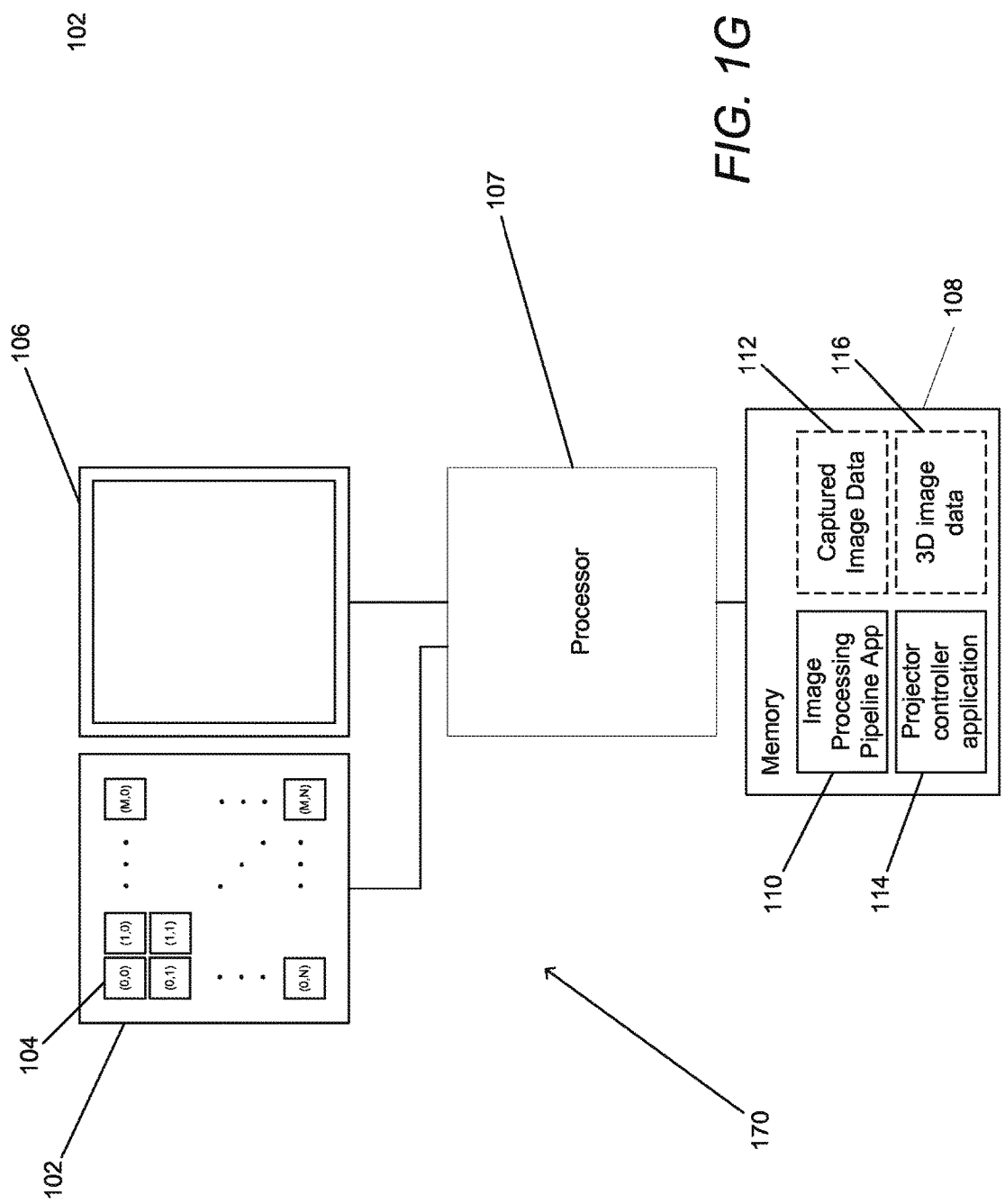
FIG. 1G conceptually illustrates a camera array including a single array of cameras and a single illumination system in accordance with an embodiment of the invention.

While the placement of multiple cameras in complementary occlusion zones surrounding an illumination system can be desirable in many applications, camera arrays incorporating illumination systems for projecting texture in accordance with a number of embodiments of the invention can include cameras that are not located in complementary occlusion zones. Significant performance improvements can be achieved by simply pairing a single two-dimensional camera array with an illumination system (particularly in 3D scanning applications where occlusions are less of a concern). A camera array 170 including a single array 102 of cameras 104 and a single illumination system 106 in accordance with an embodiment of the invention is illustrated in FIG. 1G. As noted above and discussed further below with reference to FIGS. 2A and 2B, estimating depth using a set of images captured by a two dimensional array of cameras typically involves performing disparity searches along epipolar lines aligned at different angles. When the illumination system 106 generates a random pattern, the likelihood that self-similar patches will exist in corresponding locations along multiple epipolar lines aligned at different angles is less likely than the case involving performing disparity searches along epipolar lines aligned at the same angle. Accordingly, the use of a two dimensional array of cameras can significantly enhance depth estimation performance relative to the depth estimation performance achieved using a binocular pair. While a binocular pair will fail when a portion of the scene is occluded in the field of view of one of the cameras, the same is not necessarily true with a two dimensional array of cameras (depending upon the size of the two dimensional array). To the extent that foreground objects prevent portions of the scene from being illuminated with the projected texture, the camera array can attempt to perform depth estimation using the texture inherent to the scene and/or accommodate high uncertainty depths where insufficient texture is available. The same approach can be utilized by camera arrays that incorporate multiple cameras in complementary occlusion zones. Alternatively, such camera arrays can attempt to estimate depth from a virtual viewpoint collocated with the illumination system. In this way, only portions of the scene on which texture is projected are within the field of view of the virtual viewpoint.

Figure 1H:
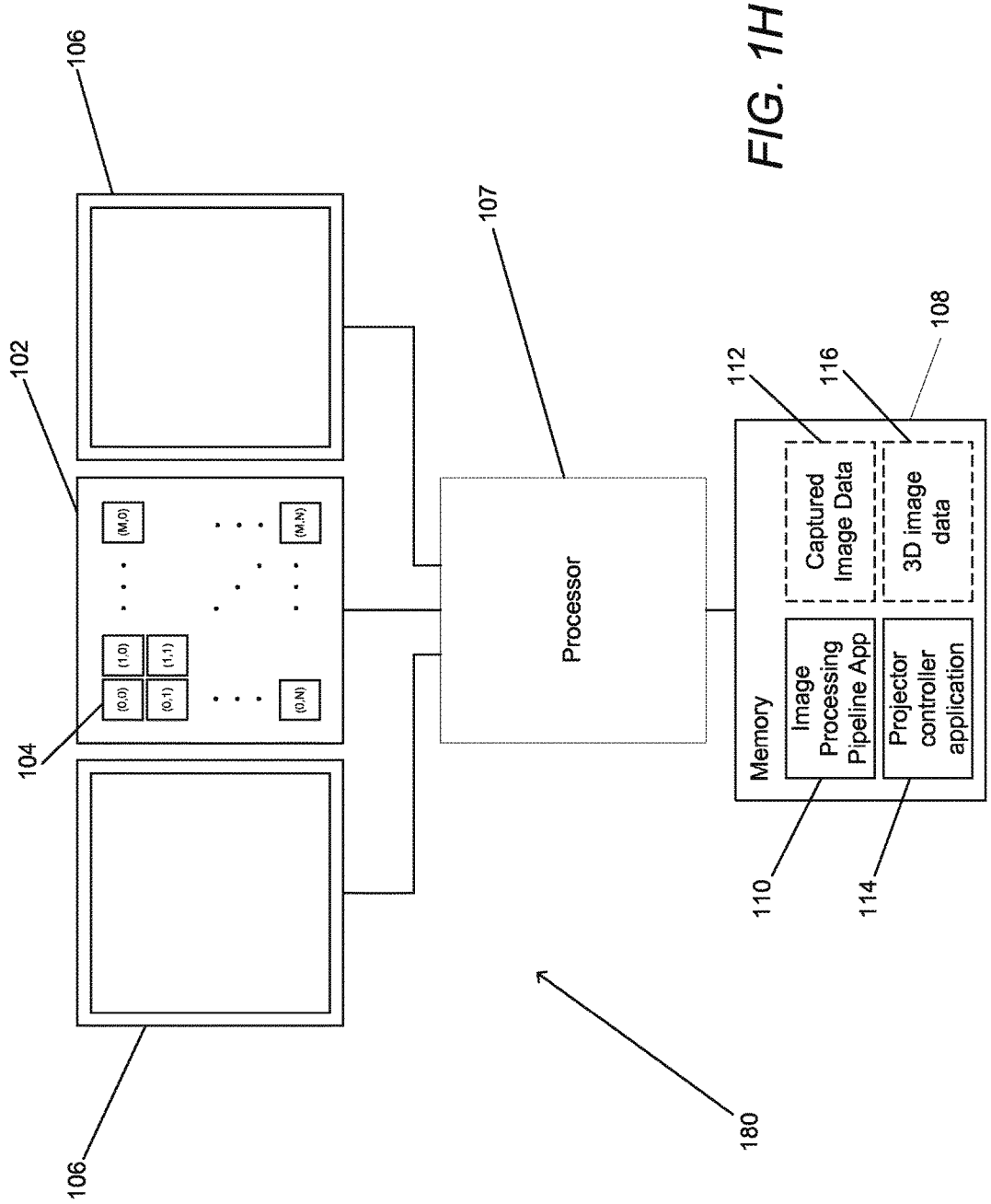
FIG. 1H conceptually illustrates a camera array including two illumination systems located in complementary occlusion zones on either side of an array of cameras in accordance with an embodiment of the invention.

The issue of foreground objects preventing illumination of portions of the scene by projected texture can be addressed by utilizing multiple projectors. Locating illumination systems in complementary occlusion zones on either side of the camera array increases the likelihood that a portion of the scene visible from the viewpoint of a reference camera in the camera array is illuminated by projected texture. A camera array 180 including two illumination systems located in complementary occlusion zones on either side of an array 102 of cameras 104 in accordance with an embodiment of the invention is illustrated in FIG. 1H. As can readily be appreciated, any number of illumination systems can be located in different complementary occlusion zones surrounding the array of cameras as appropriate to the requirements of specific applications. As discussed further below, many illumination systems utilized in accordance with embodiments of the invention incorporate arrays of projectors. In several embodiments, the camera array is surrounded by an array of projectors. In a number of embodiments, the camera array is surrounded by a ring of projectors. The specific configuration of the projectors in the array of projectors is largely dependent upon the requirements of a specific application.

Figure 1I:
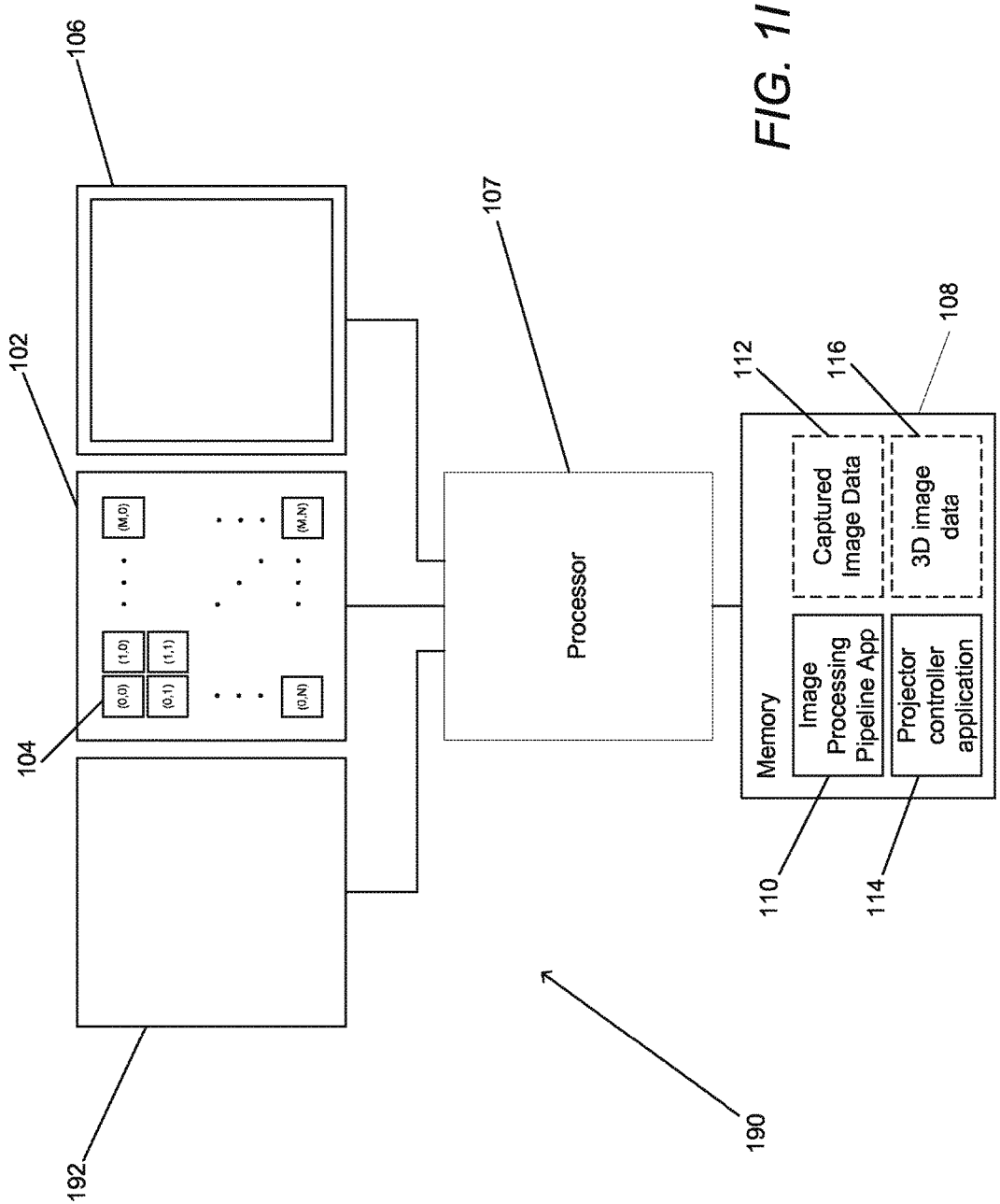
FIG. 1I conceptually illustrates a camera array including a conventional camera, an array of cameras, and an illumination system in accordance with an embodiment of the invention.

In many applications, an array of cameras is paired with a conventional camera. In several embodiments, the array of cameras is utilized to perform a first function such as (but not limited to) capturing still photos and/or performing depth estimation. The conventional camera can be utilized to perform a second function such as (but not limited to) capturing video sequences and/or high resolution images. In a particular set of embodiments, the conventional camera is utilized to capture images and video sequences and the array of cameras is utilized to capture image data that is utilized to determine depth. Depth maps generated using the array of cameras can be reprojected into the field of view of the conventional camera. In a number of embodiments, the camera array includes one or more illumination systems that project texture onto a scene. In several embodiments, image data is captured by the conventional camera and then the scene is illuminated by the projected texture and image data is captured by the array of cameras. As can readily be appreciated, the sequencing of the capture of image data can be reversed. In other embodiments, image data is also captured by the array of cameras when the scene is not illuminated by the illumination system. Various processes for registering depth maps generated using a scene illuminated with projected texture and image data captured when the scene is not illuminated with projected texture are discussed further below. A camera array 190 including a conventional camera 192, an array 102 of cameras 104, and an illumination system 106 in accordance with an embodiment of the invention is illustrated in FIG. 1I. The conventional camera 192 is typically higher resolution than the cameras 104 in the array 102. The conventional camera 192 may, however, have the same resolution and/or a lower resolution to that of one or more of the cameras 104 in the array 102. In several embodiments, the conventional camera is a Bayer camera and the cameras 104 in the array 102 of cameras can include (but are not limited to) monochrome cameras of the same type, monochrome cameras that image different portions of the spectrum, and Bayer cameras. In many embodiments, the conventional camera 192 is formed as a first camera module and the array of cameras is formed as a second camera module. In other embodiments, the layout of the conventional camera and the array of cameras enables the use of a single camera module incorporating all of the cameras. In the illustrated embodiment, the array 102 of cameras 104 is located between the conventional camera 192 and the illumination system 106. Ideally, the array 102 of cameras 104 is located as close to the conventional camera 192 as possible so that very little of the scene visible within the field of view of the conventional camera is occluded from the fields of view of the cameras in the array of cameras. By locating the illumination system 106 on the opposite side of the array 102 of cameras 104 from the conventional camera 192, foreground objects are likely to prevent illumination of portions of the scene that are occluded in fields of view of the cameras in the array of cameras. In certain embodiments, an alternative configuration is utilized in which the conventional camera is located between the array of cameras and the illumination system. In a number of embodiments, cameras from the array are located in complementary occlusion zones surrounding the conventional camera. In many embodiments, at least one camera is located above, below, to the left, and to the right of the conventional camera. In several embodiments, illumination systems are located in complementary occlusion zones surrounding the array of cameras. In many embodiments, cameras in the array of cameras are located in complementary occlusion zones on either side of the conventional camera and illumination systems are located in complementary occlusion zones on either side of the conventional camera. In other embodiments, a single illumination system is adjacent a conventional camera surrounded by an array of cameras. As can readily be appreciated, the locations of one or more conventional camera(s), the cameras in the array of cameras, and one or more illumination systems is largely dependent upon the requirements of a specific application.

The camera arrays 102 can be constructed from an array camera module or sensor including an array of focal planes and an optic array including a lens stack for each focal plane in the array camera module. Sensors including multiple focal planes and the operation of such sensors are discussed in U.S. Patent Publication No. 2012/0012748 entitled "Architectures for System on Chip Array Cameras", to Pain et al., the relevant disclosure from which is incorporated herein by reference in its entirety. A sensor including a single array of pixels on which images are formed by the optics of each camera can also be utilized to capture image data. In several embodiments, each camera includes a separate sensor. In many embodiments, individual lens barrels are utilized to implement the optics of the camera. Array camera modules incorporating cameras implemented using combinations of separate sensors and optic arrays, separate sensors and separate lens barrels and a single sensor and separate lens barrels in accordance with embodiments of the invention are disclosed in U.S. patent application Ser. No. 14/536,537 entitled "Methods of Manufacturing Array Camera Modules Incorporating Independently Aligned Lens Stacks" to Rodda et al. filed Nov. 7, 2014, the relevant disclosure from which is incorporated by reference herein in its entirety. Light filters can be used within each optical channel formed by the optics of a camera in the array camera module to enable different cameras to capture image data with respect to different portions of the electromagnetic spectrum. As can readily be appreciated, the construction of an array of cameras utilized in combination with an illumination system is typically dependent upon the requirements of a specific application.

The illumination system 106 projects texture onto a scene that is utilized to estimate depths of objects within the scene. A variety of illumination systems can be utilized to project texture. In several embodiments, static illumination systems are utilized that project a fixed pattern. In a number of embodiments, dynamic illumination systems are utilized in which the projected pattern is controllable. As discussed further below, camera arrays in accordance with many embodiments of the invention can control the projected pattern so that the spatial pattern period of the projected texture is selected to provide the greatest depth estimation precision at the depths at which objects are observed in the scene. In certain embodiments, an illumination system incorporating an array of projectors is utilized. In several embodiments, the projector array projects a fixed pattern. In other embodiments, the pattern projected by the projector array is controllable so that the spatial resolution of the intensity contrast or spatial pattern period is selected to provide the greatest depth estimation precision at the depths at which objects are observed in the scene.

The processor 107 can include logic gates formed from transistors (or any other device) that are configured to dynamically perform actions based on the instructions stored in the memory. Accordingly, processors in accordance with many embodiments of the invention can be implemented using one or more microprocessor(s), coprocessor(s), application specific integrated circuit(s) and/or an appropriately configured field programmable gate array(s) that are directed using appropriate software to control various operating parameters of the camera arrays.

In a variety of embodiments, the memory 108 includes circuitry such as, but not limited to, memory cells constructed using transistors, that are configured to store instructions. The image processing pipeline application 110 and the projector controller application 114 are typically non-transitory machine readable instructions stored in the memory cells and utilized to direct the processor 107 to perform processes including (but not limited to) the various processes described below.

In many embodiments, the image processing pipeline application 110 controls the illumination of the scene via the illumination system 106 using the projector controller application 114. The image processing pipeline application 110 can control the capture of image data using an array 102 of cameras 104 to enable capture of an image and/or the natural texture of a scene. In several embodiments, the image processing pipeline application 110 can configure the processor 107 to process images captured by camera arrays 102 to produce a synthesized higher resolution image. Processes for performing super-resolution processing using image data captured by an array camera are described in U.S. Pat. No. 8,878,950 entitled "Systems and Methods for Synthesizing High Resolution Images Using Super-Resolution Processes" to Lelescu et al., the relevant disclosure from which including the disclosure related to performing super-resolution processes is hereby incorporated by reference in its entirety.

The image processing pipeline application 110 can also illuminate the scene using projected texture and estimate depths of objects within the scene using depth estimation processes similar to those described in U.S. Pat. No. 8,619,082 to Ciurea et al. and incorporated by reference above. The projected texture assists with depth estimation in textureless regions of the scene. In a number of embodiments, the image processing pipeline application 110 can use the projector controller application 114 to modify the modulation pattern of the projected texture to increase depth estimation precision at a specific distance from the camera array. In several embodiments, the image processing pipeline 110 collocates natural texture information and depth information to create a set of collocated depth and texture information. The collocation process assumes that the scene is static between the capture of a set of image data of the scene illuminated by projected texture and a set of image data captured when the scene is not illuminated by projected texture. In many embodiments, the collocation process utilizes a depth map generated from the set of images used to obtain the natural texture information. In a number of embodiments, the process of reprojecting the depth information into the field of view of the texture information (or vice versa) involves compositing depth information determined using projected texture and without projected texture. In certain embodiments, confidence maps are utilized to guide the compositing of depth information. Various processes for collocating depth and texture information in accordance with embodiments of the invention are discussed further below.

While specific camera arrays incorporating illumination systems are described above with reference to FIG. 1A-1I, any of a variety of camera arrays can be utilized in combination with a projection system to estimate depth based upon projected texture in accordance with embodiments of the invention. Before discussing various illumination systems that can be utilized in camera arrays to project texture in accordance with embodiments of the invention, the benefits that can be achieved when using two-dimensional arrays of cameras to perform depth estimation from projected texture generated by an illumination system in accordance with various embodiments of the invention are discussed further below.

Figure 2A:
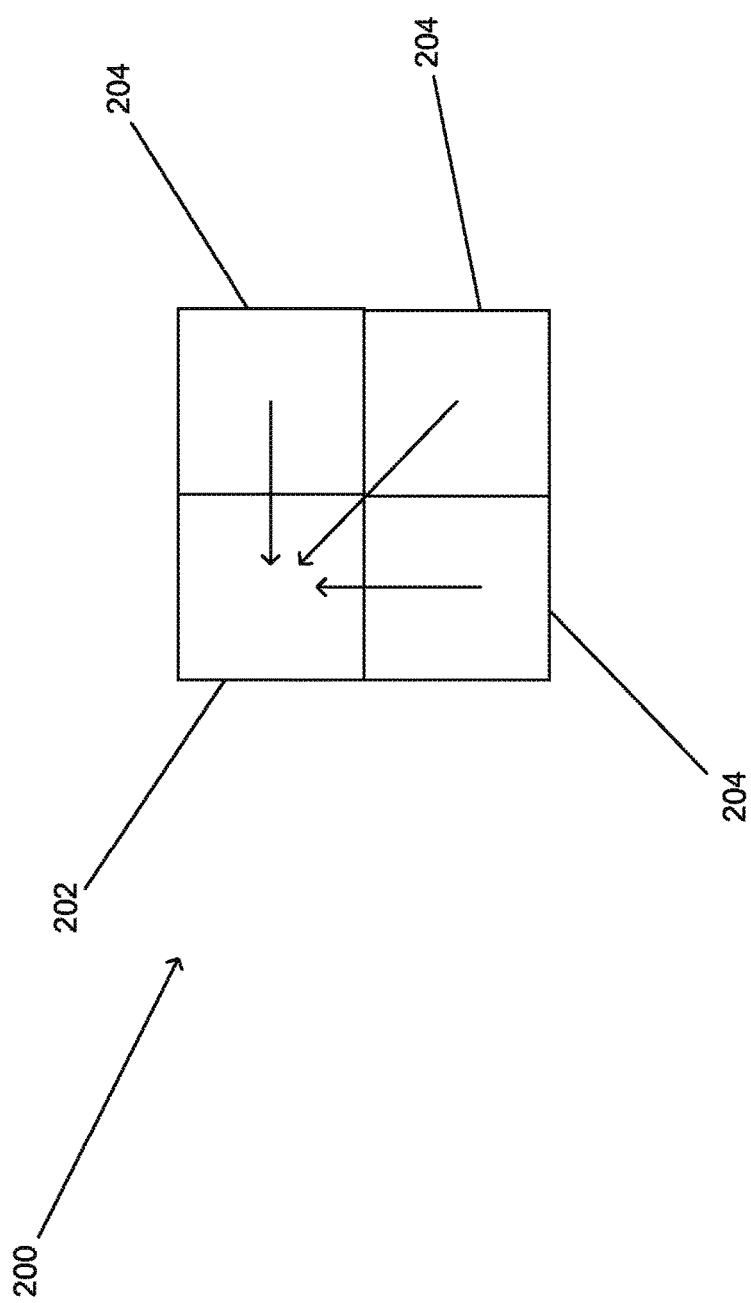
FIG. 2A conceptually illustrates epipolar lines utilized to perform disparity searches in a 2×2 array of monochrome cameras.
Figure 2B:
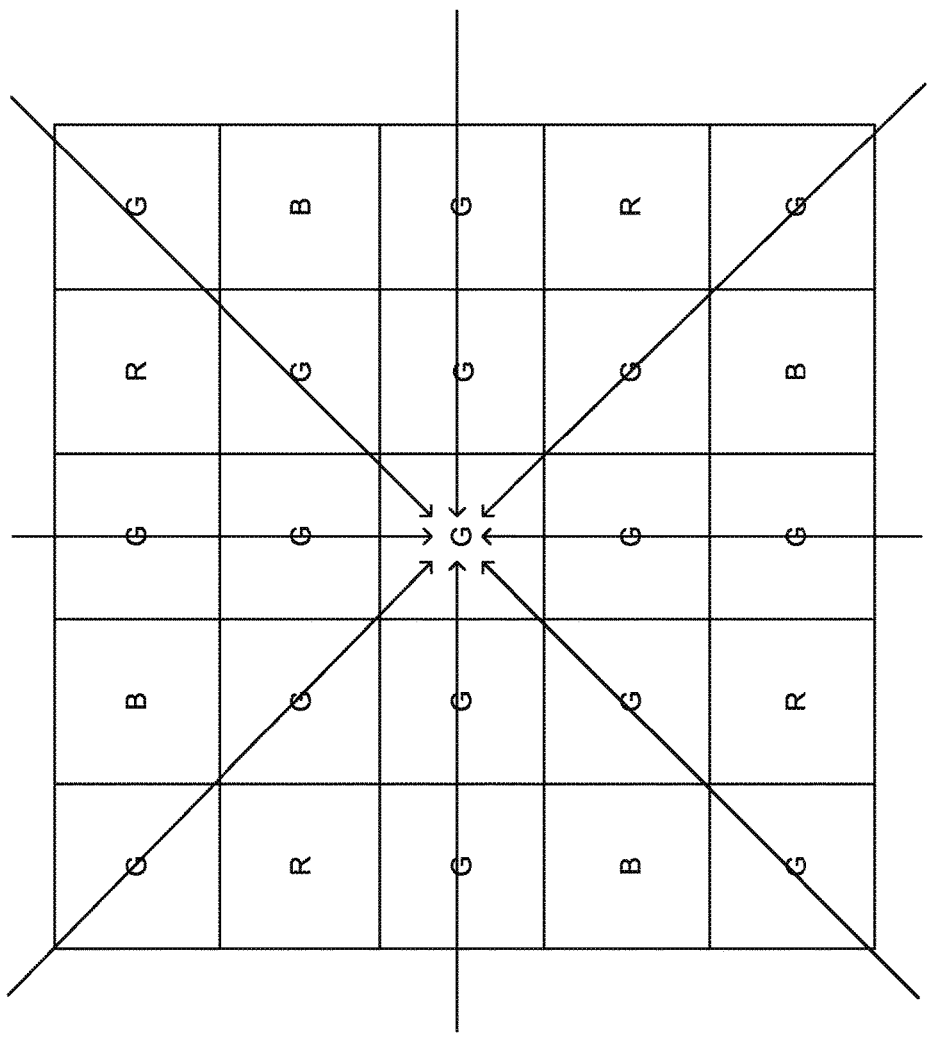
FIG. 2B conceptually illustrates epipolar lines utilized to perform disparity searches in a 5×5 array of monochrome cameras incorporating Green, Red and Blue cameras.

Utilizing Epipolar Lines Aligned at Different Angles to Perform Disparity Searches Use of a two-dimensional array of cameras to estimate depth can involve determining the similarity of corresponding pixels in a plurality of images at different depths. Due to the spatial relationship of cameras in a two-dimensional array of cameras, the epipolar lines searched during the disparity search are aligned at different angels. In a binocular stereo system that utilizes a random projected texture, self-similar regions of projected texture can result in incorrect depth estimates. When disparity searches are conducted across epipolar lines aligned at different angles, the likelihood that a random projected texture includes similar patterns in corresponding pixel locations along multiple epipolar lines aligned at different angles is low. Indeed, the likelihood decreases with the increase in the number of cameras in the array utilized to perform the epipolar line search. Epipolar lines utilized to perform disparity searches in a 2×2 array of monochrome cameras are illustrated in FIG. 2A. The camera 202 in the top right hand corner of the array forms a reference camera and arrows indicate the direction of anticipated shifts of corresponding pixels with depth in alternate view images captured by the remaining three cameras 204. As can readily be appreciated, disparity searches involve searching along three different epipolar lines aligned at different angles with respect to each other.

Epipolar lines utilized to perform disparity searches in a 5×5 array of monochrome cameras including 17 Green cameras 4 Red cameras and 4 Blue cameras are illustrated in FIG. 2A. Assuming that the disparity search is performed using only the corresponding pixels from the Green cameras, disparity searches involve searching along eight different epipolar lines aligned at different angles with respect to each other. In other embodiments, the number of epipolar lines searched can be increased by utilizing corresponding pixels in each of the three color channels in the manner described in U.S. Pat. No. 8,780,113 entitled "Systems and Methods for Performing Depth Estimation using Image Data from Multiple Spectral Channels", to Ciurea et al., the relevant disclosure from which is hereby incorporated by reference in its entirety. As can readily be appreciated, the specific number and type of cameras utilized to perform disparity searches is largely dependent upon the requirements of a specific application. By increasing the number of cameras in the array and/or the number of dimensions in the array (i.e. 1D to 2D), however, significant benefits can be achieved when estimating depth using projected textures irrespective of the size of the array. Where arrays of cameras are spaced with a wide baseline, the wide baseline can become the dominant epipolar direction. In several embodiments, projected patterns that are orthogonal to the dominant epipolar direction can increase the importance of other epipolar directions in the depth estimation process. Systems for projecting texture that can be utilized by camera arrays in accordance with embodiments of the invention are described further below.

Illumination Systems Utilized to Project Texture

A variety of illumination systems can be utilized to project texture for use in depth estimation in accordance with embodiments of the invention. In several embodiments, static illumination systems are utilized that project a fixed pattern. In a number of embodiments, dynamic illumination systems are utilized in which the projected pattern is controllable. As discussed further below, camera arrays in accordance with many embodiments of the invention can control the projected pattern so that the spatial resolution of the intensity contrast is selected to provide the greatest depth estimation precision at the depths at which objects are observed in the scene. In certain embodiments, an illumination system incorporating an array of projectors is utilized. In several embodiments, the projector array projects a fixed pattern. In other embodiments, the pattern projected by the projector array is controllable so that the spatial resolution of the intensity contrast is selected to provide the greatest depth estimation precision at the depths at which objects are observed in the scene.

Static Illumination Systems

Figure 3B:
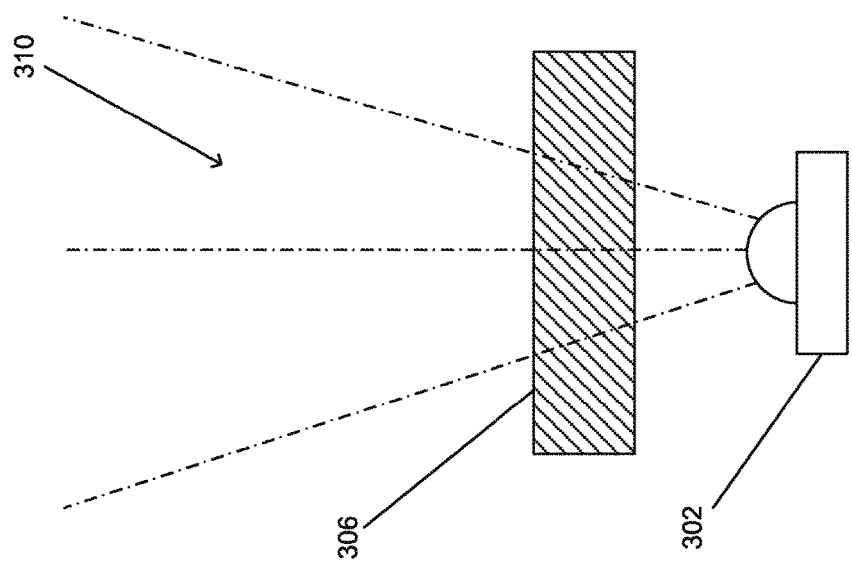
FIG. 3B conceptually illustrates a static illumination system in which light from the light source is directly incident on the DOE.
Figure 3A:
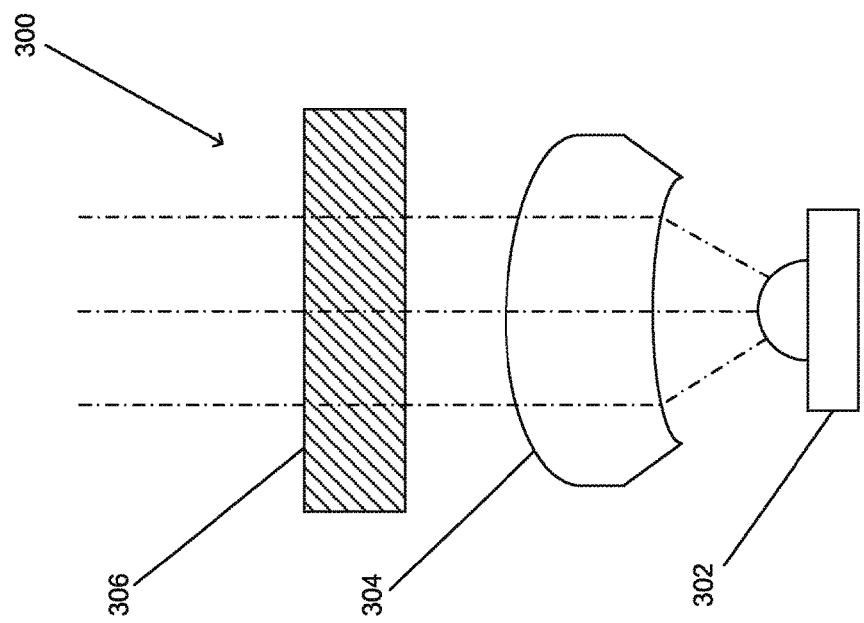
FIG. 3A conceptually illustrates a diffractive static illumination system in accordance with an embodiment of the invention.

A diffractive static illumination system in accordance with an embodiment of the invention is illustrated in FIG. 3A. The static illumination system 300 includes a light source 302. In several embodiments, the light source 302 is a monochromatic point source such as (but not limited to) a single mode fiber end face (potentially cleaned up by a spatial frequency filter), a laser diode, or a vertical-cavity surface-emitting laser (VCSEL). The light source 302 emits light that is collimated by a collimator 304 such as (but not limited to) a collimating lens. The collimated light is incident on a diffractive optical element (DOE) 306. If the DOE is designed appropriately to include a spherical phase component, the collimator 304 can be omitted from the static illumination system 300. A static illumination system 310 in which light from the light source 302 is directly incident on the DOE 306 is shown in FIG. 3B. In a number of embodiments, the DOE 306 is a phase grating such as binary or multilevel gratings. In other embodiments, amplitude gratings can also be utilized. In many embodiments, the features of the texture can be color or polarization and is not simply limited to spot shape and separation.

When using a conventional diffractive static illumination system, the angular period of the projected pattern is fixed or constant. In several embodiments, the projected texture can employ random texture, texture generated using De Bruijn sequences or texture generated based upon Hamming codes. As can readily be appreciated, any texture appropriate to the requirements of a specific application can be statically projected in accordance with embodiments of the invention by designing the potentially more complex DOE (theoretically any intensity distribution can be generated with the appropriately designed DOE from a coherent source). Random patterns are most desirable for the array camera in order to avoid confusion of the parallax detection process due to false parallax matches that can arise from a periodic texture pattern. Although, in many embodiments any of a variety of non-periodic texture and/or periodic texture patterns can be utilized as appropriate to the requirements of specific applications. Irrespective of the projected texture, texture projected by a static illumination system has a spatial pattern period that increases with distance. In several embodiments, the spatial period can be modified utilizing a controllable DOE to provide a spatial pattern period that is likely to yield the highest depth estimation precision at a given depth. In many embodiments, the system is designed so that suitable depth estimation precision is obtained at a minimum object distance. At the minimum object distance the pattern is determined so that adjacent points projected on the object at the minimum distance after being modulated by the camera array's blur (both lens and sensor) is still discernable as distinct points. Therefore, the modulation transfer function of the imaging systems needs to be taken into consideration in designing the density of projected patter at the minimum desired operating distance.

In several embodiments, an illumination system can be constructed using a light emitting diode as a light source. However, the LED needs to be structured and then imaged by a projection lens ("relayed") into the scene in order to provide projected texture. Alternatively, the LED can be homogenized (e.g. with a microlens array condenser) and illuminated a diaphragm that has the desired (de-magnified, ideally non-periodic) projection pattern in it, which is then also imaged into the scene. An appropriately configured LED can be utilized as a single device or as part of an array. In several embodiments, the typically lithographically manufactured diaphragm or array of diaphragms can be replaced by a translucent LCD in order to provide the flexibility to change the projection pattern. Various dynamic illumination systems in accordance with embodiments of the invention are described below.

Dynamic Illumination Systems

A variety of dynamic illumination systems can be constructed using devices such as (but not limited to) spatial light modulation systems. Spatial light modulation systems are devices that can be used to modulate in a controllable manner the amplitude, phase, and/or polarization of light waves in space and time. In a number of embodiments, the spatial light modulator system is implemented using a reflective liquid crystal on silicon microdisplay. In many instances a spatial light modulation system is pixelated, which means that different phase, transmission, and/or polarization parameters can be applied to different spatial locations within the spatial light modulation system. In this way, the spatial light modulation system acts as a programmable grating (within the limits of its pixilation) in the case of its use in a diffractive pattern generator and a programmable diaphragm in the case of a reflective projector. An illumination system 320 including a reflective spatial light modulator system 322 is illustrated in FIG. 3C. A controller 324 controls the modulation applied to the incident light generated by the light source 302. In the illustrated embodiment, the incident light is shown as calumniated by the collimator 304. As noted above, a collimator can be omitted where the modulation pattern is selected appropriately. The controller 324 can be implemented via a dedicated device and/or using a processor forming part of the camera array that incorporates the dynamic illumination system.

Figure 3D:
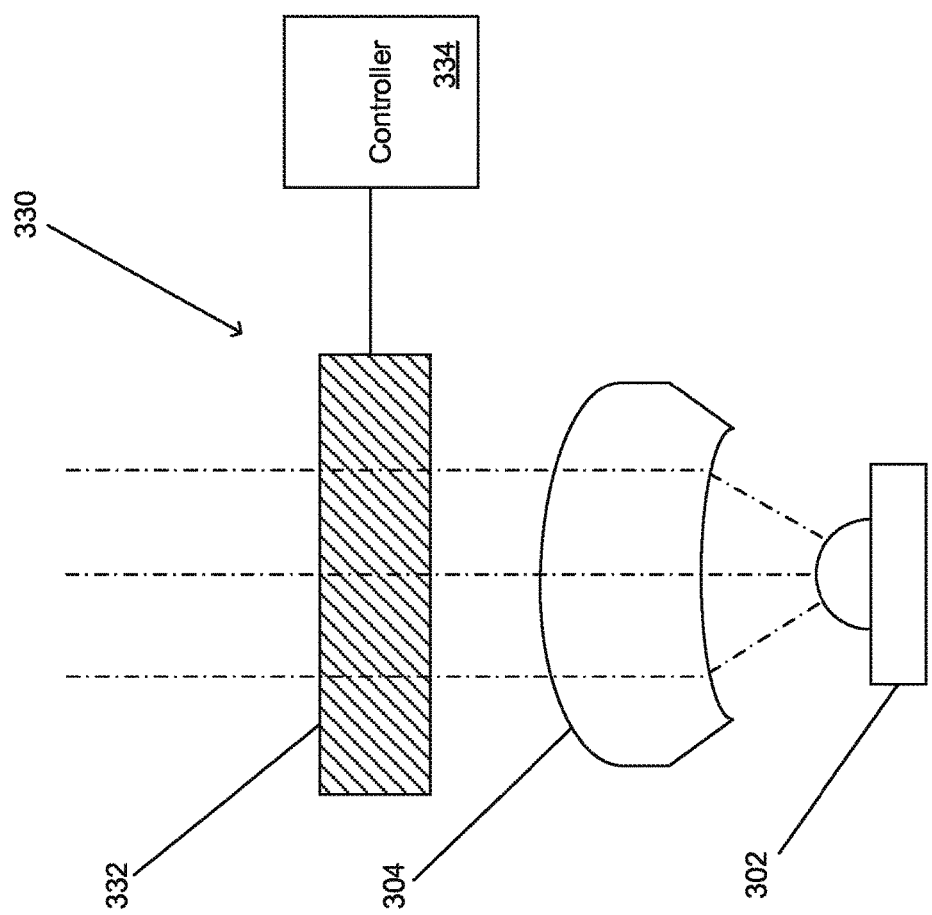
FIG. 3D conceptually illustrates an illumination system including a translucent spatial light modulator system.

In several embodiments, the spatial light modulator system is implemented using a translucent liquid crystal microdisplay. An illumination system 330 including a translucent spatial light modulator system 332 is illustrated in FIG. 3D. A controller 334 controls the modulation applied to the incident light generated by the light source 302. In the illustrated embodiment, the incident light is shown as calumniated by the collimator 304. As noted above, a collimator can be omitted where the modulation pattern is selected appropriately. The controller 334 can be implemented via a dedicated device and/or using a processor forming part of the camera array that incorporates the dynamic illumination system.

The ability to control the modulation pattern enables the selection of a modulation pattern(s) that are specific to the depths of objects within a scene. In several embodiments, initial depth estimates are determined with respect to objects in a scene and the initial depth estimates utilized to generate a projected texture having spatial pattern periods determined based upon the depths of the objects illuminated by specific portions of the projected texture. Similar techniques can be utilized to generate a set of textures that provide different levels of depth estimation precision at various depths. These textures can then be projected in a sequence and the depth estimates obtained using the projected texture likely to yield the highest depth estimation precision utilized to determine distances to objects visible within the scene. In this way, each set of captured images is only utilized to perform depth estimation within a given range of disparities at which a given projected texture yields the highest depth estimation precision.

In several embodiments, the projected texture can employ random texture, texture generated using De Bruijn sequences or texture generated based upon Hamming codes. As noted above, the spatial pattern periods of different regions of the texture can be modified based upon the depths of the objects illuminated by the projected texture. Alternatively, textures that provide different levels of depth estimation precision at various depths can be projected in a sequence and the depth estimates obtained using the projected texture likely to yield the highest depth estimation precision utilized to determine distances to objects visible within the scene.

Irrespective of whether the illumination system is static or dynamic, the illumination system will ideally be designed to project texture across the entire field of view of each of the cameras in the camera array. When cameras are located in complementary occlusion zones on either side of an illumination system, the field of view onto which the illumination system projects texture is typically significantly larger than the fields of view of the cameras. The comparative field of view onto which an illumination system projects light and the fields of view of cameras in a camera array is conceptually illustrated in FIG. 3E. An illumination system 400 is surrounded by two arrays of cameras 402, 404 located in complementary occlusion zones. The field of view 406 onto which the illumination system 400 projects light is significantly wider than the fields of view 408, 410 of the cameras in the arrays of cameras 402, 404. Beyond a predetermined distance, the projected texture is visible throughout the entire field of view 408, 410 of the cameras in the arrays of cameras 402, 404 (assuming an absence of foreground objects).

While a variety of illumination systems are described above with reference to FIGS. 3A-3D that use a single light source, illumination systems in accordance with several embodiments of the invention utilize multiple projectors. Illumination systems incorporating arrays of projectors in accordance with various embodiments of the invention are discussed below.

Projecting Textures Using Arrays of Projectors

Figure 4A:
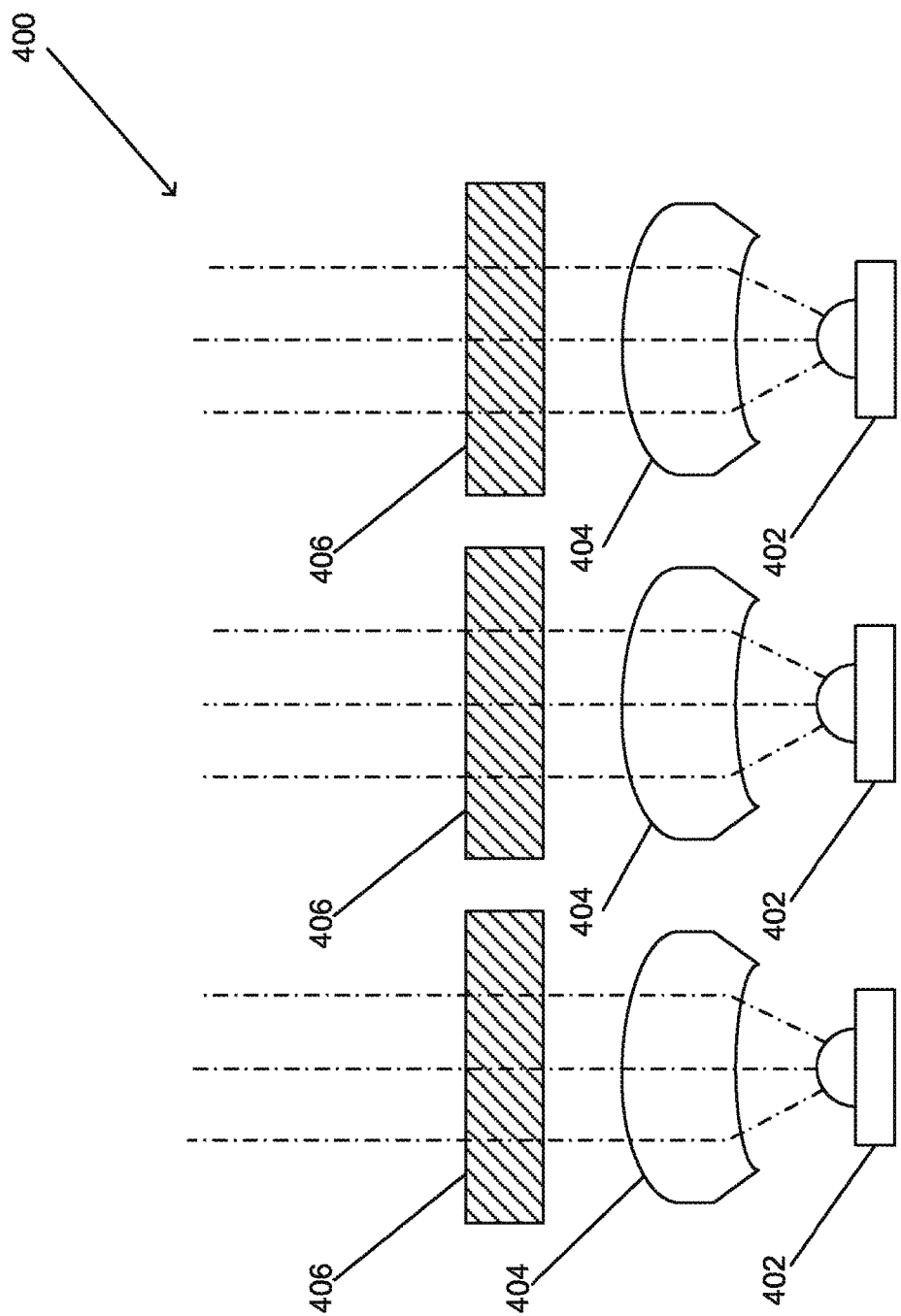
FIG. 4A conceptually illustrates an array of projectors that project collimated light through DOEs in accordance with an embodiment of the invention.
Figure 4B:
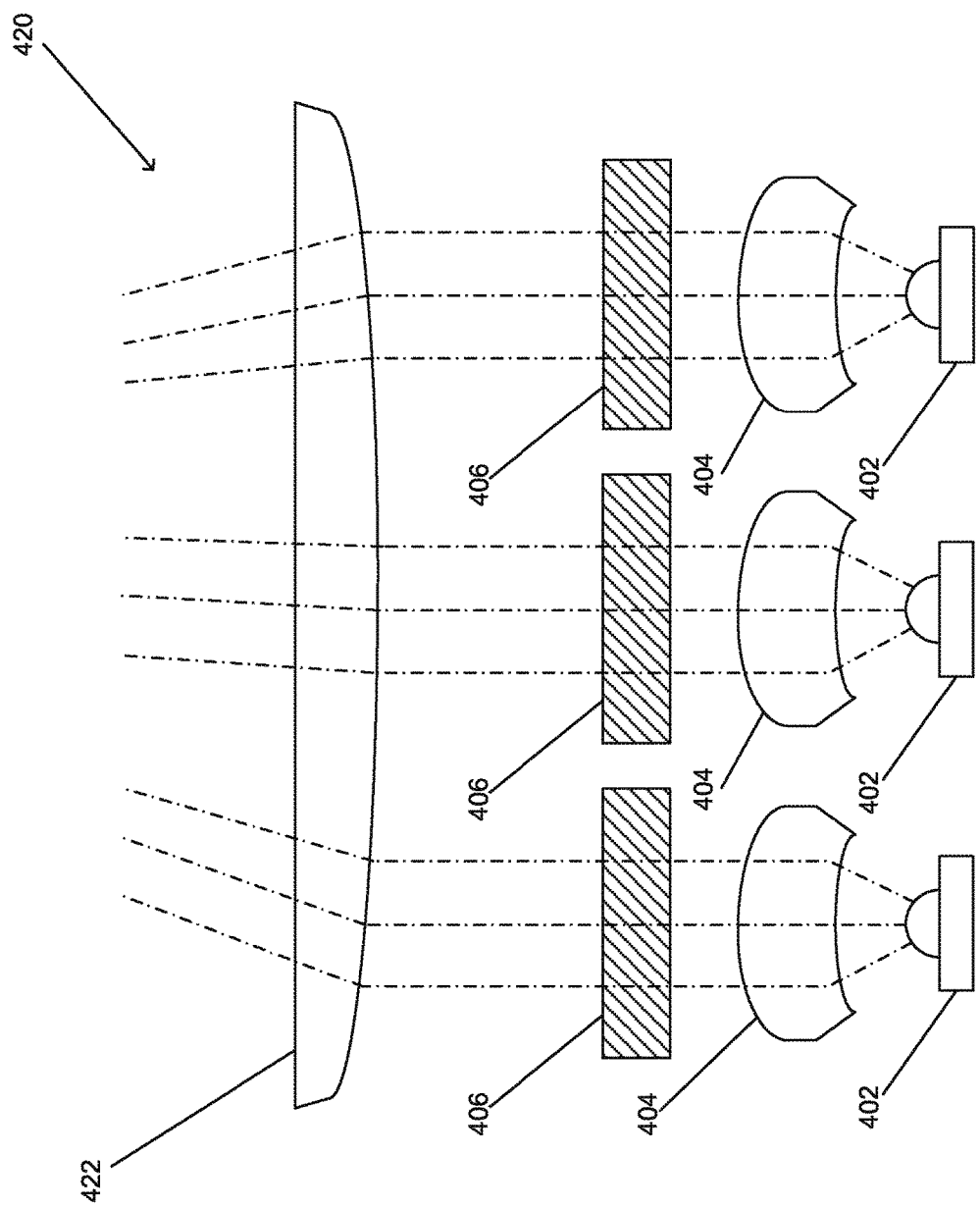
FIG. 4B conceptually illustrates an array of projectors that project collimated light through DOEs through a lens that focuses the light on a focal plane in accordance with an embodiment of the invention.

An array of projectors that project collimated light through DOEs in accordance with an embodiment of the invention is illustrated in FIG. 4A. The projectors in the projector array 400 each include a light source 402 and a collimator 404. In the illustrated embodiment, the collimator 404 is a collimating lens. In other embodiments, any of a variety of collimators can be utilized and/or the collimated can be omitted. The collimated light from each light source 402 passes through a DOE 406 that modulates the light projected onto the scene. In several embodiments, a lens can be utilized to focus the projected light. An array of projectors 420 that project collimated light through DOEs through a lens 422 that focuses the light on a focal plane in accordance with an embodiment of the invention is illustrated in FIG. 4B. As can readily be appreciated the modulation patterns utilized in the array of projects can be static or dynamic as appropriate to the requirements of specific applications. Furthermore, different projectors in the array of projectors having different DOEs and/or colored light sources could be switched on in different combinations to create different patterns.

Figure 4D:
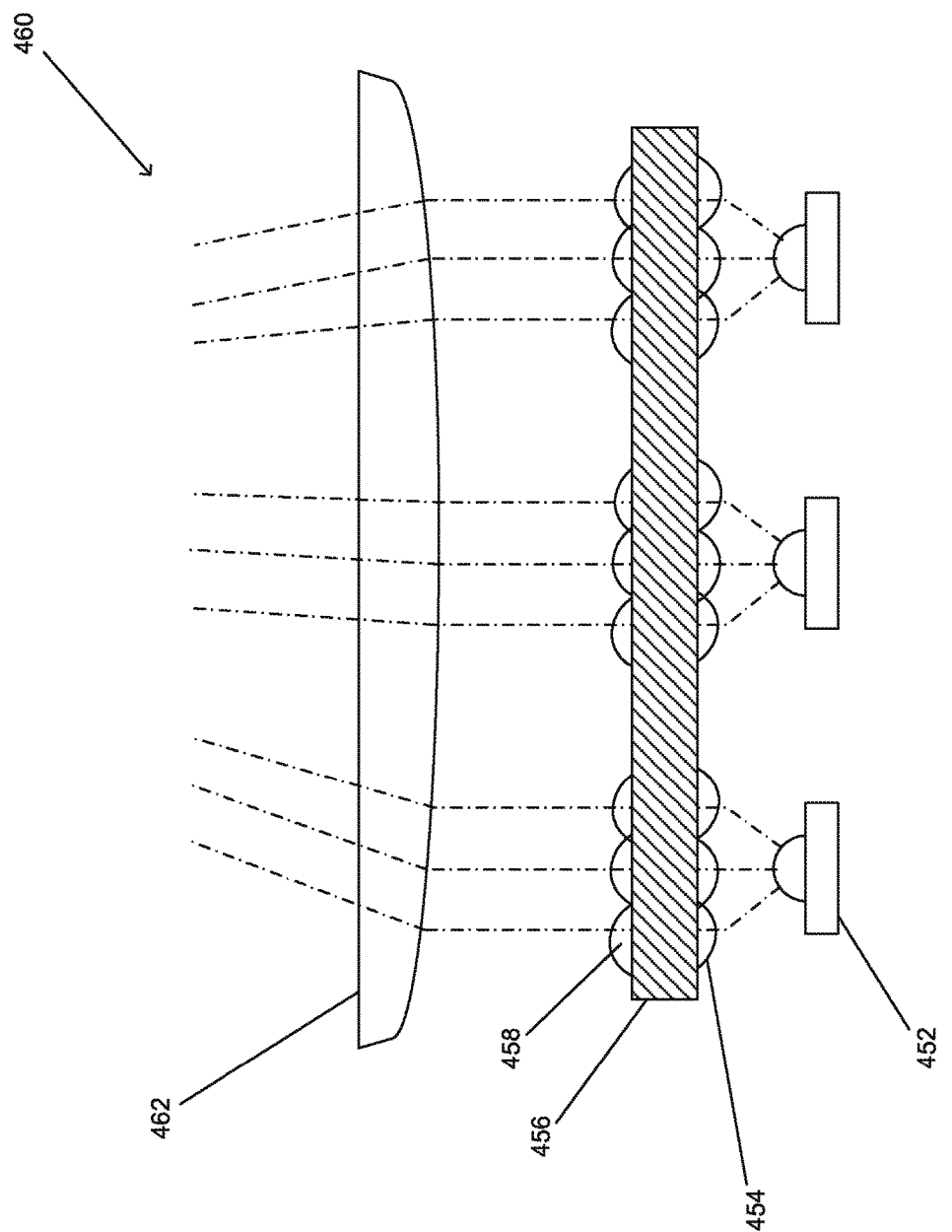
FIG. 4D conceptually illustrates an array of projectors that focuses light emerging from the projector microlenses on a focal plane using a lens in accordance with an embodiment of the invention.

In a number of embodiments, a projector array is constructed using a plurality of light emitting diodes (LED)s. A projector array formed by a plurality of LEDS is illustrated in FIG. 4C. The projector array 450 includes LEDs 452 that project light onto a set of condenser microlenses 454 in a microlens array that can be formed upon a glass substrate 456. Modulation patterns can be patterned onto the glass substrate that modulate light passing through the substrate and project light via projection microlenses 458 in a microlens array formed upon the opposite surface of the glass substrate. Each combination of a condenser and projector microlens can be considered to be a micro-projection unit. In several embodiments, a lens can be utilized to focus the projected light onto a focal plane. An array of projectors 460 that focuses light emerging from the projector microlenses on a focal plane using a lens 462 in accordance with an embodiment of the invention is illustrated in FIG. 4D.

Figure 4I:
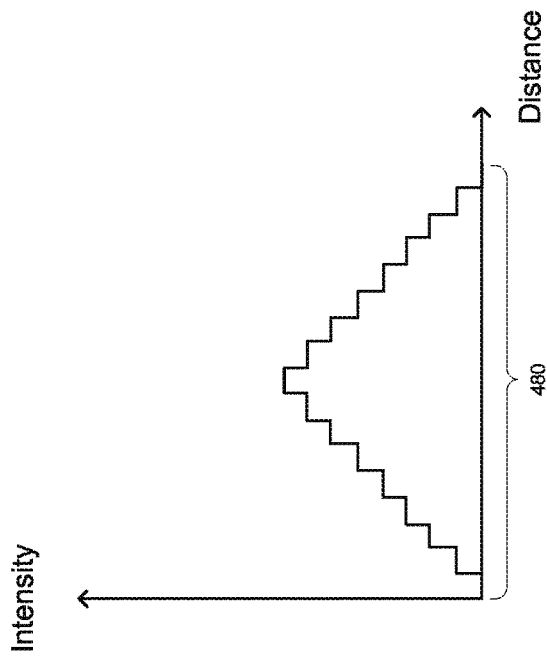
FIGS. 4E-4I conceptually illustrate Gray code patterns that can be used to generate a non-random projected texture.
Figure 4G:
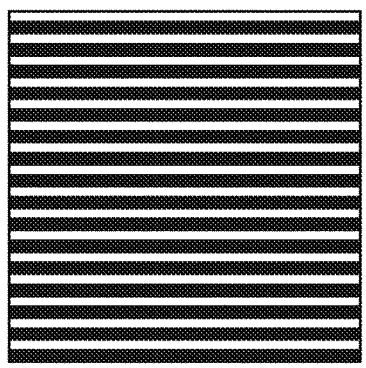
Figure 4H:
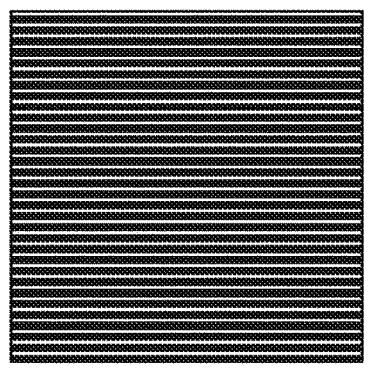
Figure 4E:
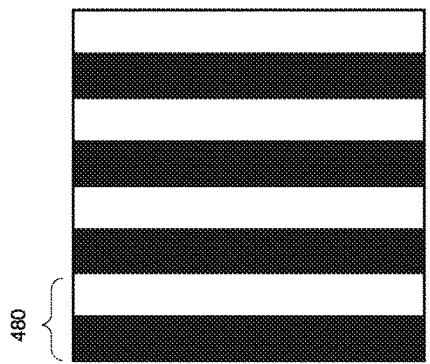
Figure 4F:
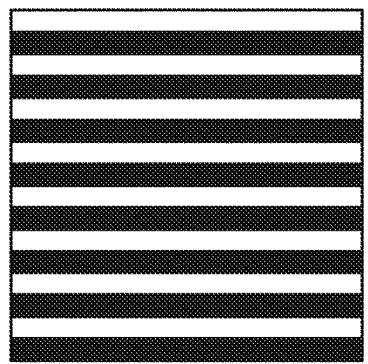
Figure 4K:
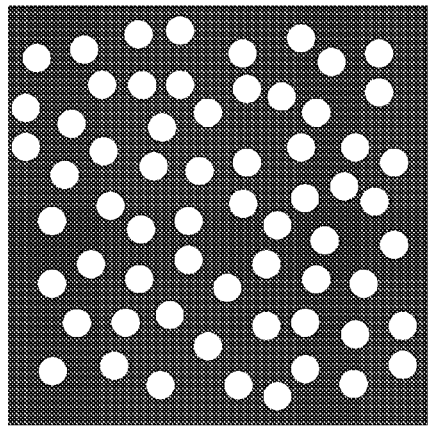
FIGS. 4J-4M conceptually illustrate the use of projected patterns incorporating randomly located dots having different sizes in accordance with some embodiments of the invention.
Figure 4M:
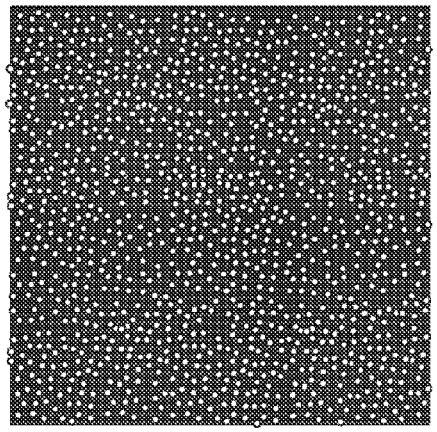
Figure 4J:
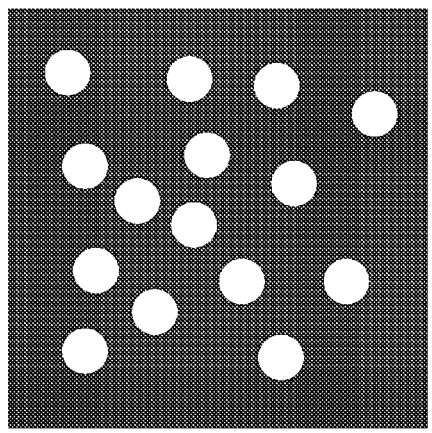
Figure 4L:
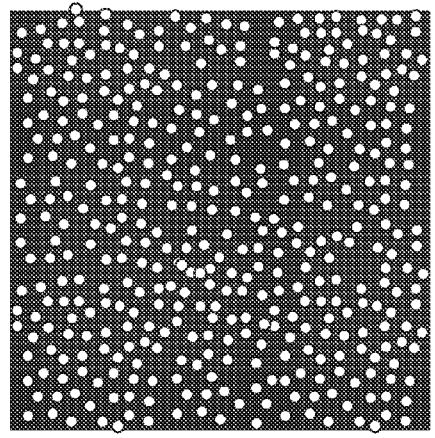
Figure 5B:
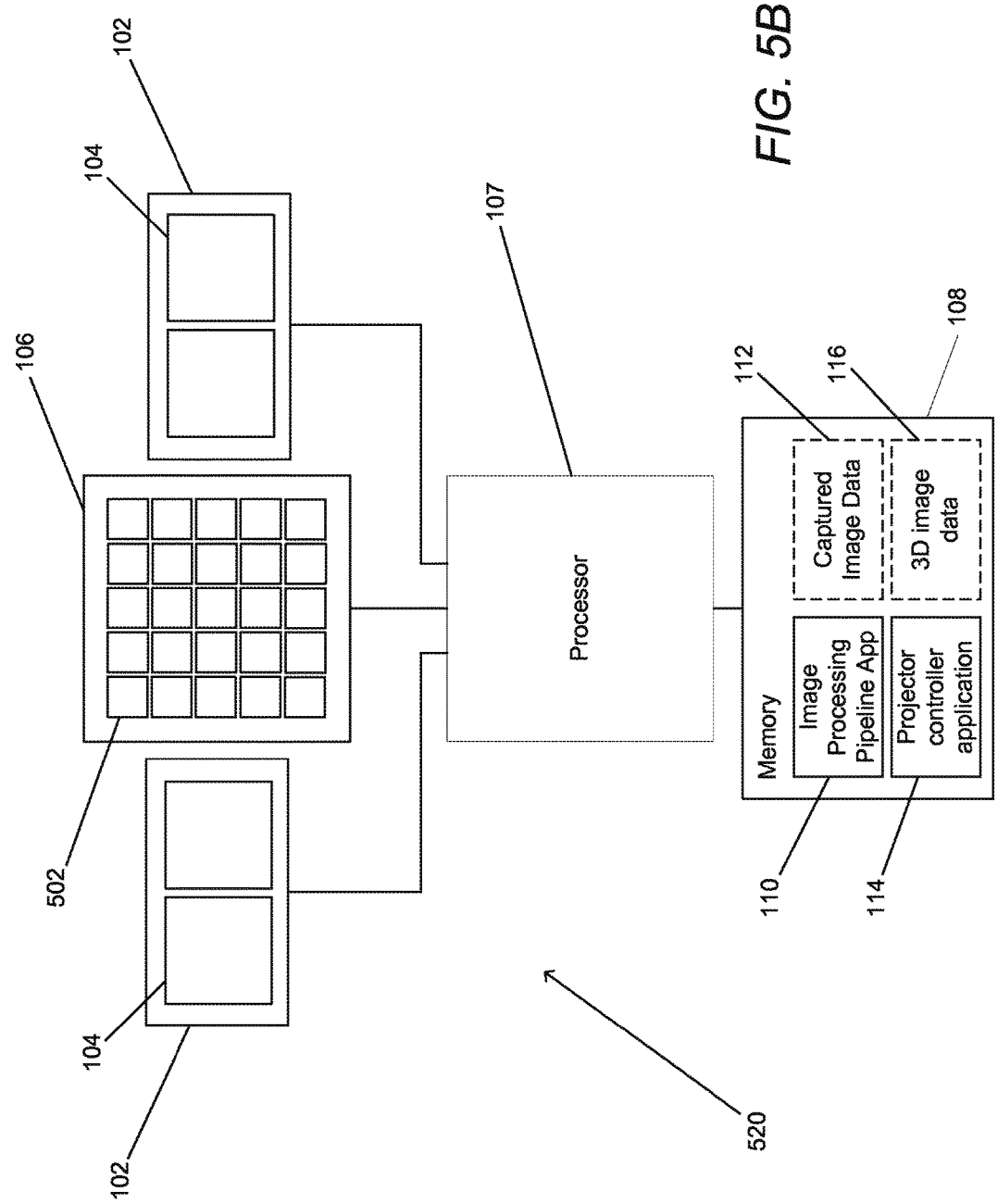
Figure 5C:
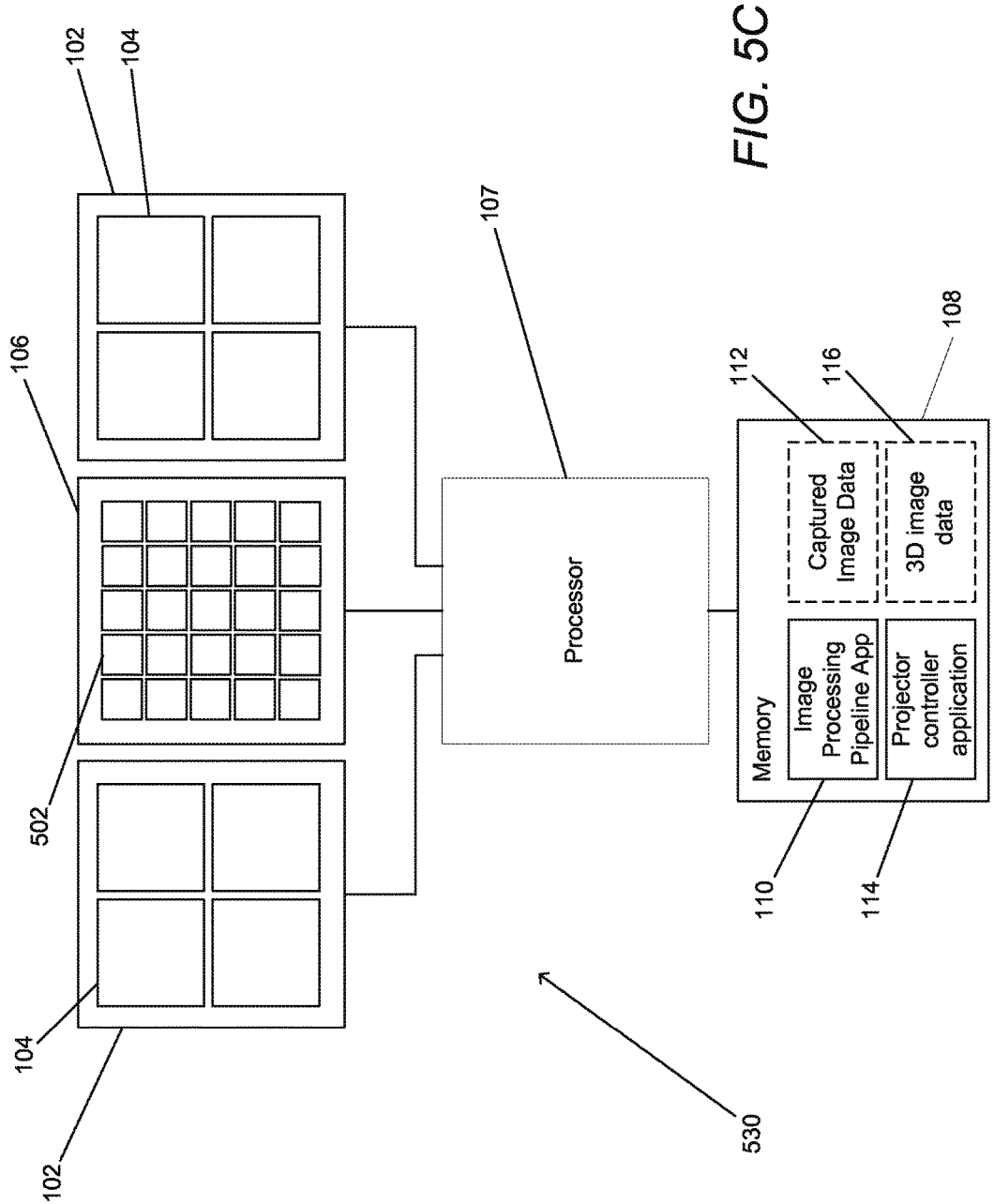
Figure 5D:
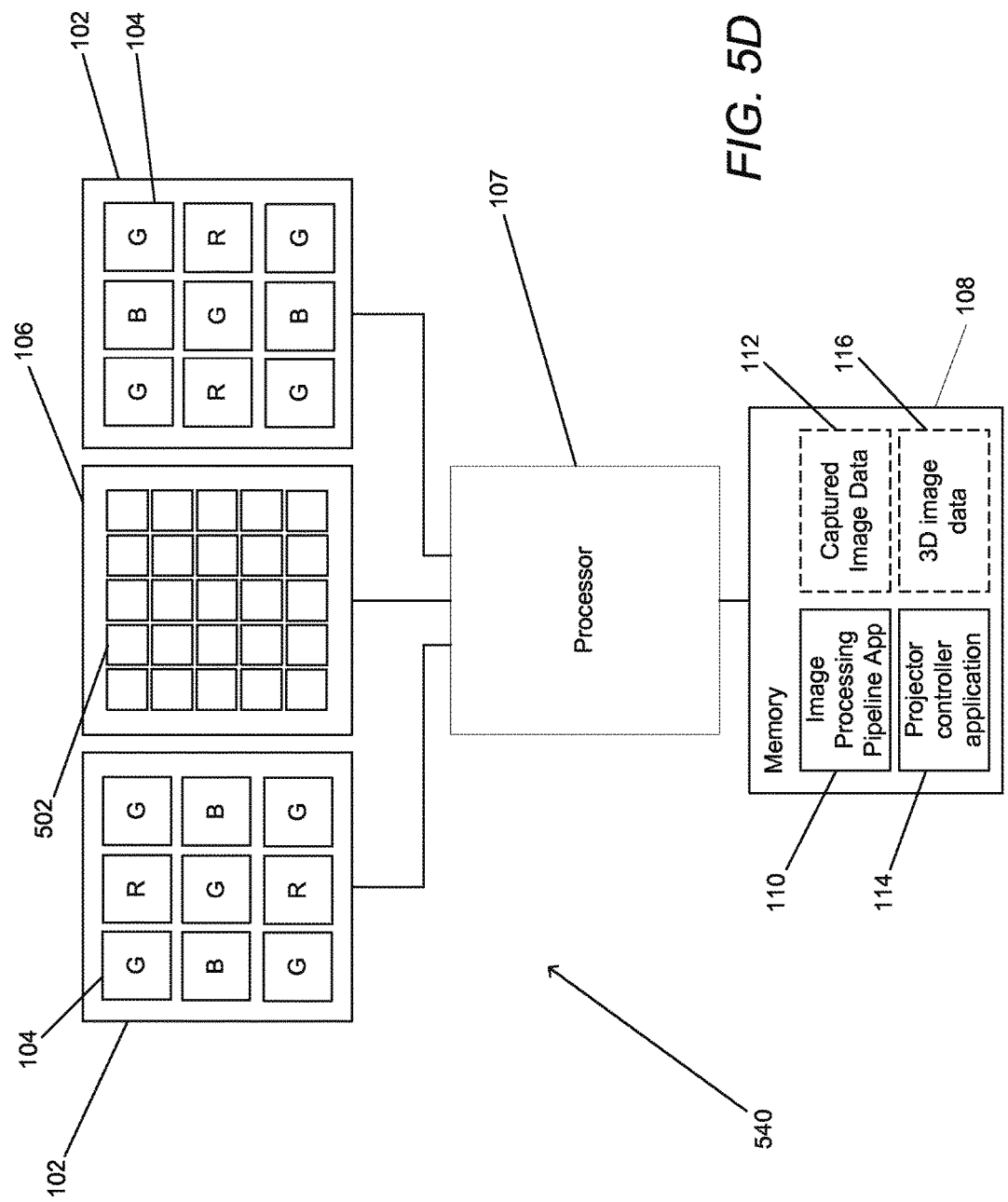
Figure 5E:
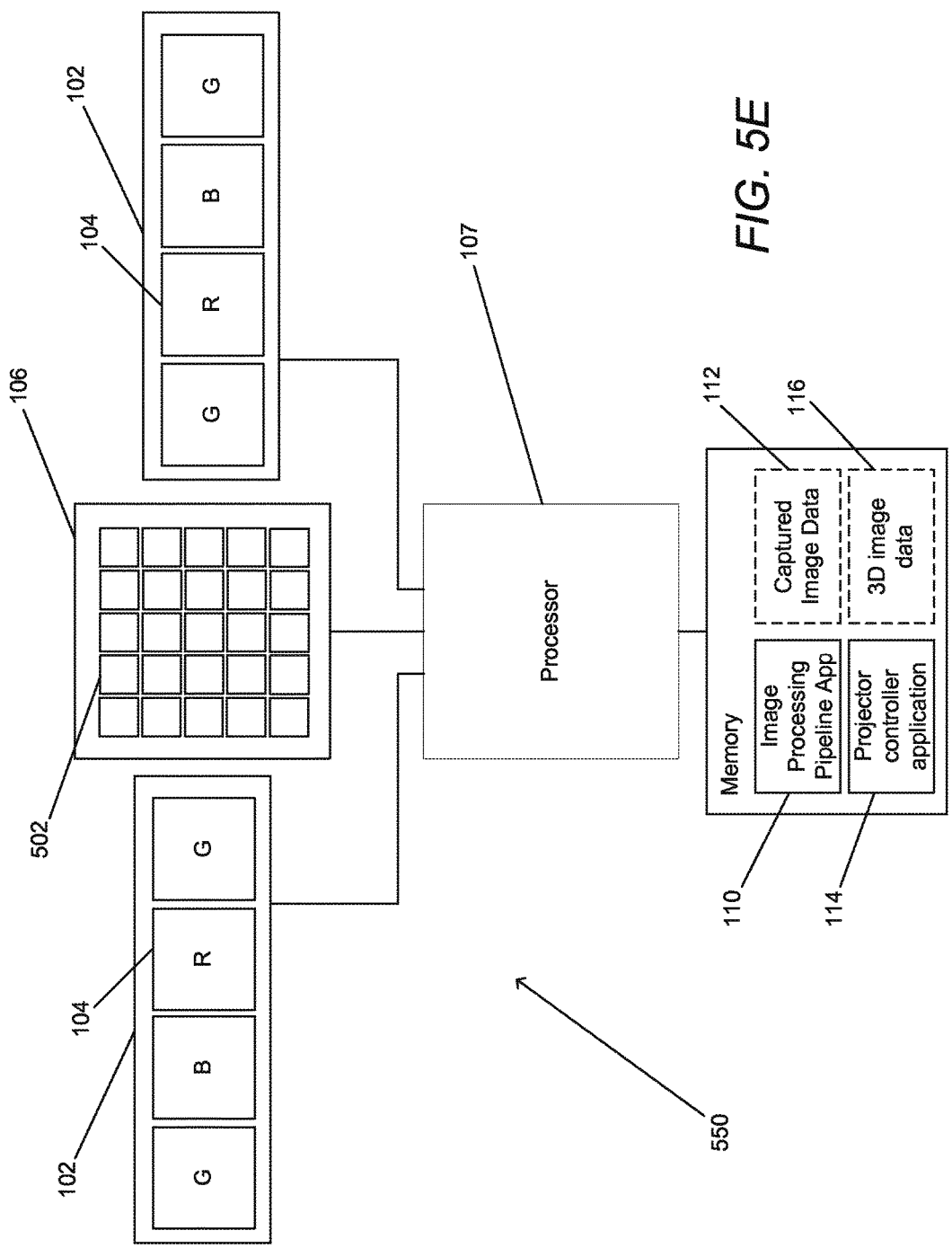
Figure 5F:
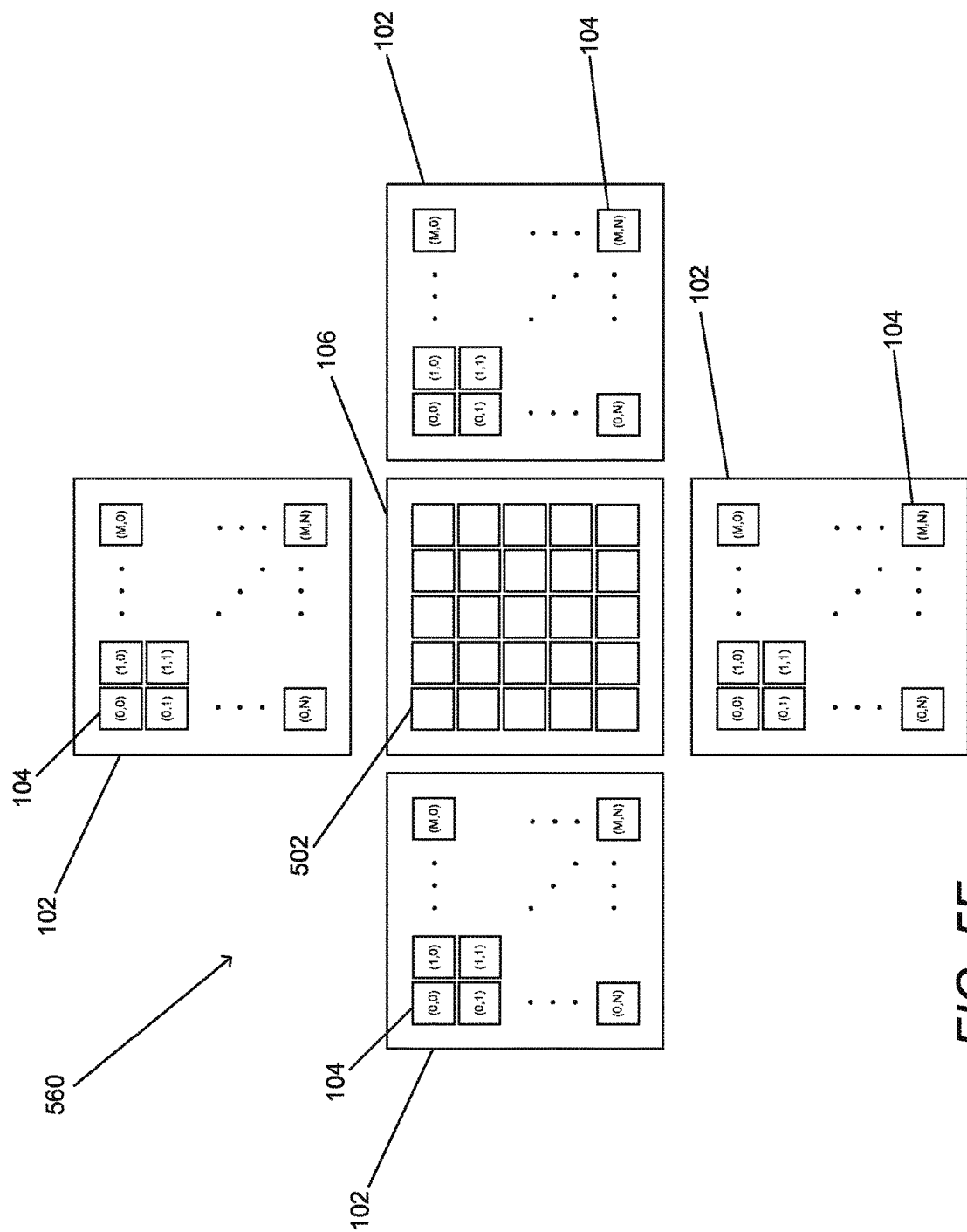
Figure 5G:
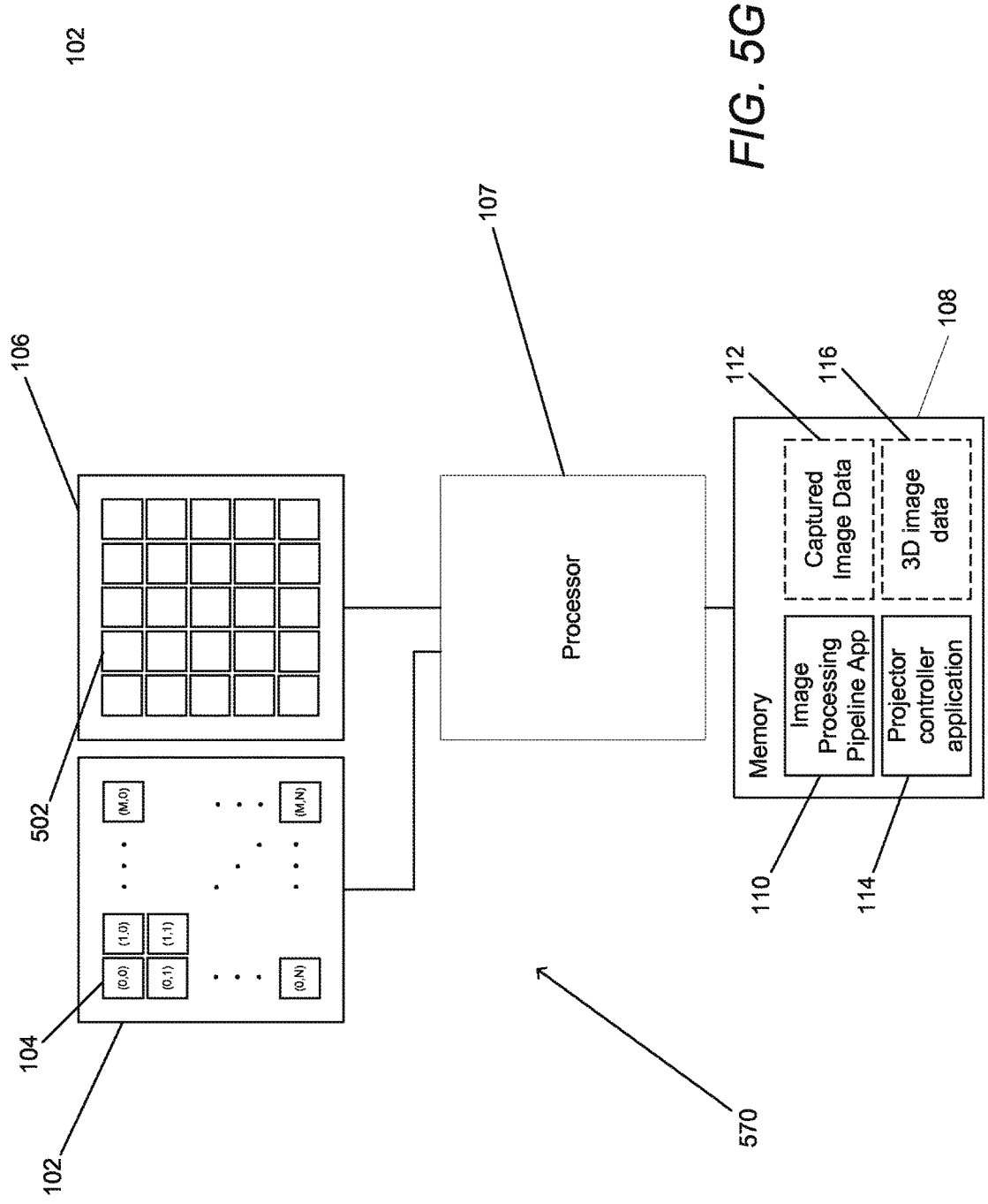
Figure 5H:
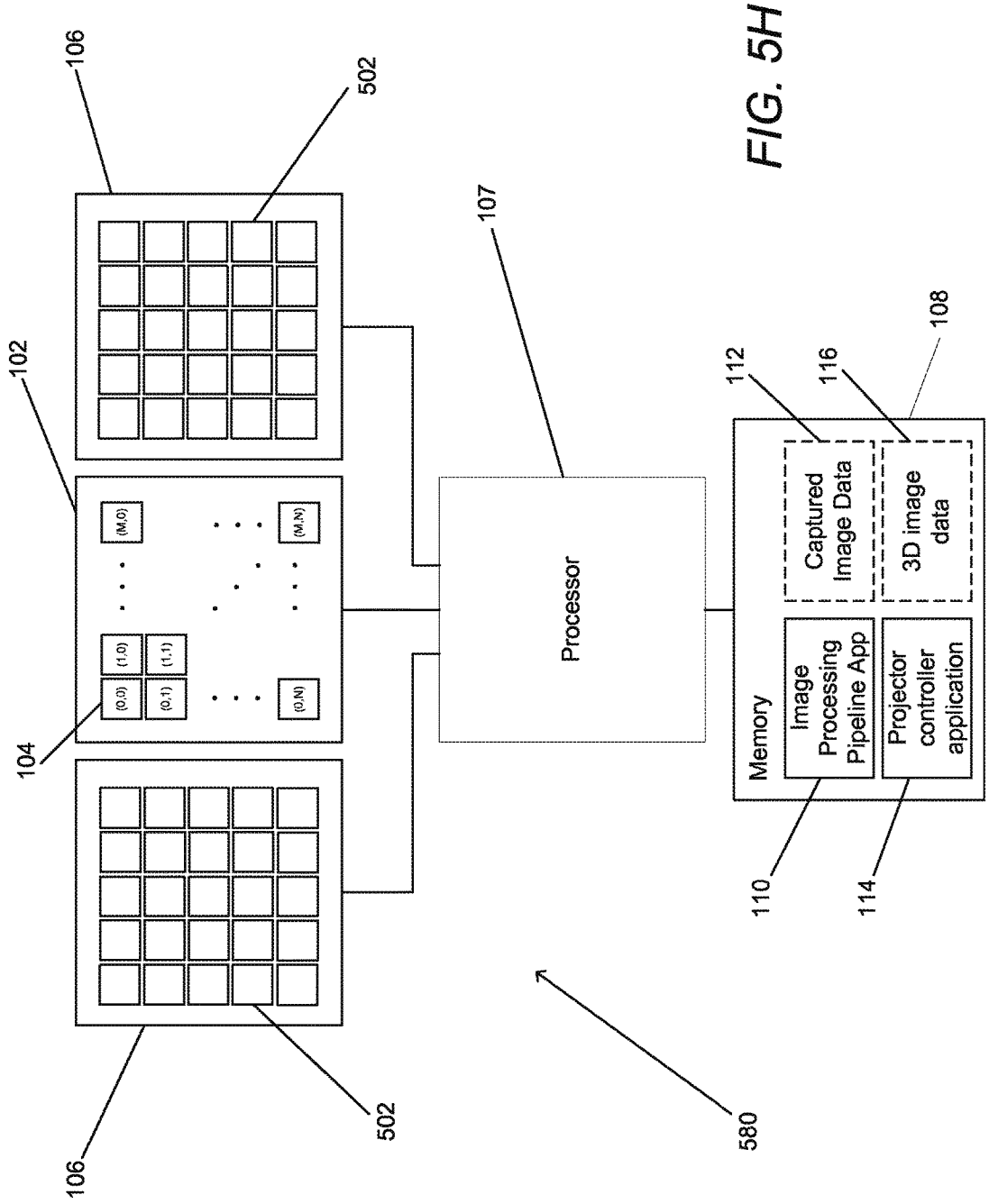
Figure 5I:
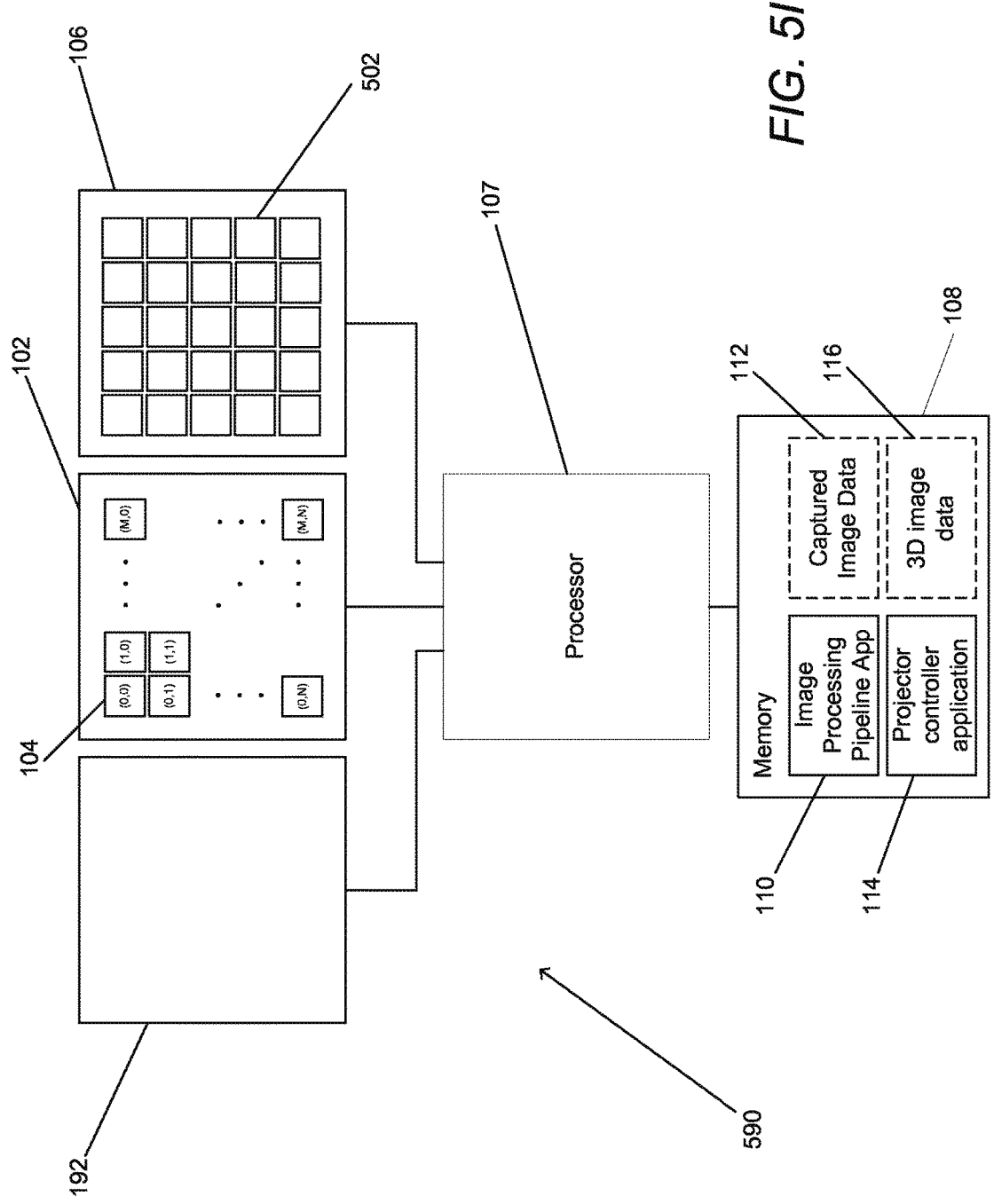

Projector arrays can be utilized to project a variety of patterns in accordance with various embodiments of the invention. A projected texture that includes intensity modulation can be achieved using Gray code patterns in which different projectors project overlaying patterns of increasingly smaller spatial pattern periods. Gray code patterns are conceptually illustrated in FIGS. 4E-4H. The increase in intensity across one spatial pattern period 480 of the pattern having the largest spatial pattern period shown in FIG. 4E is illustrated in FIG. 4I. As can readily be appreciated, the effect of projecting the Gray code patterns is to successively increase and decrease the intensity of the projected pattern across scene onto which the texture is projected. In several embodiments, Gray code patterns are used in combination with phase-shifted shaped fringe projection patterns.

The patterns described above with reference to FIGS. 4E-4H vary in a predictable pattern across the scene. When two-dimensional camera arrays are utilized to estimate depth, the projected texture will ideally vary along every epipolar line searched during the depth estimation process. As noted above, the spatial pattern period may be different along different epipolar lines for reasons including (but not limited to) compensating for the presence of a dominant epipolar line. Accordingly, projector arrays in accordance with many embodiments of the invention project random textures. The use of a series of projected patterns incorporating randomly located dots having different sizes is illustrated in FIGS. 4J-4M. As can readily be appreciated, the projection of the different random dot patterns can achieve a random pattern having non-deterministic intensity variations (color variations and/or phase variations) with a spatial pattern period determined based upon the size of the smallest dots. Due to the randomness of the projected patterns, there are likely to be some regions within the pattern that are similar. The likelihood that these regions will be located in regions along multiple epipolar lines that correspond at a specific depth is low. Therefore, the random pattern can provide improved performance in the context of camera arrays that estimate depth using two-dimensional arrays of cameras. Where the generation of patterns by the projector array is controllable, the spatial pattern period can be controlled so that the spatial pattern period provides increased depth estimation precision at a given depth. In several embodiments, spatial pattern period is controlled by only illuminating the scene using projectors having static spatial patterns with spatial pattern periods above a specified threshold. In this way, additional projectors can be used to successively illuminate the scene and depth estimates obtained using the image data captured when the scene was illuminated with projected texture that yields the highest depth estimation precision at a given depth. Where a large projector array is utilized, different projectors can be utilized to illuminate different portions of the field of view of the cameras in the camera array and the spatial pattern periods in each region modified in the manner outlined above based upon an initial depth estimate for the region.

Although specific projector arrays and sets of patterns that can be utilized by projector arrays are described above with reference to FIGS. 4A-4M, any of a variety of projector arrays and/or projected patterns can be utilized to project texture for the purposes of estimating depth using a camera array as appropriate to the requirements of specific applications in accordance with embodiments of the invention. Camera arrays incorporating arrays of projectors in accordance with various embodiments of the invention are discussed further below.

Camera Arrays Incorporating Arrays of Projectors

An illumination system incorporating an array of projectors can be utilized in any camera array configuration incorporating an illumination system. FIGS. 5A-5I illustrate camera array systems 500, 520, 530, 540, 550, 560, 570, 580, 590 corresponding to the camera array systems 100, 120, 130, 140, 150, 160, 170, 180, 190 illustrated in FIGS. 1A-1I with the exception that the illumination systems 106 include an array of projectors 502. As can readily be appreciated, camera arrays including arrays of cameras, and/or arrays of projectors located in any of a variety of configurations can be utilized as appropriate to the requirements of specific applications in accordance with embodiments of the invention.

Capturing Depth and Natural Texture of an Imaged Scene

Many applications require capture of the texture of a natural scene in addition to determining depth information. Camera arrays in accordance with a number of embodiments of the invention are configured to capture image data of a scene without illumination with projected texture and image data of the same scene illuminated with projected texture. The image data concerning the natural texture of the scene can be combined with depth estimates obtained using the projected texture. In several embodiments, the natural texture of the scene is rendered as an image and the depth map is registered with respect to the image. In a number of embodiments, the combined data is used to form a point cloud and/or to generate a mesh and texture for one or more objects visible within the scene. Where motion between the capture of the two sets of image date is negligible, then collation is a simple matter as the data can be assumed to be captured from the same viewpoint. Where significant motion is allowed, depth maps generated using each set of data and/or other depth queues can be utilized to detected corresponding features and determine the motion of the camera array between the capture of the sets of data.

Figure 6:
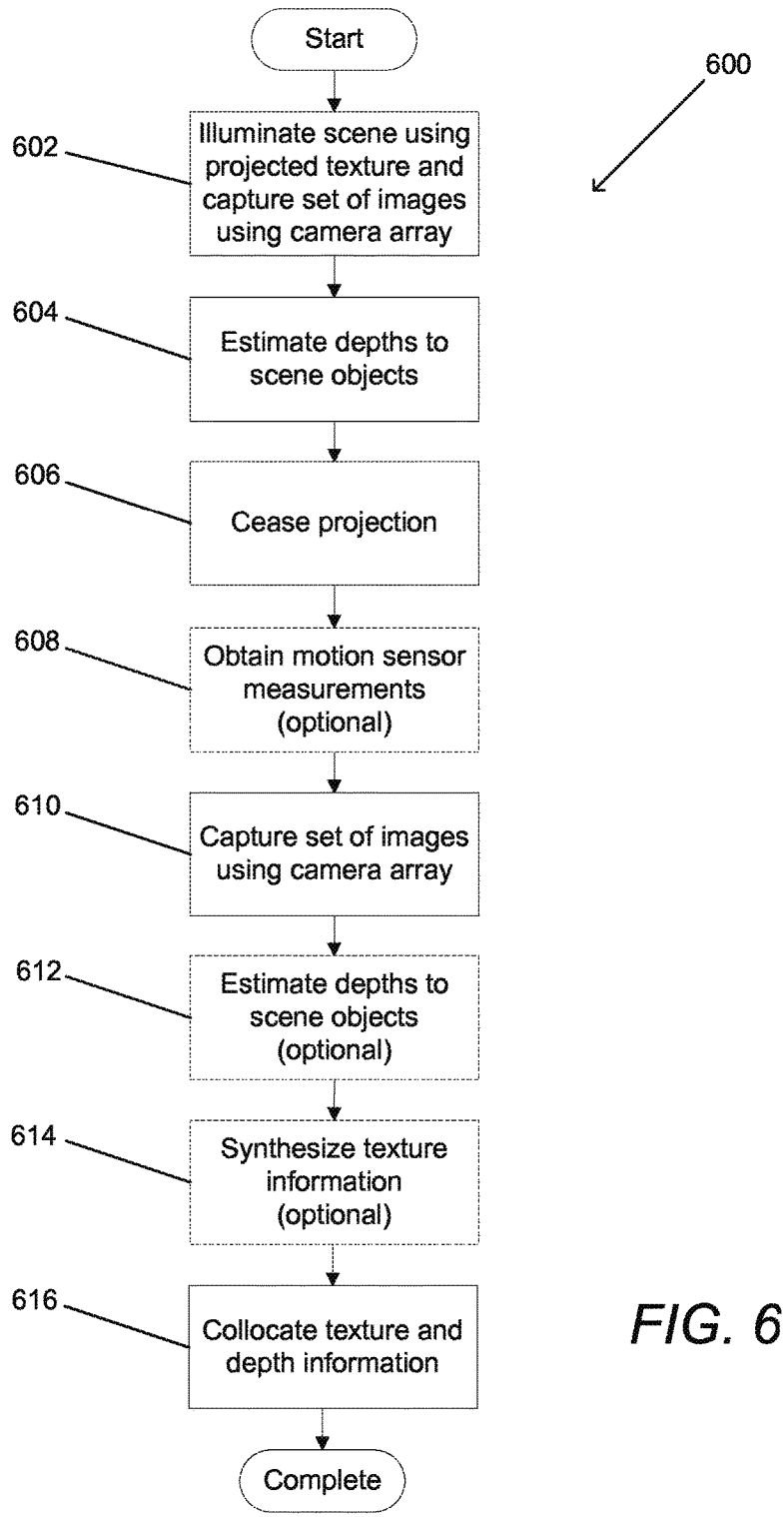
FIG. 6 is a flow chart illustrating a process for collocating natural texture and depth information in accordance with an embodiment of the invention.

A process for collocating natural texture and depth information in accordance with an embodiment of the invention is illustrated in FIG. 6. The process 600 includes illuminating (602) a scene using projected texture and capturing a set of images using a camera array. As noted above, the projected texture can be static, a sequence of dynamic textures or determined dynamically based upon initial depth estimates. A set of images captured by cameras in the camera array can be utilized to estimate (604) depths of objects visible within the scene. In a number of embodiments, the depth estimates are utilized to generate a depth map. In several embodiments, a confidence map is generated to indicate the reliability of depth estimates within the depth map. Any of a variety of confidence metrics can be utilized including (but not limited to) those described above in U.S. Pat. No. 8,619,082 to Ciurea et al., the relevant disclosure from which related to confidence metrics is hereby incorporated by reference herein in its entirety.

The illumination system ceases (606) projection. Where motion is allowed and the camera array incorporates motion sensors, motion measurements can optionally be obtained (608). The motion measurements can be utilized in subsequent processing related to estimating the relative poses of the cameras in the camera array between capture of sets of image data.

A set of image data is captured (610) in which the natural texture of the scene is visible using cameras in the camera array. In a number of embodiments, depths to scene objects are optionally estimated (612). The depth information can be utilized to identify features or sets of features that are similar to features or sets of features visible in the depth information obtained from the set of images in which the projected texture is visible.

Where the cameras in the array capture image data in different spectral channels, texture information may be optionally synthesized (614) using image data from the various spectral channels. In many embodiments, the synthesis involves performing fusion of the image data. In several embodiments, the synthesis involves performing a super-resolution similar to the super-resolution processes referenced above. In other embodiments, the natural texture of the scene is captured using a single monochrome camera or a single Bayer camera in the camera array.

When information concerning the natural texture of the scene and information concerning the depths of objects within the scene is obtained, the information can be collocated to create a set of information that includes both texture and depth. A variety of processes can be utilized to collocate the two sets of information. In several embodiments, depth information determined using the natural texture of the scene can be utilized to reproject one of the sets of information into the viewpoint of another of the sets of information. In other embodiments, any of a variety of depth cues discernible from the texture information can be used to perform colocation. In certain embodiments, texture that is likely to yield reliable depth estimates and the confidence map are utilized to perform colocation. As can readily be appreciated, the sequence in which the sets of image data are captured in FIG. 6 can be reversed.

Reprojecting Depth Maps

Figure 7:
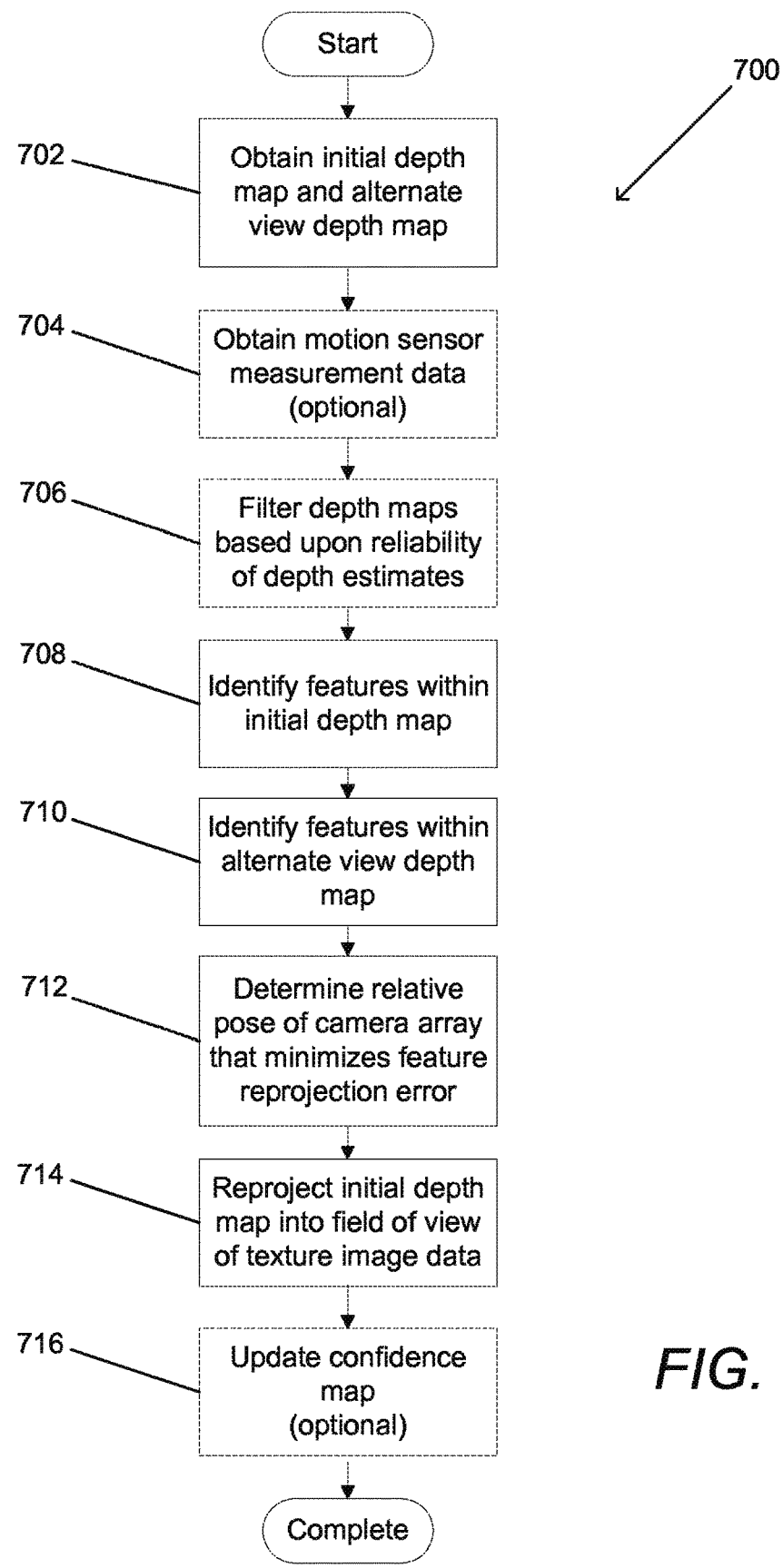
FIG. 7 is a flow chart illustrating a process for reprojecting depth information into the viewpoint of a set of texture information in accordance with an embodiment of the invention.

A process for reprojecting depth information into the viewpoint of a set of texture information in accordance with an embodiment of the invention is illustrated in FIG. 7. The process 700 includes obtaining (702) an initial depth map and an alternate view depth map. The initial depth map can be generated using a set of image data captured when the scene is illuminated with projected texture. The alternate view depth map can be generated using image data captured of the scene when the illumination system does not illuminate the scene and so the natural texture of the scene is visible. Where motion sensor measurement data is available, motion sensor measurement data can also be obtained (704) to assist with determining the relative pose of the cameras in the array between the viewpoint of the initial depth map and the viewpoint of the alternate view depth map.

In many embodiments, the depth maps are filtered (706) based upon confidence maps to eliminate depth estimates that are unreliable. Features can then be identified (708, 710) in each depth map. Any of a variety of features can be utilized to identify a landmark including (but not limited to) features identified using Scale-invariant Feature Transform (SIFT) descriptors, features identified using Speeded Up Robust Features (SURF) descriptors, and/or features identified using Binary Robust Independent Elementary Features (BRIEF) descriptors. As can readily be appreciated, the specific technique utilized to identify features is largely dependent upon the requirements of a specific application.

The relative pose of the cameras in the array between the viewpoint of the initial depth map and the viewpoint of the alternate view depth map can be determined (712) by minimizing the reprojection error of a set of common features visible in both the initial depth map and the alternate view depth map. Any of a wide variety of structure from motion techniques can be utilized to determine the relative pose that minimizes reprojection error. In several embodiments, the search process is assisted by the availability of motion sensor measurement data.

The relative pose can be utilized to reproject (714) the initial depth map into the field of view of the texture information and obtain collocated depth and texture information. In many embodiments, the reprojection can provide additional information concerning the reliability of the reprojected depth estimates. In several embodiments, the confidence map of the reprojected depth information is optionally updated (716). In certain embodiments, the confidence maps of the reprojected initial depth map and the alternate view depth map can be utilized to composite depth estimates from the two depth maps. In this way, depth estimates at the edges of objects that are generally very reliable in natural scenes can be utilized in the composited depth map. In many embodiments, edge maps are utilized to guide the compositing and the depth estimates are filtered to provide realistic depth transitions between depth information composited from the two depth maps. As can readily be appreciated, any of a variety of techniques can be utilized to composite depth maps as appropriate to the requirements of specific applications in accordance with embodiments of the invention.

While specific processes for collocating depths information and texture information obtained using a camera array incorporating an illumination system are described above with reference to FIGS. 6 and 7, any of a variety of processes can be utilized to collocate depth and texture information as appropriate to the requirements of specific applications. Furthermore, such processes can be utilized with any of a variety of camera architectures including binocular stereo camera arrays incorporating a single static illumination system in accordance with many embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A camera array, comprising:
    at least one two-dimensional array of cameras comprising a plurality of cameras;
    an illumination system configured to illuminate a scene with a projected texture;
    a processor;
    memory containing an image processing pipeline application and an illumination system controller application;
    wherein the at least one two-dimensional array of cameras comprises at least two two-dimensional arrays of cameras located in complementary occlusion zones on opposite sides of the illumination system;
    wherein the illumination system controller application directs the processor to control the illumination system to illuminate a scene with a projected texture;
    wherein the image processing pipeline application directs the processor to:
        utilize the illumination system controller application to control the illumination system to illuminate a scene with a projected texture, wherein a spatial pattern period of the projected texture is different along different epipolar lines;
        capture a set of images of the scene illuminated with the projected texture;
        determining depth estimates for pixel locations in an image from a reference viewpoint using at least a subset of the set of images that includes at least one image captured by a camera in each of the two-dimensional arrays of cameras, wherein generating a depth estimate for a given pixel location in the image from the reference viewpoint comprises:
            identifying pixels in the at least a subset of the set of images that correspond to the given pixel location in the image from the reference viewpoint based upon expected disparity at a plurality of depths along a plurality of epipolar lines aligned at different angles with respect to each other, wherein each epipolar line in the plurality of epipolar lines is between a camera located at the reference viewpoint and an alternative view camera from a plurality of alternative view cameras in the two-dimensional array of cameras and each epipolar line is used to determine the direction of anticipated shifts of corresponding pixels with depth in alternative view images captured by the plurality of alternative view cameras, wherein disparity along a first epipolar line is greater than disparity along a second epipolar line and the projected pattern incorporates a smaller spatial pattern period in a direction corresponding to the second epipolar line;

comparing the similarity of the corresponding pixels identified at each of the plurality of depths; and selecting the depth from the plurality of depths at which the identified corresponding pixels have the highest degree of similarity as a depth estimate for the given pixel location in the image from the reference viewpoint.

2. The camera array of claim 1, wherein a portion of a scene that is occluded in the field of view of at least one camera in a first of the two-dimensional arrays of cameras is visible in a plurality of cameras in a second of the arrays of cameras, where the first and second arrays of cameras are located in complementary occlusion zones on opposite sides of the illumination system.

3. The camera array of claim 2, wherein the at least two two-dimensional arrays of cameras comprises a pair of two-dimensional arrays of cameras located in complementary occlusion zones on either side of the illumination system.

4. The camera array of claim 3, wherein each array of cameras is a 2×2 array of monochrome cameras.

5. The camera array of claim 3, wherein the projected texture includes a first spatial pattern period in a first direction and a second larger spatial pattern period in a second direction.

6. The camera array of claim 1, wherein the at least one two-dimensional array of cameras comprises one two-dimensional array of cameras including a plurality of lower resolution cameras and at least one higher resolution camera.

7. The camera array of claim 6, wherein the two-dimensional array of cameras comprises at least one lower resolution camera located above, below, to the left, and to the right of the higher resolution camera.

8. The camera array of claim 7, wherein the higher resolution camera includes a Bayer filter pattern and the lower resolution cameras are monochrome cameras.

9. The camera array of claim 8, wherein the image processing pipeline application configures the higher resolution camera to capture texture information when the illumination system is not illuminating the scene using the projected pattern.

10. The camera array of claim 1, wherein the projected texture includes a first spatial pattern period in a first direction and a second larger spatial pattern period in a second direction.

11. The camera array of claim 1, wherein the illumination system is a static illumination system configured to project a fixed pattern.

12. The camera array of claim 1, wherein:
the illumination system is a dynamic illumination system configured to project a controllable pattern; and
the illumination system controller application directs the processor to control the pattern projected by the illumination system.

13. The camera array of claim 1, wherein the illumination system includes a spatial light modulator selected from the group consisting of a reflective liquid crystal on silicon microdisplay and a translucent liquid crystal microdisplay.

14. The camera array of claim 13, wherein the image processing pipeline application directs the processor to:

utilize the illumination system controller application to control the illumination system to illuminate a scene with a first projected texture;

capture a first set of images of the scene illuminated with the first projected texture;

determine initial depth estimates for pixel locations in an image from a reference viewpoint using at least a subset of the first set of images;

utilize the illumination system controller application to control the illumination system to illuminate a scene with a second projected texture selected based upon at least one initial depth estimate for a pixel location in an image from a reference viewpoint;

capture a second set of images of the scene illuminated with the second projected texture; and determine updated depth estimates for pixel locations in an image from a reference viewpoint using at least a subset of the first set of images.

15. The camera array of claim 14, wherein the spatial pattern period of the second projected texture at the at least one initial depth estimate for a pixel location in an image from a reference viewpoint is higher than the spatial resolution of the plurality of cameras at the at least one initial depth estimate for a pixel location in an image from the reference viewpoint.

16. The camera array of claim 1, wherein the illumination system comprises an array of projectors.

17. The camera array of claim 16, wherein the array of projectors comprises projectors configured to project different patterns.

18. The camera array of claim 17, wherein the different patterns comprise patterns having different spatial pattern periods.

19. The camera array of claim 17, wherein:
the projectors are configured to project controllable patterns; and
the illumination system controller application directs the processor to control the patterns projected by the illumination system.

20. The camera array of claim 1, wherein the projected pattern is random.

21. The camera array of claim 1, wherein the projected pattern includes a smaller spatial pattern period in a first direction and a larger spatial pattern period in a second direction perpendicular to the first direction.

22. The camera array of claim 1, wherein the image processing pipeline application directs the processor to:
utilize the illumination system controller application to control the illumination system to illuminate a scene with a projected texture;

capture a first set of images of the scene illuminated with the projected texture;

determining depth estimates for pixel locations in an image from a first reference viewpoint using at least a subset of the first set of images;

utilize the illumination system controller application to control the illumination system to prevent the illumination of the scene with the projected texture;

capture at least one image of the scene in which the natural texture of the scene is visible; and collocate natural texture and depth information for the scene.

23. The camera array of claim 22, wherein the image processing pipeline application directs the processor to collocate natural texture and depth information for the scene by assuming that the first set of images and the at least one image are captured from the same viewpoint.

24. The camera array of claim 22, wherein:
  at least one image of the scene in which the natural texture of the scene is visible is part of a second set of images of the scene in which the natural texture of the scene is visible;
  the image processing pipeline application further directs the processor to determining depth estimates for pixel locations in an image from a second reference viewpoint using at least a subset of the second set of images; and
  the image processing pipeline application directs the processor to collocate natural texture and depth information for the scene by:
    identifying similar features in depth maps generated using the first and second sets of images;
    estimate relative pose using the similar features; and
    reprojecting depth estimates obtained using the first set of information into the second reference viewpoint.

25. The camera array of claim 1, wherein the image processing pipeline application directs the processor to composite reprojected depth estimates generated using the first set of images and depth estimates generated using the second set of images based upon information concerning the reliability of the depth estimates.

26. A camera array, comprising:
  at least a pair of two-dimensional arrays of cameras located in complementary occlusion zones on either side of an illumination system, where each two-dimensional array of cameras comprises a plurality of cameras, wherein the pair of arrays of cameras in combination comprise a plurality of lower resolution cameras and at least one higher resolution camera, wherein at least one lower resolution camera is located above, below, to the left, and to the right of the higher resolution camera;
  the illumination system configured to illuminate a scene with a projected texture;
  a processor;
  memory containing an image processing pipeline application and an illumination system controller application;
  wherein the illumination system controller application directs the processor to control the illumination system to illuminate a scene with a projected texture;
  wherein the image processing pipeline application directs the processor to:
    utilize the illumination system controller application to control the illumination system to illuminate a scene with a projected texture, wherein a spatial pattern period of the projected texture is different along different epipolar lines;
    capture a set of images of the scene illuminated with the projected texture;
    determining depth estimates for pixel locations in an image from a reference viewpoint using at least a subset of the set of images that includes at least one image captured by a camera in each of the two-dimensional arrays of cameras, wherein generating a depth estimate for a given pixel location in the image from the reference viewpoint comprises:
      identifying pixels in the at least a subset of the set of images that correspond to the given pixel location in the image from the reference viewpoint based upon expected disparity at a plurality of depths along a plurality of epipolar lines aligned at different angles with respect to each other, wherein each epipolar line in the plurality of epipolar lines is between a camera located at the reference viewpoint and an alternative view camera from a plurality of alternative view cameras in the two-dimensional array of cameras and each epipolar line is used to determine the direction of anticipated shifts of corresponding pixels with depth in alternative view images captured by the plurality of alternative view cameras, wherein disparity along a first epipolar line is greater than disparity along a second epipolar line and the projected pattern incorporates a smaller spatial pattern period in a direction corresponding to the second epipolar line;
      comparing the similarity of the corresponding pixels identified at each of the plurality of depths; and
      selecting the depth from the plurality of depths at which the identified corresponding pixels have the highest degree of similarity as a depth estimate for the given pixel location in the image from the reference viewpoint.

* * * * *